(12) United States Patent
Smith et al.

(10) Patent No.: US 9,843,566 B2
(45) Date of Patent: Dec. 12, 2017

(54) NETWORKED SECURITY SYSTEM

(71) Applicants: Master Lock Company LLC, Oak Creek, WI (US); Vardr Pty. Ltd., Mosman (AU)

(72) Inventors: Geoff Smith, Mt. Gravatt East (AU); Tom Celinski, Mosman (AU); Matthew Fitzpatrick, Mosman (AU)

(73) Assignees: Master Lock Company LLC, Oak Creek, WI (US); Vardr Pty. Ltd., Mosman (AU)

( * ) Notice: Subject to any disclaimer, the term of this patent is extended or adjusted under 35 U.S.C. 154(b) by 105 days.

(21) Appl. No.: 14/853,906

(22) Filed: Sep. 14, 2015

(65) Prior Publication Data

US 2016/0105406 A1    Apr. 14, 2016

Related U.S. Application Data

(63) Continuation of application No. PCT/US2014/029078, filed on Mar. 14, 2014.
(Continued)

(51) Int. Cl.
*G06F 21/00* (2013.01)
*H04L 29/06* (2006.01)
(Continued)

(52) U.S. Cl.
CPC ........ *H04L 63/061* (2013.01); *H04L 63/0442* (2013.01); *H04L 63/168* (2013.01);
(Continued)

(58) Field of Classification Search
CPC ..................................................... H04L 63/061
See application file for complete search history.

(56) References Cited

U.S. PATENT DOCUMENTS

2007/0167182 A1* 7/2007 Tenhunen ............. H04M 15/55
455/512
2008/0235511 A1* 9/2008 O'Brien ................ H04L 9/0844
713/171
(Continued)

OTHER PUBLICATIONS

International Search Report and Written Opinion for International Application No. PCT/US14/29078, dated Aug. 27, 2014, 11 pages.
(Continued)

*Primary Examiner* — Morshed Mehedi
(74) *Attorney, Agent, or Firm* — Foley & Lardner LLP

(57) ABSTRACT

A method of securing communications between a security device and a security server include receiving, at the security server, a registration request from the security device, the registration request being encrypted using an initial registration key. A device identifier and rotation key unique to the security device are transmitted to the security device. A first session key request is received at the security server from the security device, the request being encrypted using the rotation key. A first session key is transmitted to the security device in response. One or more communications, encrypted using the first session key, is received at the security server from the security device. A second session key request is received at the security server from the security device after the first session key has expired, the request encrypted using the rotation key. A second session key is transmitted to the security device in response.

20 Claims, 34 Drawing Sheets

Related U.S. Application Data

(60) Provisional application No. 61/792,592, filed on Mar. 15, 2013.

(51) Int. Cl.
| | | |
|---|---|---|
| *H04W 4/00* | (2009.01) | |
| *H04W 8/26* | (2009.01) | |
| *H04W 60/00* | (2009.01) | |
| *H04W 76/02* | (2009.01) | |
| *H04W 84/20* | (2009.01) | |

(52) U.S. Cl.
CPC ............ *H04W 4/005* (2013.01); *H04W 8/26* (2013.01); *H04W 60/00* (2013.01); *H04W 76/021* (2013.01); *H04W 76/023* (2013.01); *H04L 2463/062* (2013.01); *H04W 84/20* (2013.01)

(56) References Cited

U.S. PATENT DOCUMENTS

| | | |
|---|---|---|
| 2009/0204806 A1 | 8/2009 | Kanemura et al. |
| 2009/0235354 A1 | 9/2009 | Gray et al. |
| 2012/0290694 A9* | 11/2012 | Marl .................. H04L 12/2807 709/223 |
| 2012/0314587 A1* | 12/2012 | Curticapean .......... G01S 5/0257 370/252 |
| 2014/0273958 A1* | 9/2014 | Messana ............. H04L 63/0884 455/411 |

OTHER PUBLICATIONS

International Preliminary Report on Patentability, PCT/US2014/029078, Master Lock Company, 9 pages (dated Sep. 15, 2015).

* cited by examiner

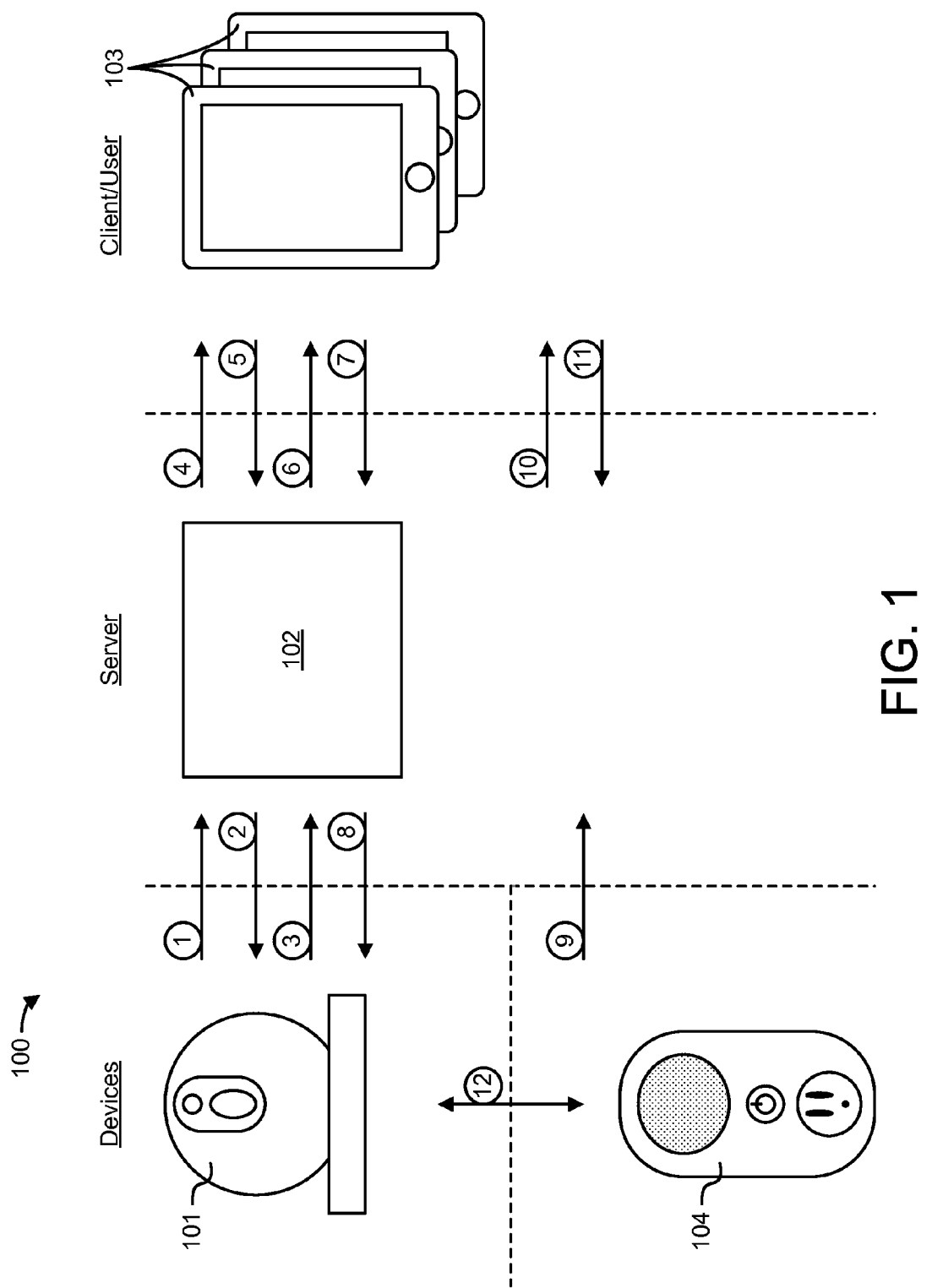

NETWORKED SECURITY SYSTEM

CROSS-REFERENCE TO RELATED PATENT APPLICATIONS

This application is a continuation of PCT Application No. PCT/US2014/029078, filed Mar. 14, 2014, which claims the benefit of and priority to U.S. Provisional Patent Application Ser. No. 61/792,592, filed Mar. 15, 2013, both of which are incorporated herein by reference.

BACKGROUND

Connected security sensors such as camera units and automatic switch units can be coupled to networks and transmit status information and event data to remote monitoring sites. As devices are added to a security system, the devices may be registered with a server and/or discovered by other devices on the network. Such operations may be resource intensive and may be conducted using different processes on different types of networks.

SUMMARY

One embodiment of the present disclosure relates to a method of securing communications between a security device and a security server. The method includes receiving, at the security server, a registration request from the security device, the registration request being encrypted using an initial registration key. The method further includes transmitting, from the security server to the security device, a device identifier and a rotation key, wherein both the device identifier and the rotation key are unique to the security device. The method further includes receiving, at the security server, a first session key request from the security device, the first session key request being encrypted using the rotation key. The method further includes transmitting, from the security server to the security device, a first session key in response to the first session key request. The method further includes receiving, at the security server, one or more communications from the security device, the one or more communications being encrypted using the first session key. The method further includes receiving, at the security server, a second session key request from the security device after the first session key has expired, the second session key request being encrypted using the rotation key. The method further includes transmitting, from the security server to the security device, a second session key in response to the second session key request.

In the above described embodiment, at least one of the initial registration key, the rotation key, the first session key, and the second session key may be an Advanced Encryption Standard (AES) key. Communications between the security device and the security server may be secured without using a Secure Socket Layer (SSL) connection. Receiving, at the security server, the registration request from the security device and transmitting, from the security server to the security device, the device identifier and the rotation key may be performed following a manufacturing process of the security device and before the security device is shipped to a retail location. The security server may be configured to transmit a plurality of session keys to the security device in response to session key requests, and each of the plurality of session keys may expire after a period of time. Still referring to the above described embodiment, the security device may be a security camera, and the one or more communications from the security device may include video uploaded from the security camera to the security server.

Another embodiment of the present disclosure relates to a security device. The security device includes a processor and one or more computer-readable storage media. The computer-readable storage media has instructions stored thereon that, when executed by the processor, are configured to cause the processor to transmit a registration request to a security server, wherein the registration request is encrypted with an initial registration key, receive a device identifier and a rotation key from the security server, wherein both the device identifier and the rotation key are unique to the security device, transmit a first session key request to the security server, the first session key request being encrypted using the rotation key, receive a first session key from the security server in response to the first session key request, transmit one or more communications to the security server that are encrypted using the first session key, transmit a second session key request to the security server after the first session key has expired, the second session key request being encrypted using the rotation key, and receive a second session key from the security server in response to the second session key request.

In the above described embodiment, at least one of the initial registration key, the rotation key, the first session key, and the second session key may be an Advanced Encryption Standard (AES) key. The communications between the security device and the security server may be secured without using a Secure Socket Layer (SSL) connection. The registration request may be transmitted to the security server following a manufacturing process of the security device and before the security device is shipped to a retail location. The instructions may be configured to cause the processor to transmit a plurality of session key requests to the security server and receive a plurality of session keys in response to the plurality of session key requests, and each of the plurality of session keys may expire after a period of time. Still referring to the above described embodiment, the security device may be a security camera, and the one or more communications transmitted by the processor may include video uploaded from the security camera to the security server.

Another embodiment of the present disclosure relates to a security system. The security system includes a security server and a security device. The security device is configured to transmit a registration request to the security server and, in response, the security server is configured to return a device identifier and a rotation key to the security device. The registration request is encrypted using an initial registration key. Both the device identifier and the rotation key are unique to the security device. The security device is configured to send a plurality of session key requests to the security server and, in response, the security server is configured to return a plurality of session keys, each of the session key requests being encrypted using the rotation key. The security device is configured to send the first session key request after receiving the rotation key and subsequent session key requests after a session key associated with the last request has expired. The security device is configured to encrypt transmissions to the security server using one of the plurality of session keys.

In the above described embodiment, at least one of the initial registration key, the rotation key, the first session key, and the second session key may be an Advanced Encryption Standard (AES) key. Communications between the security device and the security server may be secured without using a Secure Socket Layer (SSL) connection. The registration request may be transmitted to the security server following a manufacturing process of the security device and before the security device is shipped to a retail location. Each of the session keys may expire after a period of time. The security device may be a security camera, and at least some of the transmissions from the security camera to the security server may include video uploaded from the security camera to the security server. In some embodiments, the above described embodiment may further include a plurality of additional security devices, wherein the security server is configured to provide each of the additional security devices with a different rotation key to be used by the additional security devices to encrypt requests for session keys.

Another embodiment of the present disclosure relates to a method of enabling communication between devices. The method includes associating a first device with an access point on a local network The method further includes receiving, at the first device, a first access point identifier associated with the access point and a first network address assigned by the access point to the first device. The method further includes transmitting, from the first device to a security server, the first access point identifier and the first network address, wherein the security server is configured to receive a second access point identifier and a second network address from a second device and, when the second access point identifier matches the first access point identifier, transmit the second network address to the first device. The method further includes receiving, at the first device, the second network address from the security server. The method further includes transmitting one or more messages from the first device to the second device on the local network using the second network address received from the security server.

In the above described embodiment, communication may be established between the first device and the second device without utilizing a network discovery protocol of the local network. For example, the network discovery protocol may be Bonjour or uPnP. Still referring to the above described embodiment, the first network address and the second network address may be Internet Protocol (IP) addresses and the first access point identifier and the second access point identifier may be Basic Service Set Identifiers (BSSID). The first device may be a master device and the second device may be a slave device configured to receive the one or more messages and perform one or more actions responsive to receiving the one or more messages. The master device may be a camera and the slave device may be one of a locking device or a power switch.

Another embodiment of the present disclosure relates to a security device. The security device includes a processor and one or more computer-readable storage media. The computer-readable storage media has instructions stored thereon that, when executed by the processor, are configured to cause the processor to associate the security device with an access point on a local network, receive a first access point identifier associated with the access point and a first network address assigned by the access point to the security device, transmit the first access point identifier and the first network address to a security server, wherein the security server is configured to receive a second access point identifier and a second network address from a slave device and, when the second access point identifier matches the first access point identifier, transmit the second network address to the security device, receive the second network address from the security server, and transmit one or more messages to the slave device on the local network using the second network address received from the security server.

In the above described embodiment, communication may be established between the first device and the second device without utilizing a network discovery protocol of the local network. For example, the network discovery protocol may be Bonjour or uPnP. Still referring to the above described embodiment, the first network address and the second network address may be Internet Protocol (IP) addresses and the first access point identifier and the second access point identifier may be Basic Service Set Identifiers (BSSID). The slave device may be configured to receive the one or more messages and perform one or more actions responsive to receiving the one or more messages. The security device may be a camera and the slave device may be one of a locking device or a power switch.

Another embodiment of the present disclosure relates to a security system. The security system includes a security server, one or more master devices, and one or more slave devices. Each of the one or more master devices and the one or more slave devices is configured to receive, from an access point, an access point identifier associated with the access point and a network address associated with the respective device, and transmit the access point identifier and the network address to the security server. The security server is configured to, for each of the one or more slave devices, determine whether the access point identifier received from the slave device matches an access point identifier received from at least one of the one or more master devices, and, for each slave device from which a matching access point identifier is received, transmit the network address of the slave device to each of the one or more master devices from which the matching access point identifier was received. The one or more master devices from which the matching access point identifier was received are configured to receive the network address from the security server and use the network address to transmit one or more messages to the slave device on the local network.

In the above described embodiment, communication may be established between the one or more master devices and the one or more slave devices without utilizing a network discovery protocol of the local network. For example, the network discovery protocol may be Bonjour or uPnP. Still referring to the above described embodiment, the network addresses may be Internet Protocol (IP) addresses and the access point identifiers may be Basic Service Set Identifiers (BSSID). The one or more master devices may include one or more security cameras. The security server may be configured to receive a request from a mobile computing device to discover the one or more slave devices, and the security server may be configured to transmit the network locations of the one or more slave devices to the mobile computing device in response to the request. The mobile computing device may be configured to transmit one or more messages to at least one of the one or more slave devices using at least one of the network locations received from the security server.

Another embodiment of the present disclosure relates to one or more computer-readable storage media having instructions stored thereon that, when executed by one or more processors, cause the one or more processors to implement a method. The method includes receiving one or more master registration messages from one or more master devices, each of the one or more master registration messages including a master access point identifier and a master network address associated with the master device from which the respective master registration message was received. The method further includes receiving one or more slave registration messages from one or more slave devices, each of the one or more slave registration messages including a slave access point identifier and a slave network address associated with the slave device from which the respective slave registration message was received. The method further includes, for each of the one or more slave devices, determining whether the slave access point identifier in the slave registration message received from the respective slave device matches one of the master access point identifiers of the one or more master registration messages. The method further includes, for each slave device from which a matching slave access point identifier is received, transmitting the slave network address of the slave device to each of the one or more master devices from which the matching master access point identifier was received. The one or more master devices receiving the slave network address are configured to use the slave network address to transmit one or more messages to the slave device on the local network.

Another embodiment of the present disclosure relates to one or more computer-readable storage media having instructions stored thereon that, when executed by one or more processors, cause the one or more processors to implement a method. The method includes receiving a registration request from the security device, the registration request being encrypted using an initial registration key. The method further includes transmitting a device identifier and a rotation key to the security device, wherein both the device identifier and the rotation key are unique to the security device. The method further includes receiving a first session key request from the security device, the first session key request being encrypted using the rotation key. The method further includes transmitting a first session key to the security device in response to the first session key request. The method further includes receiving one or more communications from the security device, the one or more communications being encrypted using the first session key. The method further includes receiving a second session key request from the security device after the first session key has expired, the second session key request being encrypted using the rotation key. The method further includes transmitting a second session key to the security device in response to the second session key request.

BRIEF DESCRIPTION OF THE DRAWINGS

The disclosure will become more fully understood from the following detailed description, taken in conjunction with the accompanying figures, wherein like reference numerals refer to like elements, in which:

FIG. 1 is an overview of a networked security system;

DETAILED DESCRIPTION

Figure 2A:
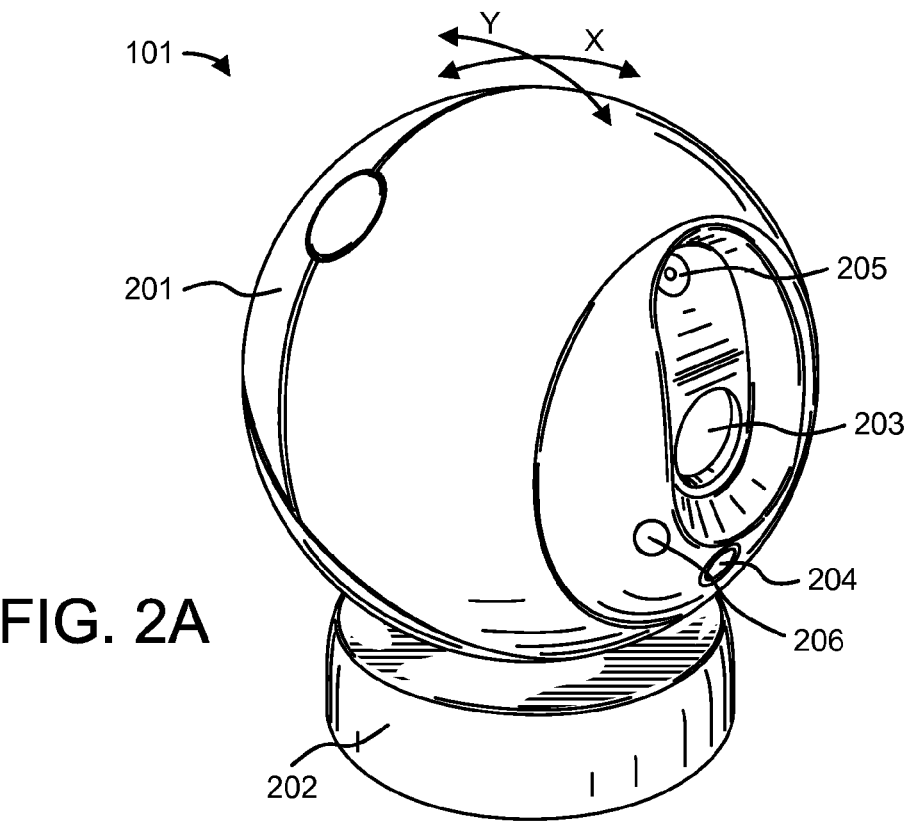
FIGS. 2A-H are detailed views of an exemplary embodiment of a camera unit.
Figure 2B:
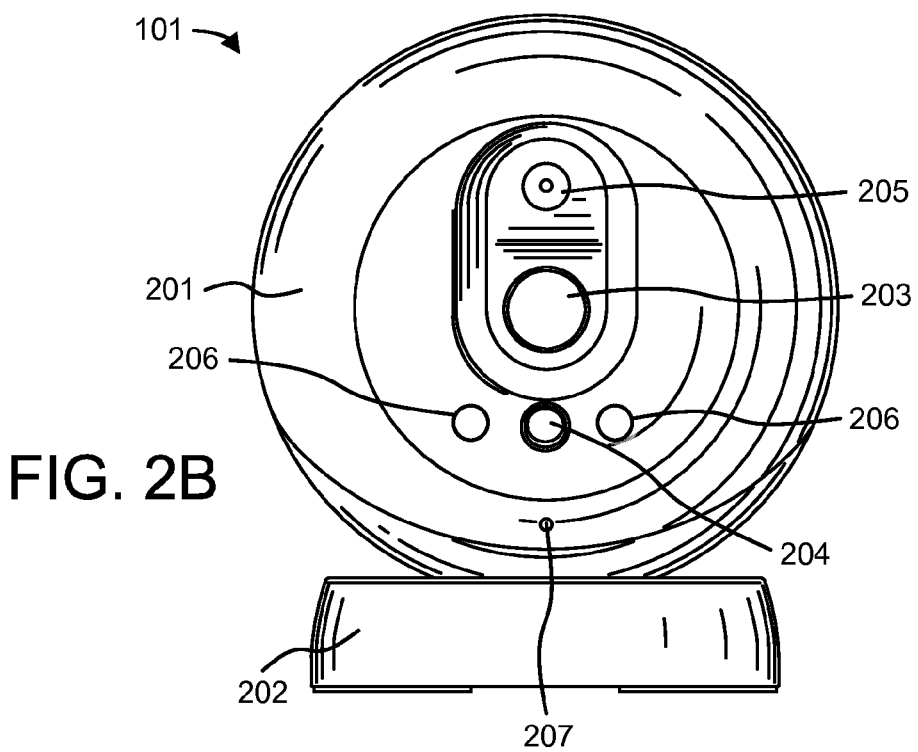
Figure 2C:
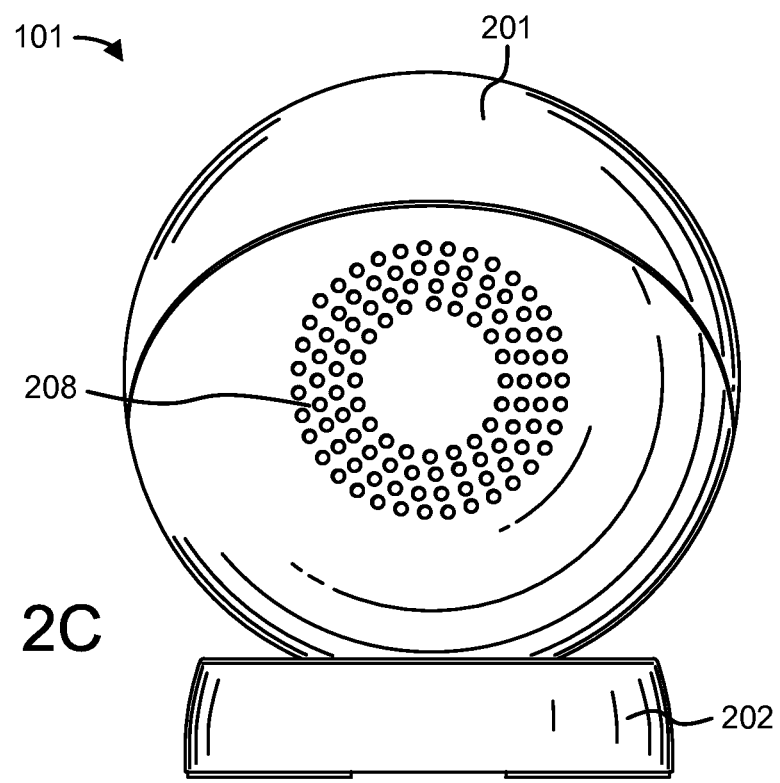
Figure 2D:
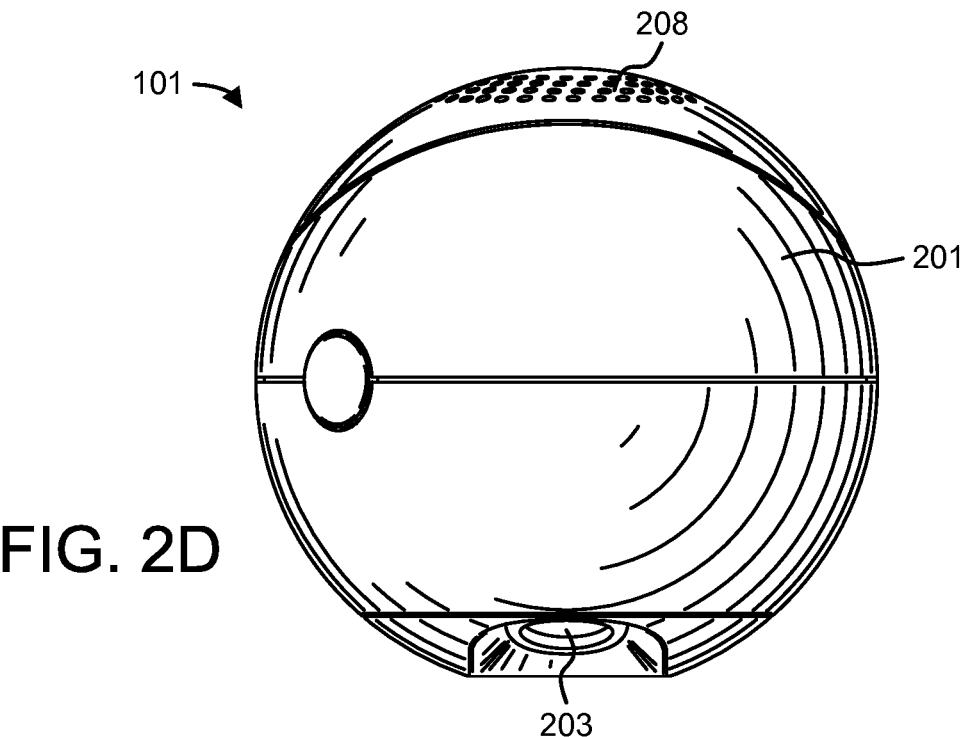
Figure 2E:
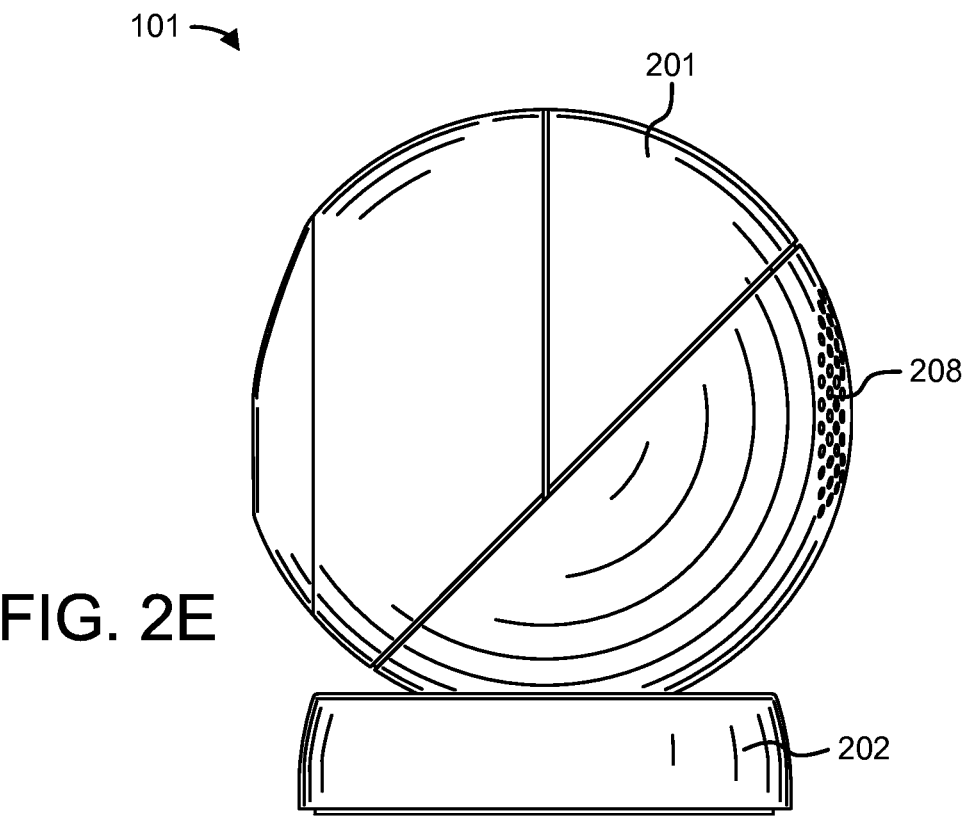
Figure 2F:
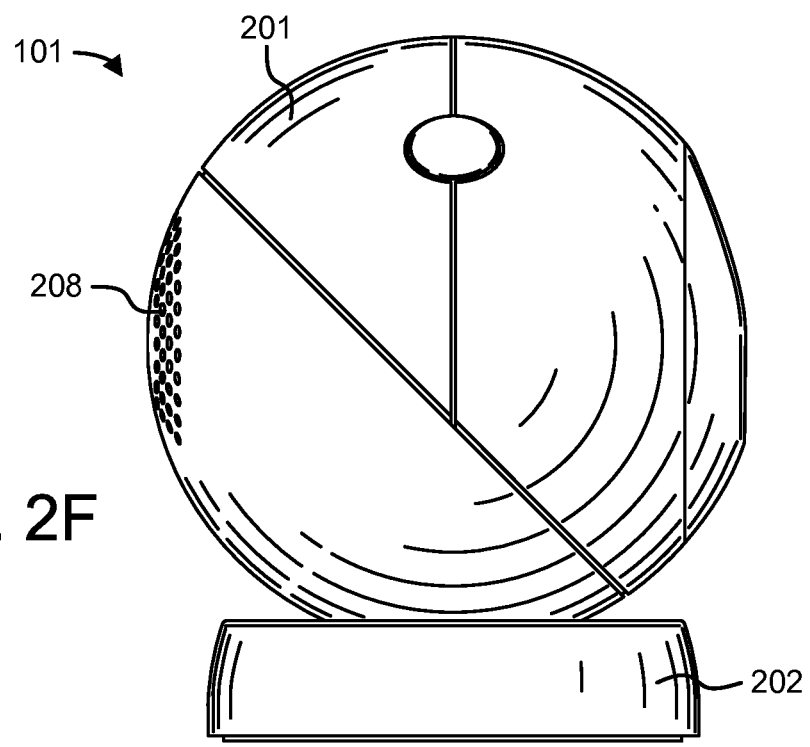
Figure 2G:
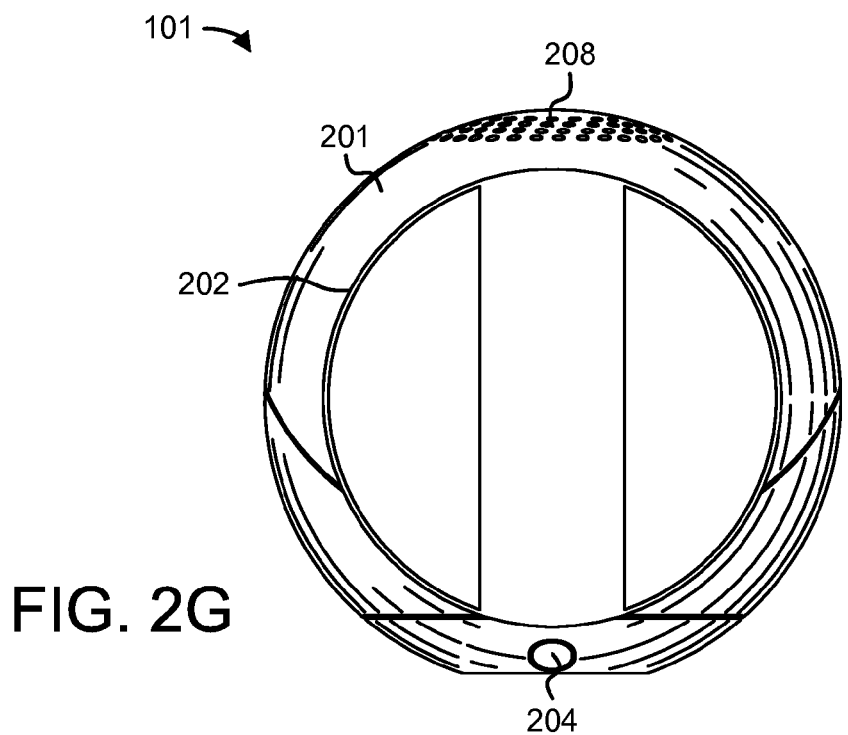
Figure 2H:
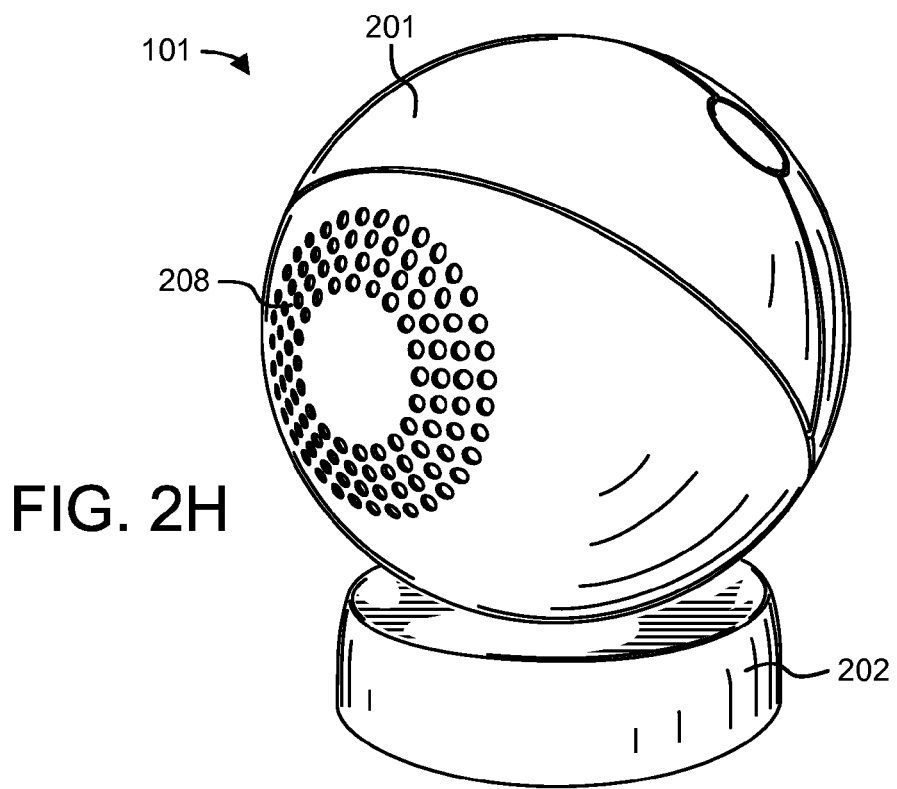

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Remote Device and Server Overview

Referring to FIG. 1, an overview of a networked security system 100 is shown. System 100 includes at least one camera unit 101, at least one server 102, and at least one client device 103. Optionally, system 100 includes at least one switch unit 104. Generally, system 100 operates to alert a user having a client device 103 of events detected by camera unit 101, switch unit 104, and other networked security devices. System 100 further provides event data of the detected event to at least one client device 103. Event data and alerts are organized through an online user interface.

Camera unit 101 is generally a battery operated camera including a camera component and a motion detector. Camera unit 101 includes a network interface for communicating with server 102 such that camera unit 101 sends data to and receives data from server 102. Camera unit 101 is operable to detect motion, capture video data, compress the video data, upload the video data to server 102, receive commands from server 102, and execute the commands. Further, camera unit 101 is configurable to communicate with other devices on camera unit 101's local area network (e.g., another camera unit 101 or a switch unit 104 connected to the same access point or router). Camera unit 101 and its operation are discussed below with respect to FIGS. 2A-M in greater detail.

Client device 103 includes network interfaces for communicating with server 102. Client device 103 enables a user of system 100 to receive data from and send data to server 102. Client device 103 generally includes a display operable to present a user an interactive graphical user interface for accessing system 100. Client device 103 also includes a user input mechanism (e.g., touch screen, keyboard, etc.) operable to receive input from a user. Client device 103 may be a cell phone, a PDA, a smartphone, a tablet computing device, a smart television, a laptop computer, a desktop computer, or any other network connected device configurable to alert a user and to display event information. It should be appreciated that a user may access system 100 through multiple client devices (e.g., a mobile phone and a laptop). Client device 103 is discussed below with respect to FIGS. 5A-B in greater detail.

Server 102 includes at least one storage unit and a network interface for communicating with camera unit 101, switch unit 104, and client device 103. Server 102 stores video data received from camera unit 101 and alarm data from switch unit 104. Server 102 further stores client device 103 information and user account information. Server 102 includes software of system 100, including software to generate interactive graphical user interfaces presented to users of system 100 through client device 103. Further details of server 102 are discussed below with respect to FIGS. 4A-F.

System 100 optionally includes switch unit 104. Switch unit 104 includes a power input and a power output. Switch unit 104 further includes a speaker and a microphone. Switch unit 104 includes a network interface that enables data transmission to and from server 102. Switch unit 104 is configured to detect an audible alarm. Switch unit 104 is configured to activate an electrical load plugged into the power output based on a detected alarm. Switch unit 104 can activate an electrical load plugged into the power output based on a user command. Further, switch unit 104 can activate an electrical load plugged into the power output based on a command from another device (e.g., from camera unit 101). Switch unit 104 is further configured to upload audio data to server 102. Switch unit 104 is capable of emitting audio based on received data from server 102. Additional details of switch unit 104 and its operation are discussed below with respect to FIGS. 3A-H.

Referring again to FIG. 1, a flow diagram providing an overview of the operation and interaction between components of system 100 is shown. Camera unit 101 is placed at a location (e.g., a user's home or office). Camera unit 101 is registered with server 102 and is linked with a user account stored on server 102. The location of camera unit 101 and the association with the user account are stored in server 102. The user accesses his or her account information and device information through at least one client device 103, which presents the user with interactive graphical user interfaces for system 100. The user account further includes event notification preferences, which are stored on server 102.

Camera unit 101 is configured to detect an event occurring at the location using a motion detector. Upon detection of the event, camera unit 101 notifies server 102 of the detection (step 1) and begins capturing a video using a camera component. In some instances, server 102 may instruct camera unit 101 to stop recording (step 2). For example, a user may have indicated that camera unit 101 is not to record during a designated time period. If no stop command is received during step 2, camera unit 101 finishes recording the video data, compresses the video data, and uploads the video data to server 102 (step 3). Server 102 associates the video and event notification with the appropriate user accounts. Server 102 initiates an alert to the appropriate users through client device 103 (step 4).

The alert generally includes an identification of camera unit 101, as well as an option to view event video recorded by camera unit 101 or be directed to a viewing page. The user indicates to server 102 through client device 103 whether the user wishes to view the video, dismiss the alert, delete the event, leave a comment pertaining to the event, or perform another action associated with the event (step 5). If the user wishes to view the video, server 102 provides client device 103 the video data (step 6). The video data is streamed from server 102 to client device and presented to the user through the graphical user interface. Alternatively, the event video data is completely downloaded to client device 103.

The user may send additional instructions intended for remote devices (e.g., camera unit 101 or switch unit 104) to server 102 via client device 103 (step 7). For example, the user may send a command to server 102 to instruct camera unit 101 to stop detecting and recording events. Alternatively, the user may instruct server 102 to instruct camera unit 101 to capture additional video data. Server 102 provides the user instructions to camera unit 101 (step 8). Camera unit 101 responds to user commands from client device 103 that are relayed by server 102.

Switch unit 104 is configured to detect an audible alarm through a microphone. Upon detection of an audible alarm, switch unit 104 notifies server 102 of the detection (step 9) and activates a connected electrical load (e.g., a light unit). Server 102 associates the event notification with the appropriate user account. Server 102 initiates an alert to the user through client device 103 (step 10). Server 102 may receive a command from client device 103 to initiate a two-way audio communication between client device 103 and switch unit 104 (step 11). Further, if system 100 includes switch unit 104, switch unit 104 and camera unit 101 can be configured to communicate with each other directly (e.g., by sending commands directly to another device through the access point of the local area network) or indirectly (e.g., by relaying commands through server 102) (step 12). Communication between camera unit 101 and switch unit 104 enables activation or deactivation of an electrical load attached to switch unit 104 upon the detection of an event by camera unit 101 or the capturing of video data by camera unit 101 upon the detection of an audible alarm by switch unit 104.

Camera Unit

Referring to FIGS. 2A-H, detailed views of camera unit 101 are shown. Camera unit 101 includes housing 201 and base 202. Camera unit 101 further includes camera sensor 203 and motion detector 204. Camera sensor 203 may be a charge-coupled device, a complementary metal-oxide semiconductor active pixel sensor, or another type of camera sensor. Light exposure settings of camera sensor 203 may be adjustable to enable high and low light video recording.

Motion detector 204 may be any of a passive infrared sensor, a radio-frequency field sensor, a microwave radar sensor, an ultrasonic sensor, a vibration sensor, or any other sensor configured to detect motion.

Housing 201 may be rotatable about base 202 along axis X and axis Y. The rotational movement of housing 201 facilitates base 202 mounting on a wall or a ceiling and camera sensor 203 to be rotated in order to capture a designated viewing area. In some embodiments, camera unit 101 includes camera sensor 203 and motion detector 204, and does not include additional components such as an ambient light sensor, a microphone, or LED lights.

Camera unit 101 is shown to include ambient light sensor 205 and LEDs 206. During a recording operation, ambient light sensor 205 detects the ambient light level such that LEDs 206 are turned on during low ambient light situations to illuminate the area being recorded or kept off when the ambient light level is high enough. Alternatively or additionally, settings of camera sensor 203 are adjusted in response to the output of ambient light sensor 205. Camera unit 101 also optionally includes microphone 207 for recording audio. In another embodiment, camera unit 101 includes a movement sensor configured to detect camera unit 101 movement (e.g., of the camera unit itself) as a trigger for capturing a video and sending an alert to server 102. The movement sensor may be a tilt sensor, a vibration sensor, a shock sensor, a shake sensor, an acceleration sensor, or a combination of any of the above. In yet another embodiment, camera unit 101 includes speaker 208 that enables audio to be played and/or two-way communications with a remote device if camera unit 101 also includes a microphone.

Figure 2I:
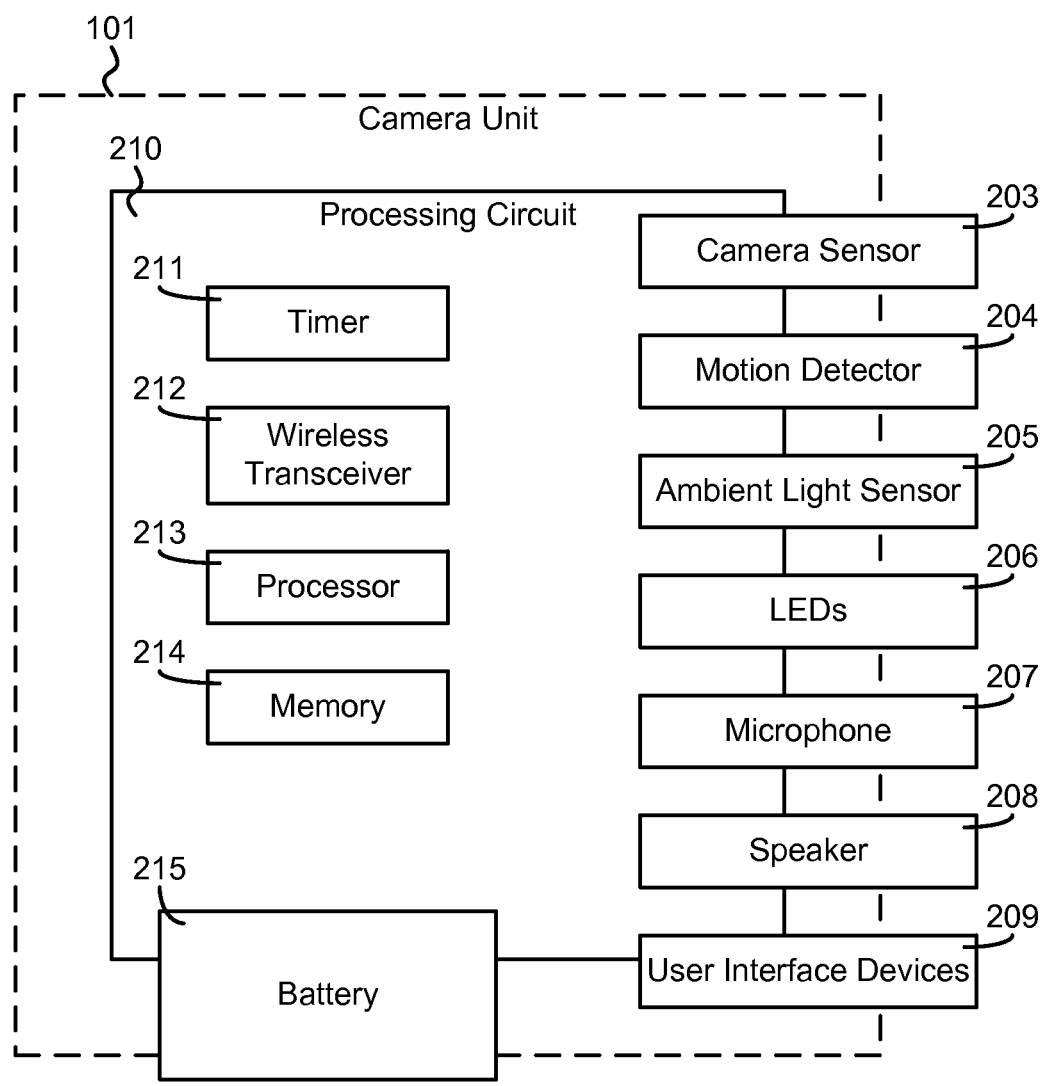
FIG. 2I is a block diagram of the camera unit.

Referring to FIG. 2I, a block diagram of camera unit 101 is shown. Camera unit 101 includes processing circuit 210. Processing circuit 210 controls the operation of camera unit 101. Accordingly processing circuit 210 includes at least timer 211, wireless transceiver 212, processor 213, and memory 214. Wireless transceiver 212 is configured to send and receive data to and from server 102 and to and from other devices (e.g., switch unit 104) located on the local area network. Wireless transceiver 212 may utilize at least one version of the 802.11 standard networking protocol (e.g., 802.11a/b/g/n). Alternatively, wireless transceiver 212 utilizes other networking standards, including, but not limited to CDMA, GSM, LTE, Bluetooth®, ZigBee®, and 802.15.

In some embodiments, camera unit 101 includes multiple wireless transceivers to provide broader network compatibility. In this arrangement, a user can select which radios are active, and which radios are to remain dormant. Processing circuit 210 includes and/or communicates with camera sensor 203, motion detector 204, and user interface devices 209. Processing circuit 210 may also include and/or communicate with optional devices such as ambient light sensor 205, LEDs 206, microphone 207, speaker 208, and/or user interface device 209. Memory 214 stores video data, operating instructions, and any necessary software modules. Camera unit 101 may accept and utilize removable memory media (e.g., SD or MicroSD memory cards) for additional storage of video data. Camera unit 101 is powered by battery 215. Battery 215 may be rechargeable. Alternatively, camera unit 101 is powered via a wired connection.

Camera unit 101 is power efficient such that, under certain configurations, battery 215 can power camera unit 101 for significant lengths of time (e.g., months or years) without replacement or recharging. Many components of camera unit 101 remain in a low-power sleep-state throughout normal operation. Camera sensor 203, ambient light sensor 205, LEDs 206, microphone 207, speaker 208, wireless transceiver 212, and processor 213 normally operate in a low-power sleep mode. Motion detector 204 remains powered to detect events while camera unit 101 is active. If camera unit 101 is inactive, motion detector 204 enters a low-power sleep state as well. Upon detection of an event by motion detector 204, an interrupt is sent to wireless transceiver 212, which activates components, including camera sensor 203 and processor 213.

Timer 211 can remain powered and can periodically provide a wakeup interrupt to wireless transceiver 212. Timer 211 is programmable to transmit interrupt signals to wake wireless transceiver 212 at designated time intervals. The designated time interval may be adjustable. Timer 211 may be a low-power timer circuit including a crystal oscillator. Upon wakeup, wireless transceiver 212 transmits a check-in signal to server 102. Server 102 optionally replies to the check-in signal by sending operating instructions to wireless transceiver 212 which are then stored in memory 214. If instructions to conduct an active operation are not received, wireless transceiver 212 returns to sleep for the designated time interval. The process can then repeat.

Figure 2J:
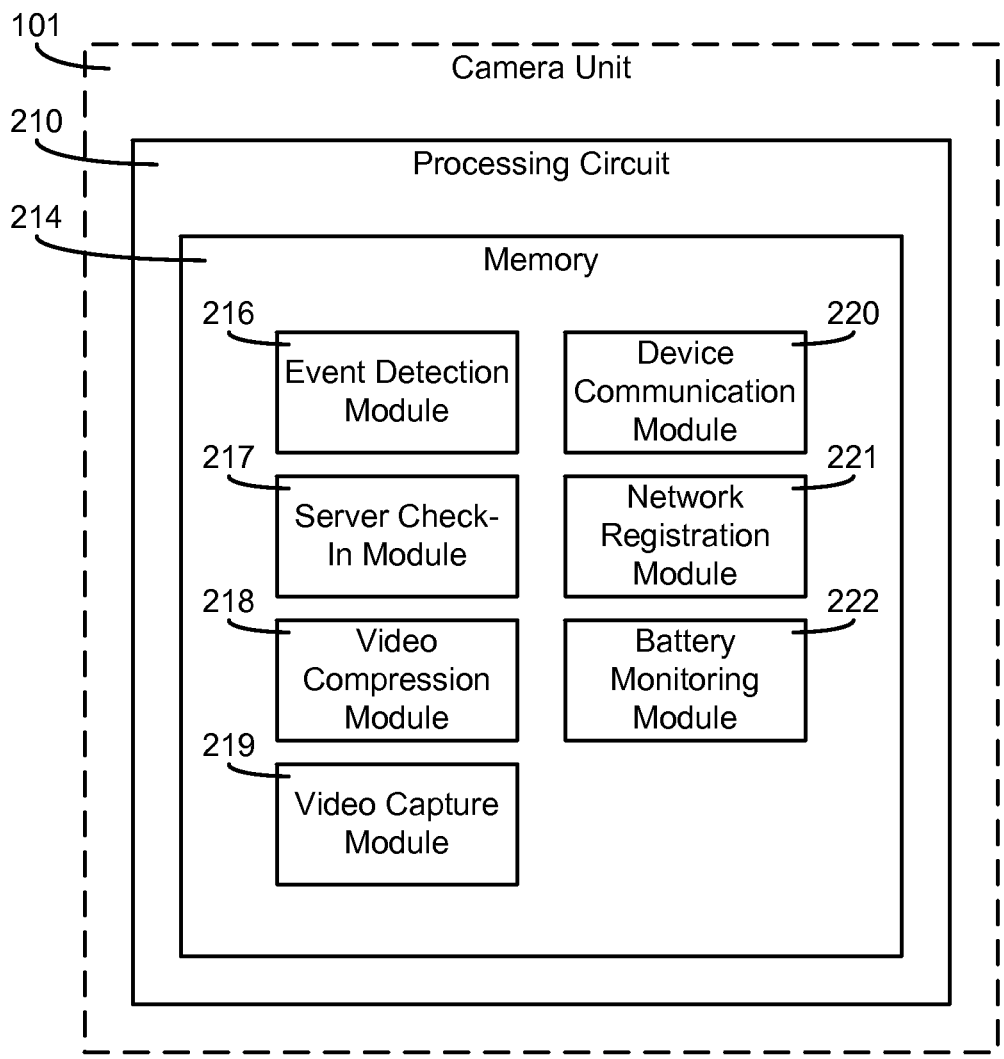
FIG. 2J is a block diagram of memory modules of the camera unit.

Referring to FIG. 2J, a block diagram of programming modules stored on camera unit 101 is shown. Modules are stored in memory 214 contained on processing circuit 210. The modules include all instructions necessary to operate camera unit 101. Such modules are shown to include: event detection module 216, server check-in module 217, video compression module 218, video capture module 219, device communication module 220, network registration module 221, and battery monitoring module 222. Event detection module 216 may be configured to detect an event based on information from camera sensor 203, motion detector 204, or ambient light sensor 205. Server check-in module 217 may be configured to manage instances in which server 102 transmits instructions to camera unit 101. Video compression module 218 may be configured to compress video to be provided to server 102. Video capture module 219 may be configured to capture video. Device communication module 220 may be configured to manage communications (wired or wireless) with server 102, switch unit 104, or other devices. Network registration module 221 may be configured to manage a registration of camera unit 101 with server 102. Battery monitoring module 222 may be configured to monitor the status of battery 215. Multiple modules may be used together. Modules 216-222 may generally support the activities of camera unit 101 as described in processes 230, 240, and 260 below.

Figure 2K:
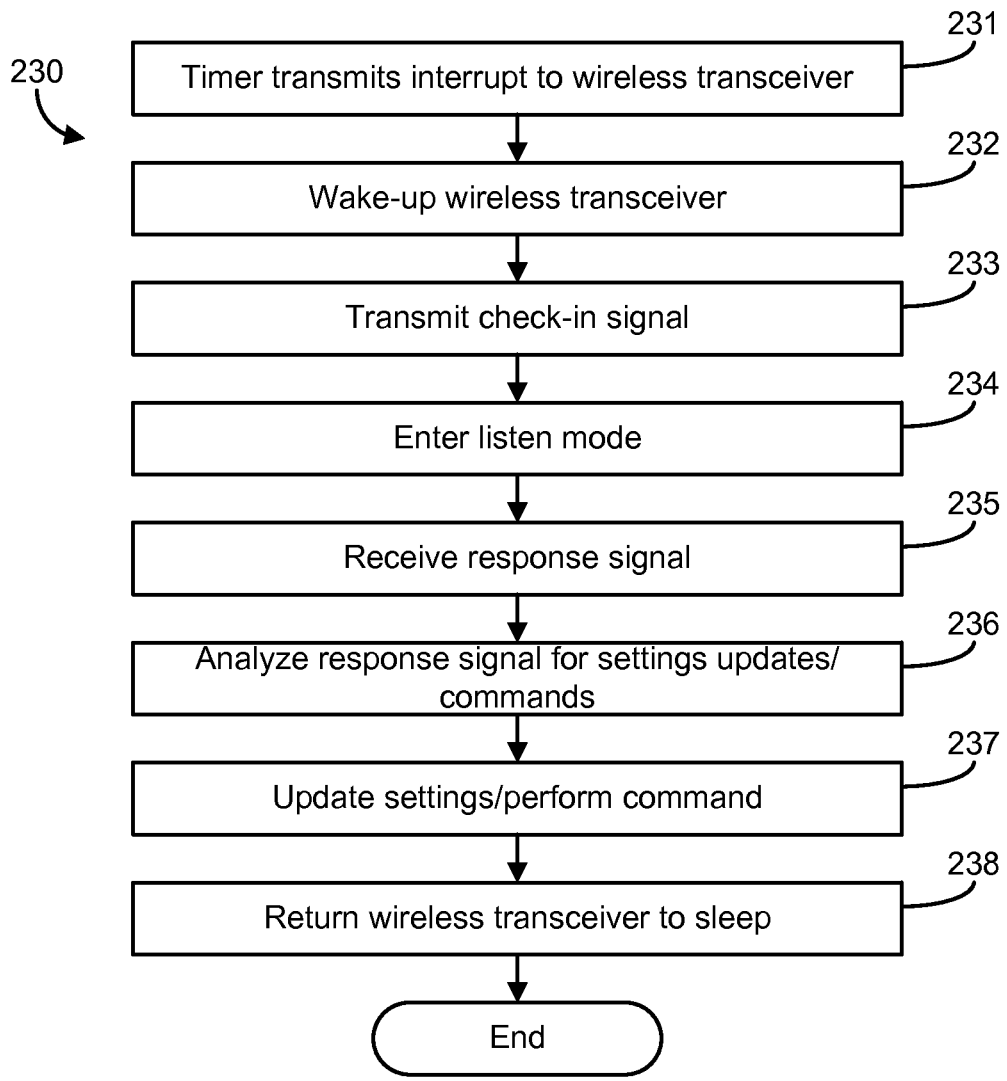
FIG. 2K is a flow diagram detailing the process of the camera unit checking in with a server.

Referring to FIG. 2K, a flow diagram of a process 230 of the device check-in process between camera unit 101 and server 102 is shown. Wireless transceiver 212 periodically wakes-up from the low-power sleep mode to check-in with server 102. The periodic check-in is a part of a process for causing camera unit 101 to maintain its association with the network access point (e.g., WiFi router) between camera unit 101 and server 102. Further, the periodic check-in can be used to transmit information such as battery information and network health information from camera unit 101 to server 102. Further, the periodic check-in provides the opportunity for server 102 to send commands and settings to camera unit 101. The commands can be or include capture requests and deactivation or activation of event detection module 216. The settings sent during the check-in period may be or include sleep timer interval, video length, video quality, camera sensor 203 light exposure setting, audio preference, and/or information pertaining to other devices on the network.

The check-in process begins when timer 211 sends wireless transceiver 212 an interrupt signal (step 231). Wireless transceiver 212 wakes from a low power or sleep mode upon receipt of the interrupt signal (step 232). After waking, wireless transceiver 212 transmits a check-in signal to server 102 (step 233). The check-in signal may include a device identification data (e.g., device MAC address). Optionally, the check-in signal includes data pertaining to camera unit 101's global IP address, local IP address, battery voltage, ambient temperature, awake time, number of server check-ins performed, amount of video data captured, amount of video data compressed, amount of video data uploaded, and/or network health information. Certain pieces of the data may be included in all check-in signals, or only a portion of check-in signals (e.g., every 12 hours, every 24 hours, every 10th signal, every 100th signal, etc.). Wireless transceiver 212 enters a listen mode to wait for a response signal from server 102 (step 234). Server 102 may send a response signal to wireless transceiver 212 (step 235). The response signal is analyzed (step 236) if it is received. The response signal may contain new settings and commands. If new settings and/or commands are included in the response signal, the internal settings (e.g., sleep wake interrupt interval of timer 211) of processing circuit 210 are updated and/or commands (e.g., a capture and upload video command or deactivate event detection module 216) are performed (step 237). After any commands are performed and any new settings are updated, wireless transceiver 212 returns to sleep (step 238) and the check-in process repeats after the designated sleep wake interrupt interval.

In some embodiments, the response signal from server 102 is optional. In such embodiments, wireless transceiver 212 remains in listen mode for a short period of time (e.g., 50 ms-1 second) before automatically returning to sleep if no response signal is received from server 102. If a response signal is received from server 102, wireless transceiver 212 functions as in the same manner as described above. If no response signal is received, the settings of the previous sleep-wake cycle are kept (e.g., sleep interrupt timing interval of timer 211), and wireless transceiver 212 returns to sleep. In yet another alternative, the wireless access point to which camera unit 101 is connected to (e.g., a wireless router) holds signals from server 102 intended for camera unit 101 and provides the signals to camera unit 101 upon check-in.

Figure 2L:
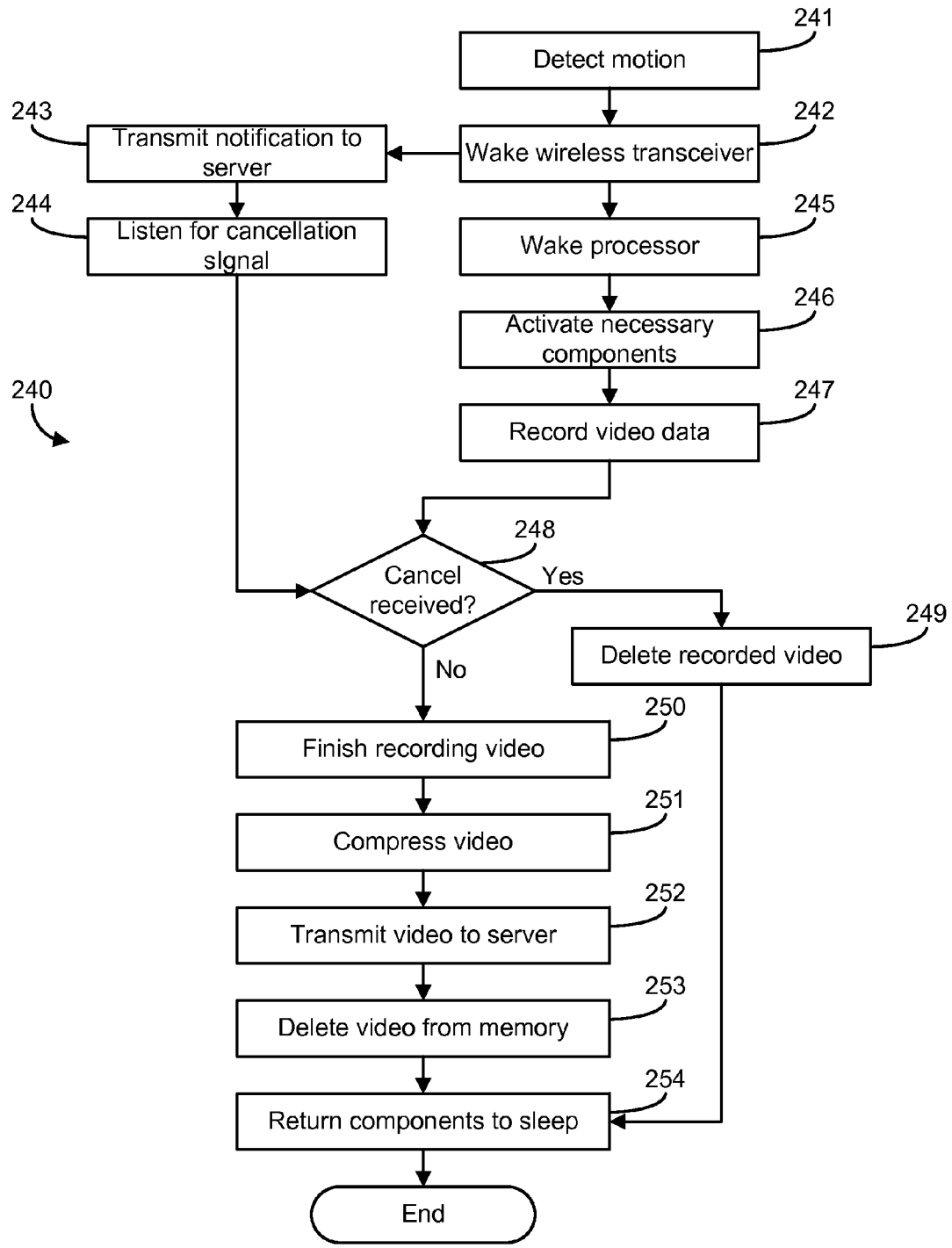
FIG. 2L is a flow diagram detailing the event detection process of the camera unit.

Referring to FIG. 2L, a flow diagram of a process 240 of camera unit 101 event detection and video upload is shown. Generally, upon detection of an event (e.g., detection of motion by motion detector 204), camera unit 101 is configured to notify server 102, to capture video through camera sensor 203, to compress the video data, and to upload the video data to server 102. More particularly, upon detection of the event (step 241), an interrupt is sent to wake wireless transceiver 212 from the sleep state (step 242). Wireless transceiver 212 transmits a notification to server 102 that indicates that an event was detected and that video data will be recorded (step 243). Wireless transceiver 212 enters a listen mode to listen for a cancellation signal or other instructions from server 102 (step 244). During or near in time to steps 243 and 244, processing circuit 210 prepares to record event video data. Accordingly, once wireless transceiver 212 wakes (step 242), wireless transceiver 212 sends an interrupt to processor 213, and processor 213 wakes (step 245). Processor 213 activates necessary components (step 246). The necessary components include at least camera sensor 203 and optionally includes ambient light sensor 205. If ambient light sensor 205 indicates a low light level, LEDs 206 are activated during recording and or camera sensor 203 settings are adjusted. Further, if audio is to be recorded (which may be selected by a user of system 100), microphone 207 is activated such that audio data is paired with the video data. Still further, speaker 208 is activated in circumstances where audio playback during a capture or during two-way audio is selected.

Camera sensor 203 begins to record video data (step 247). Video data is stored in memory 214. Video data is recorded at a VGA resolution. Alternatively, video data is recorded at a higher resolution (e.g., WVGA, SVGA, WSVGA, XVGA, WXVGA, 720p, 1080i, or 1080p). In an alternate embodiment, a first portion of the video is recorded at a first, high resolution setting (e.g., 720p, 1080i, or 1080p) and a second portion of the video is recorded at a second, low resolution setting (e.g., VGA). The first, higher resolution portion may provide the user viewing the video a clearer portion of the circumstances immediately following the trigger event. The second, lower resolution portion of the video provides continued video monitoring of the trigger event, while keeping the video file size relatively small. The duration of each segment is adjustable by the user of system 100 or is a standard setting. While the video is recording, wireless transceiver 212 continues to listen for a cancellation signal from server 102 (step 244).

If a cancellation signal is received (step 248), processing circuit 210 stops recording video and deletes any recorded video data originating from the event (step 249). Due to latency between camera unit 101 and server 102, there may be certain situations in which a user indicated that camera unit 101 should be inactive, but camera unit 101 did not receive the instruction until after the event was detected. After the video is deleted, processor 213, wireless transceiver 212, and any components turned on for the recording of and transmission of the video are returned to sleep (step 254). Further, camera unit 101 settings are updated if the cancellation signal includes updated settings. After all components are asleep, the process ends.

If a cancellation signal is not received, camera unit 101 finishes recording the video (step 250). The length of the video is determined by standard settings supplied by server 102 or by user preferences. As a standard setting, video files may be short in length (e.g., 5-10 seconds). Setting camera unit 101 to record a short video length reduces camera sensor 203 awake time, reduces video data compression time, reduces transmission time, reduces system latency, and increases battery life in comparison to a longer video length setting (e.g., 30 seconds). As noted above, captured video data may further include a varying resolution to provide a clear picture of the events immediately following the trigger event, while maintaining a small video file for quicker transmission.

Once the video is finished recording, the video data is compressed (step 251). Processing circuit 210 is programmed to compress video data according to H.264, MPEG-2, MPEG-4, or any other video compression format. The video data is compressed by processing circuit 210 according to a fixed setting every time video data is uploaded. In an alternate configuration, the compression settings are adjustable. System 100 may include a standard video compression format and settings. The user can select an alternative compression setting (e.g., a specific file type or to achieve a designated bit rate). In yet another arrangement, the compression is automatically adjusted based on a detected network status (e.g., upload speed, connection strength, network traffic, etc.). For example, camera unit 101 is configured to detect the maximum upload speed from the access point (e.g., the router to which camera unit 101 is connected) to server 102 and adjust the bit rate up or down depending on the connection bandwidth and changes in the connection bandwidth. Automatically adjusting the video compression bit rate may help ensure transmission success in situations of varying network capabilities or status.

After compression, the video file is transmitted to server 102 (step 252). Server 102 sends a confirmation signal indicating that the file transfer was successful. If the file transfer was unsuccessful, camera unit 101 attempts to send the file again. If the file transfer is again unsuccessful, camera unit 101 attempts to transmit the file to server 102 through a different mechanism of communication (e.g., through a cellular transceiver), to a backup server, or retains the file until the network connection is fixed. After a successful transmission, the video data is deleted from memory 214 (step 253), and any components turned on for the recording of and transmission of the video are returned to sleep (step 254). As discussed below with respect to FIGS. 4D-E, ordinarily, server 102 initiates a notification to the user associated with camera unit 101. Alternatively, camera unit 101 initiates an alert containing event information directly to client device 103. Optionally, a copy of the video data is stored on removable memory media (e.g., a SD memory card or a microSD memory card) prior to being deleted from onboard memory 214. After all components are asleep, camera unit 101 returns to event detection mode until another event is detected. Upon the detection of another event, the process repeats.

Optionally, camera unit 101 is configured to emit a sound upon detection of an event out of speaker 208. The sound is a siren (e.g., a fire alarm style buzzer), a loud noise, a standard message, or a customized user message. The sound is played immediately after the event is detected or after a predetermined delay (e.g., 1, 2, or 3 seconds). The predetermined delay is selected by the user. The sound data file may be pre-stored within memory 214 or may be received from server 102 (e.g., with response signal having a play command that is received by camera unit 101 after step 242). Depending on the type of sound, the sound achieves different functions. A siren or a loud noise may scare away an intruder or to cause the intruder to look at camera unit 101 such that camera unit 101 captures a clear view of an intruder's face. A standard system message alerts an intruder that video is being taken and the incident has been reported (e.g., "Alert! These premises are monitored by Master Lock! Video is being captured and the police will be alerted!"). A customized message can relate to any message to be conveyed to the person or animal triggering the event capture. For example, a user can utilize the event detection for a non-security related purpose. The user may wish to remind the person triggering the alert of a task, and the customized recorded message does so (e.g., "Welcome home, Joe. Remember to take the trash out."). Alternatively, the user may have camera unit 101 positioned in a room where a pet is not allowed. Accordingly, the user can program an audio message to the pet instructing the pet to leave the room (e.g., "Bad dog! Get out!").

Following (e.g., immediately following) event detection situations, it may be desirable to have a lower than normal latency for camera unit 101. Upon receipt of video resulting from a trigger event (e.g., motion), it may be likely that a user viewing the video will want an additional video captured. If camera unit 101 maintains a longer sleep period, there may be a significant lag between a capture request and camera unit 101 receiving the command. Accordingly, upon event detection, timer 211 sends wireless transceiver 212 interrupt signals at a higher frequency than normal for a set duration of time. For example, if timer 211 ordinarily sends an interrupt signal to wireless transceiver 212 every 55 seconds, upon a trigger event, the timing can be adjusted such that timer 211 initiates the interrupt signal every 10 seconds for the next 10 minutes. This is an optional feature of system 100, and timing (both the frequency of timer interrupts and the duration of a higher frequency) is user or system 100 adjustable.

Figure 2M:
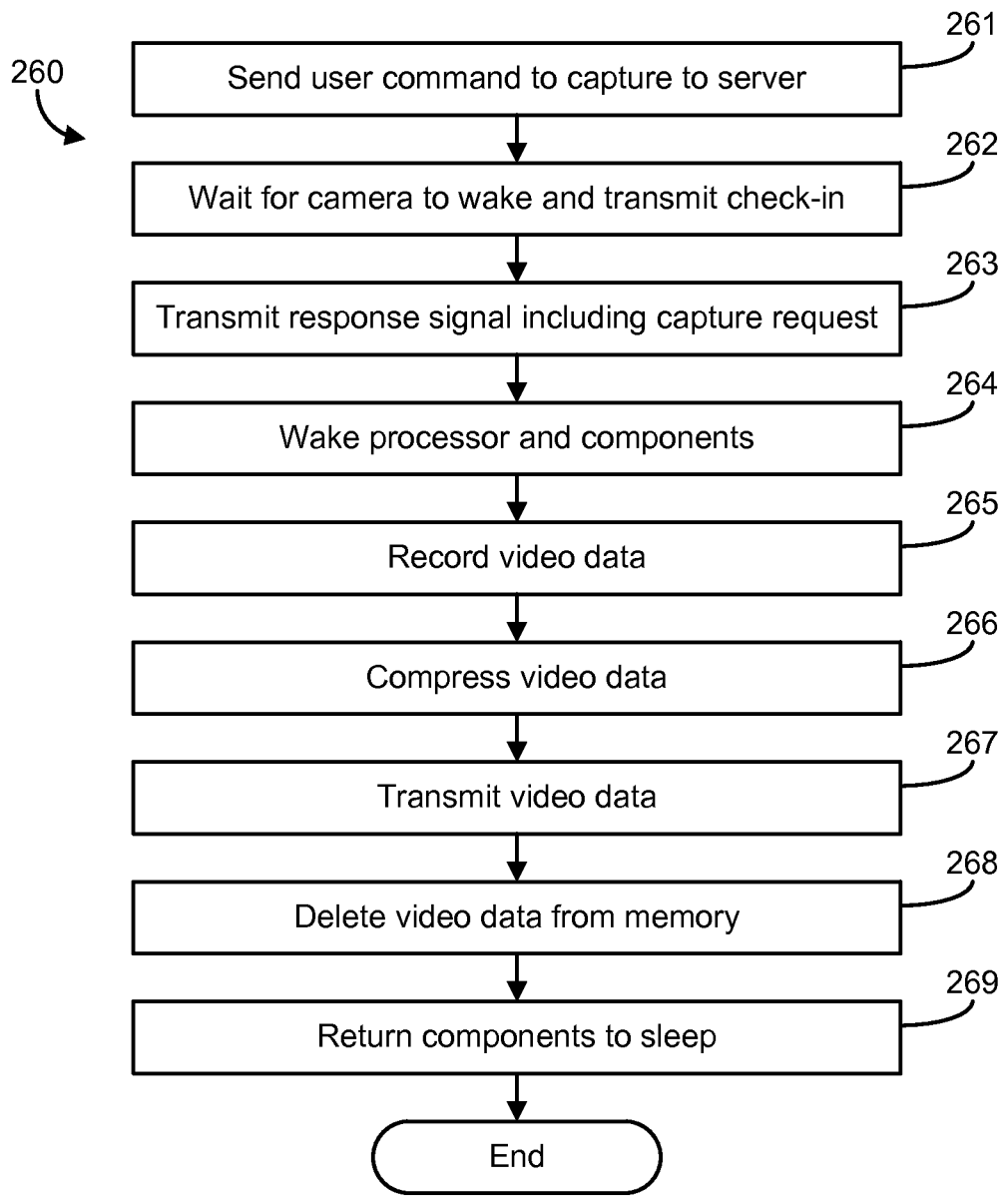
FIG. 2M is a flow diagram detailing the camera unit performing an on-demand video capture.

Referring to FIG. 2M, a flow diagram of a process 260 for camera unit 101 performing an on-demand video capture command is shown. An on-demand video capture command is sent by a user through client device 103 to server 102 (step 261). In an exemplary embodiment, client device 103 does not directly communicate with camera unit 101. Commands initiated by client device 103 are first sent to server 102 from a client device 103. In some embodiments, as described above, wireless transceiver 212 is normally in a sleep state and is only activated upon detection of an event or wake interrupt sent by timer 211. Commands from server 102 to camera unit 101 are embedded in server response signals sent during the camera check-in process (detailed above with respect to FIG. 2K). Accordingly, in these embodiments, server 102 waits for camera unit 101 to transmit a check-in signal (step 262) before transmitting the command to camera unit 101.

The wait time associated with step 261 causes latency or lag between the time of the initial user command (step 261) and the time the video is received by the client device 103. Latency of the camera unit 101 response time is based on the sleep wake interrupt interval of timer 211. A shorter time period reduces the latency of capture requests as it increases the frequency of camera unit 101 check-ins with server 102 at the expense of battery life (as components are active for a greater percentage of the battery's life).

After the server receives the check-in signal from the camera, the server transmits a response signal to camera unit 101 (step 263). The response signal may include the user command or commands to wake components, capture video, and upload the video to server 102. Upon receipt of the response signal containing the command, processor 213 and any necessary components wake from sleep mode (step 264). The necessary components include camera sensor 203 and optionally includes ambient light sensor 205. If ambient light sensor 205 indicates a low light level, LEDs 206 are activated during recording. Further, if audio is to be recorded (system 100 option selected by a user or server 102), microphone 207 is activated. Camera sensor 203 then records a video (step 265). The length of the video may be set by server 102, set by a user preference, or automatically determined (e.g., based on detected motion characteristics, based on the time of day, etc.). Once the video is finished recording, the video data is compressed (step 266). Processing circuit 210 is programmed to compress video according to H.264, MPEG-2, MPEG-4, or any other video compression format. After compression, the video file is transmitted to server 102 (step 267), where the video file is relayed to client device 103. Server 102 sends a confirmation signal indicating that the file transfer was successful. After a successful transmission, the video file is deleted from memory 214 (step 267), and any components turned on for the recording and transmission of the video are returned to sleep (step 269). After all components are asleep, the process ends.

In some embodiments, system 100 is configured to create periodic or scheduled video captures by camera unit 101. A user may program a future video capture request (e.g., on a particular date and time) or may schedule a recurring video capture request (e.g., every Monday at 2 pm) into server 102. Server 102 maintains a video capture schedule for each device and issues capture commands embedded in check-in response signals according to the schedule. Accordingly, steps 263-269 of FIG. 2M may be performed during periodic or scheduled video captures.

Switch Unit

System 100 may utilize remote devices in addition to camera unit 101. In an exemplary embodiment, system 100 is configured to have multiple remote devices and multiple types of remote devices associated with a single account. Referring to FIGS. 3A-E, switch unit 104 is shown. Switch unit 104 includes housing 301, power inlet 302, and power outlet 303. Power inlet 302 and power outlet 303 are shown as a grounded NEMA (National Electrical Manufacturers Association) type plug and socket. However, switch unit 104 can accept any type of plug and socket, including standardized and proprietary plug and socket configurations.

Power inlet 302 can have a first configuration and power outlet 303 can have a second, non-matching configuration such that switch unit 104 serves as a power converter and/or power adapter. Switch unit 104 is a power relay between a power source and a power load. For example, switch unit 104 can be plugged into a power outlet and receive the plug of an electrical device, such as a light. When certain conditions are detected by switch unit 104, switch unit 104 opens or closes the power circuit such that the light is turned on or off Switch unit 104 further includes user input element 304. User input element 304 is a mechanical button, a mechanical switch, a capacitive touch sensor, or a resistive touch sensor. In operation, user input element 304 may be used during the device network registration process. Further, user input element 304 may be used as a manual override to activate or deactivate an electrical device plugged into power outlet 303. Switch unit 104 also includes microphone 305 and speaker 306. Microphone 305 is used to detect environmental noises. For example, and as discussed below, switch unit 104 is capable of detecting an audible alarm (e.g., fire alarm), and triggering an alert to server 102 and/or activating an electrical device plugged into power outlet 303. As shown in FIGS. 3A-E, switch unit 104 does not include additional sensors such as a motion sensor or an ambient light sensor; however, in other embodiments such sensors are optionally included.

Figure 3B:
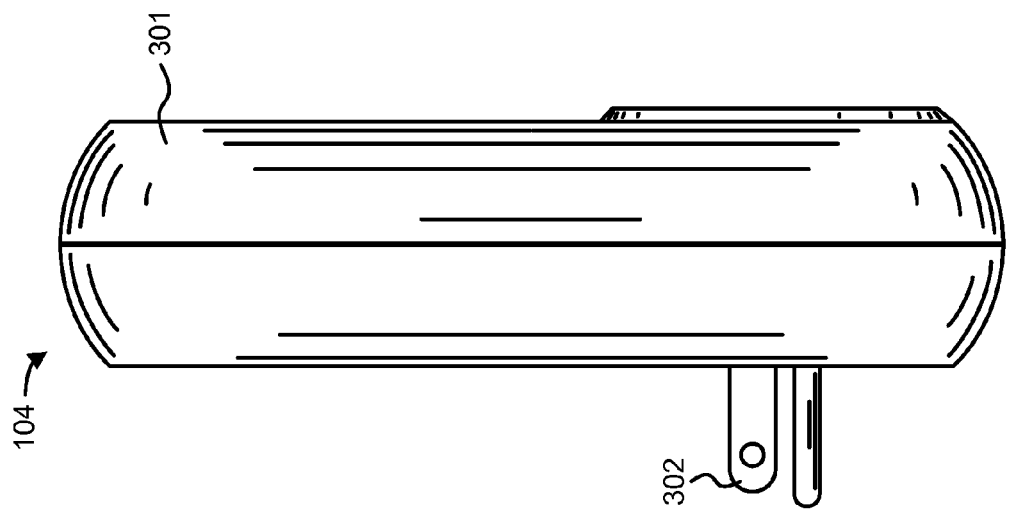
FIGS. 3A-E are detailed views of an exemplary embodiment of a switch unit.
Figure 3A:
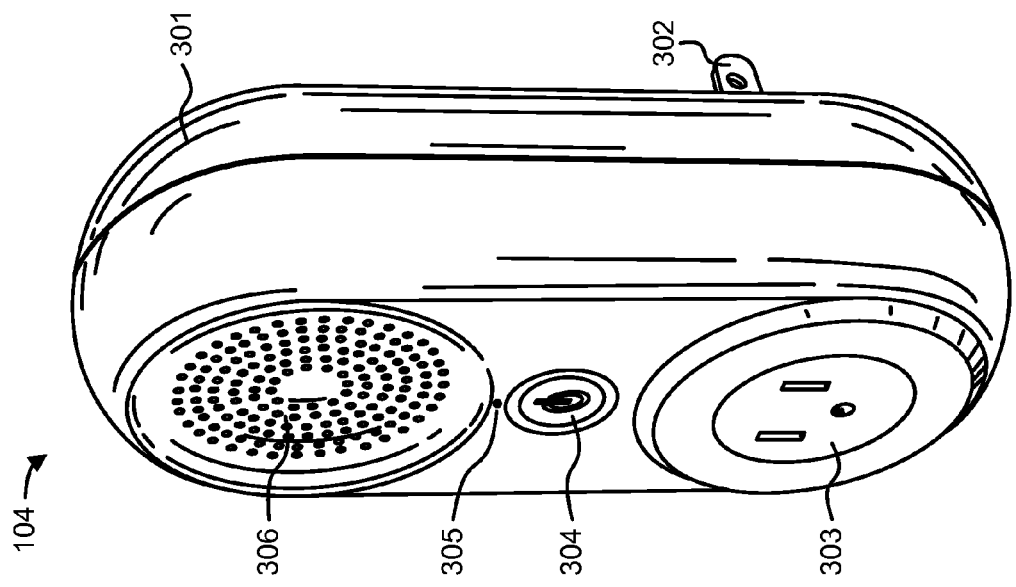
Figure 3C:
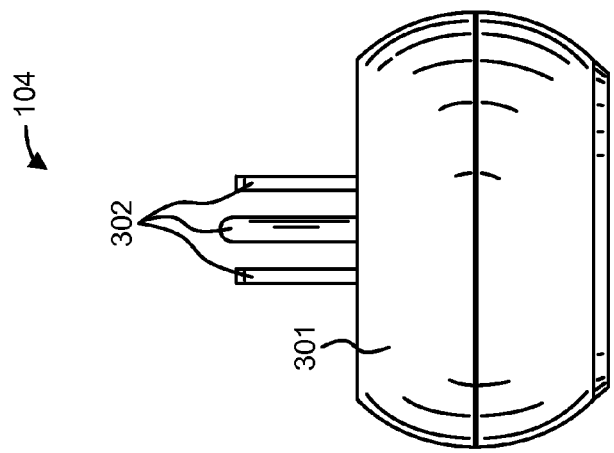
Figure 3D:
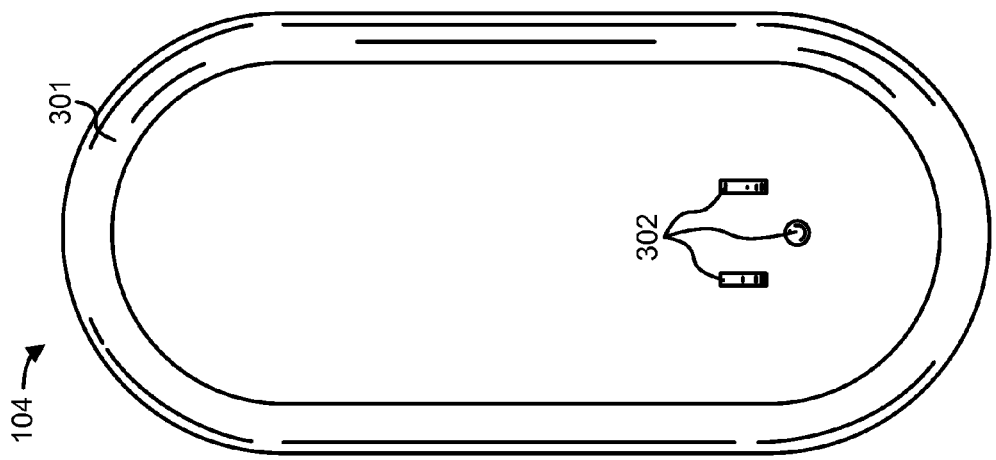
Figure 3E:
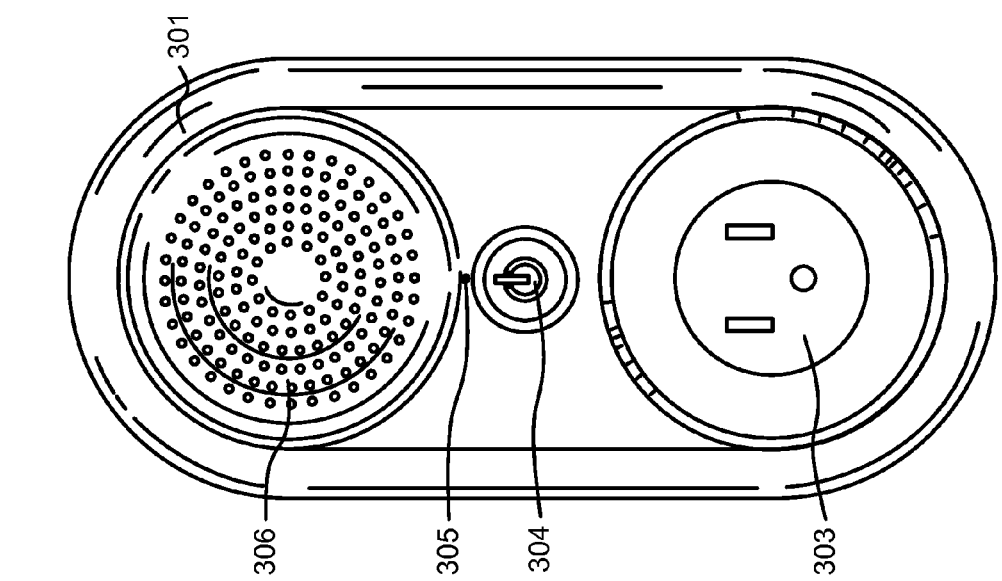
Figure 3F:
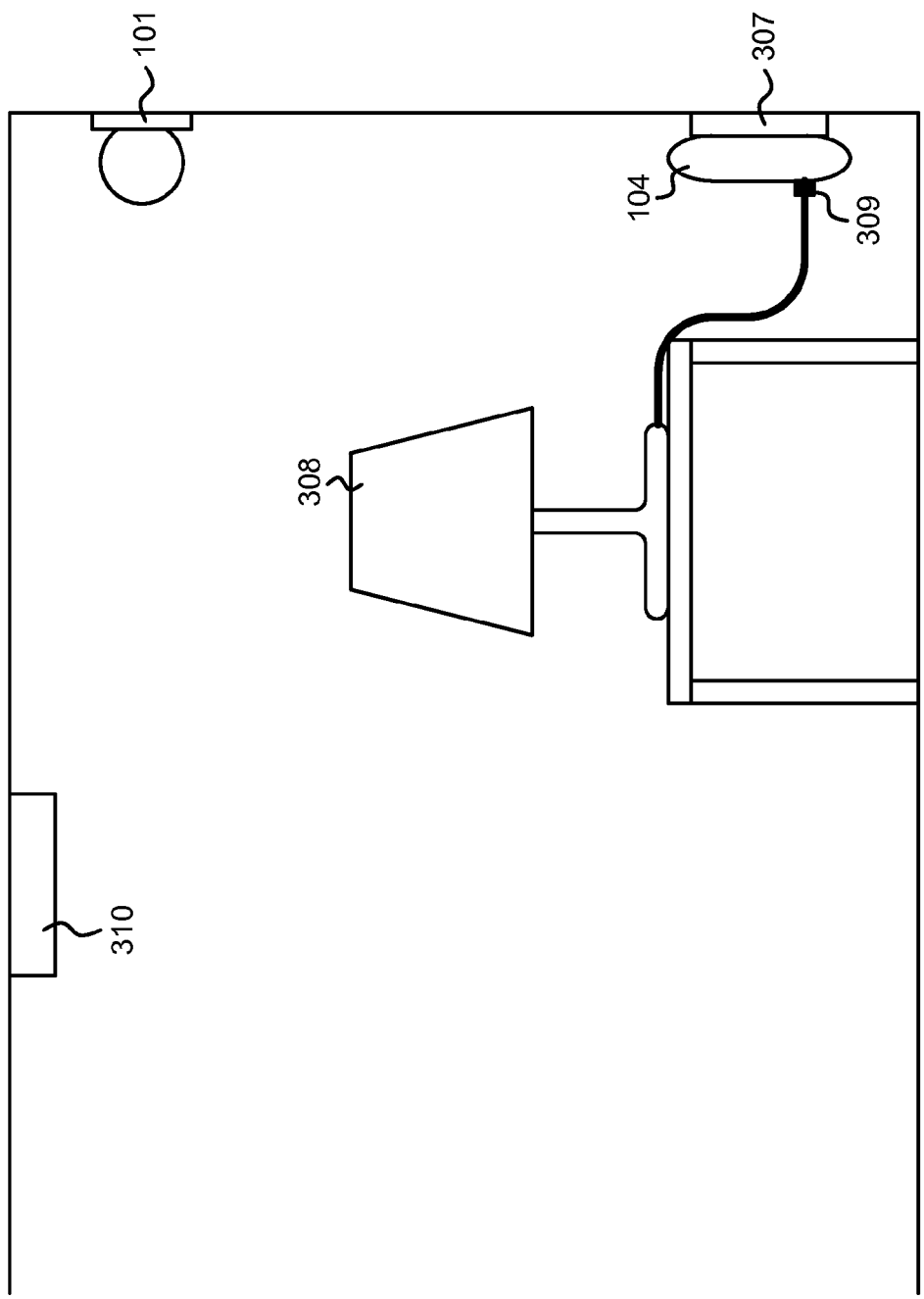
FIG. 3F is a detailed view of a typical switch unit placement.

Referring to FIG. 3F, a switch unit 104 is shown. Switch unit 104 plugs into a power outlet 307 (e.g., a power outlet located on a wall of a room). An electrical device, shown as lamp 308, connects to switch unit 104 when plug 309 is received in power outlet 303. Accordingly, when lamp 308 is electrically activated, power flows from power outlet 307, through switch unit 104, to lamp 308. Lamp 308 is automatically activated when certain events occur. For example, alarm unit 310 is located within an audible zone of detection of switch unit 104 and is configured to output an audible alarm if an event is detected (e.g., a smoke alarm emits a siren if a threshold level of smoke is detected). If alarm unit 310 is emitting the audible alarm, switch unit 104 detects the alarm, alerts server 102 of the alarm, and activates lamp 308. Switch unit 104 can also directly or indirectly send a capture request to an associated camera unit 101 if an alarm is detected. Further, lamp 308 may be automatically activated if associated camera unit 101 detects motion. In this case, camera unit 101 may directly (e.g., send a signal through a local network via a router) or indirectly (e.g., send a signal first to server 102 which then sends a signal to switch unit 104) send an activation signal to switch unit 104. The switch unit 104 and camera unit 101 associations are designated by the associated user of system 100. Additionally, lamp 308 may be manually activated by the user through user interaction with user input 304.

Figure 3G:
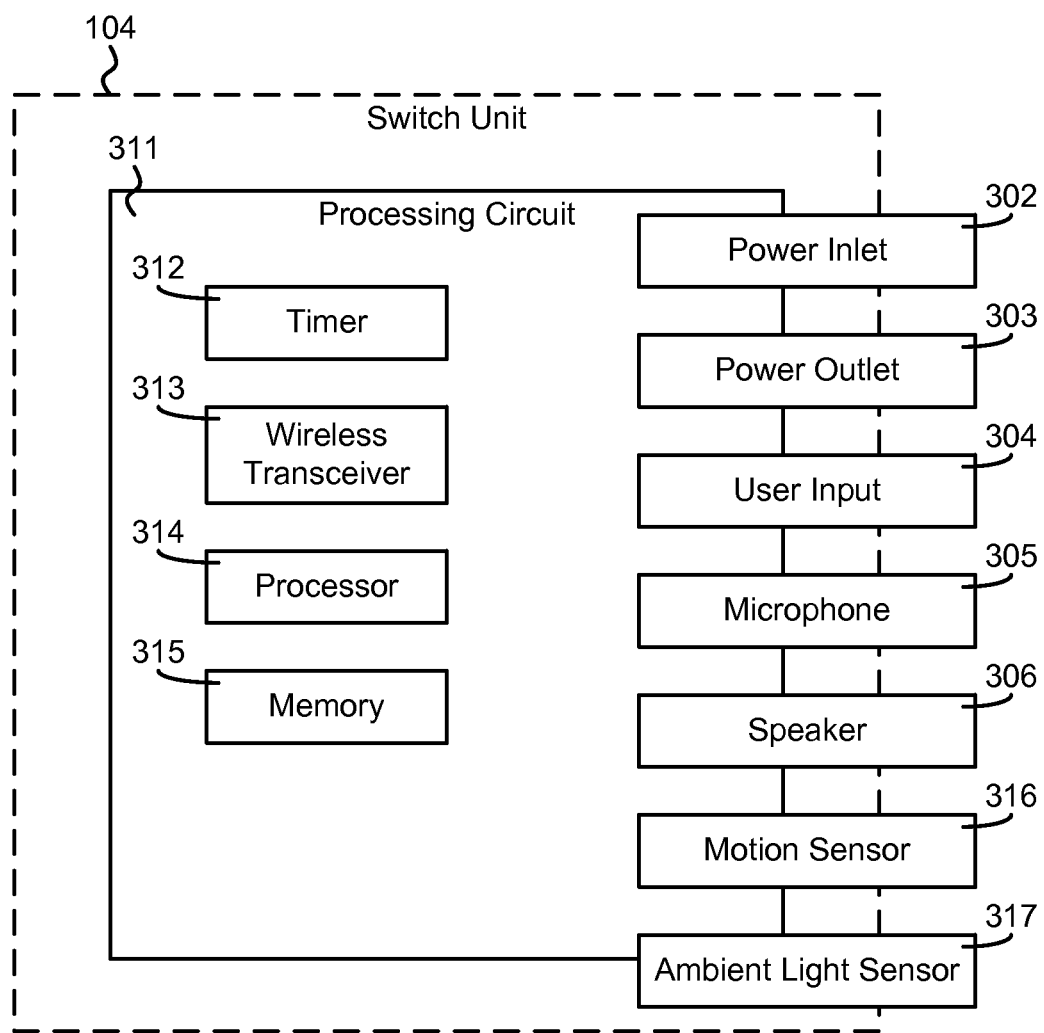
FIG. 3G is a block diagram of the switch unit.

Referring to FIG. 3G, a block diagram of switch unit 104 is shown. Switch unit 104 includes processing circuit 311. Processing circuit 311 controls the operation of switch unit 104. Accordingly, processing circuit 311 includes at least timer 312, wireless transceiver 313, processor 314, and memory 315. Wireless transceiver 313 is configured to send and receive data to and from server 102. Wireless transceiver 313 utilizes a version of the 802.11 standard networking protocol (e.g., 802.11a/b/g/n). Alternatively, wireless transceiver 313 utilizes other standard networking protocols, including, but not limited to CDMA, GSM, LTE, Bluetooth®, ZigBee®, and 802.15. Switch unit 104 receives operating power from power inlet 302, and battery life is not a concern for switch unit 104 as in camera unit 101. Thus, wireless transceiver 313 is configured to be active at all times to reduce the latency between server 102 and switch unit 104. In some situations, switch unit 104 is configured to utilize a reduced amount of power. Accordingly, processing circuit 311 optionally includes timer 312 to activate wireless transceiver 313 from a low-power sleep mode in the same manner as discussed above with respect to camera unit 101, wireless transceiver 212, and timer 211. Memory 315 stores recorded audio, operating instructions, and any necessary software modules. Processing circuit 311 includes and/or communicates with power inlet 302, power outlet 303, user input 304, microphone 305, and speaker 306. Switch unit 104 optionally includes motion sensor 316 and/or ambient light sensor 317, also part of and/or in communication with processing circuit 311. Switch unit 104 utilizes motion sensor 316 and ambient light sensor 317 as additional environmental triggers for activation of the power load.

Figure 3H:
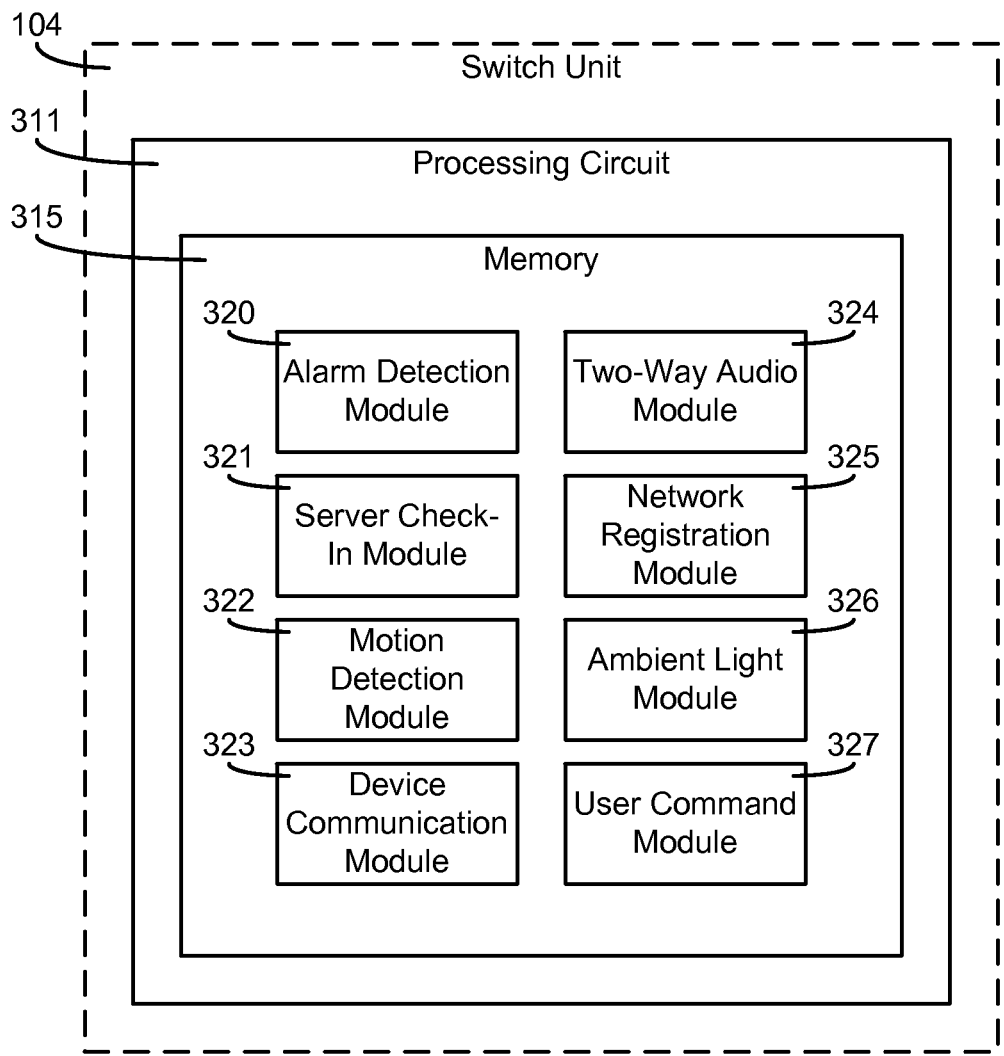
FIG. 3H is a block diagram of memory modules of the switch unit.

Referring to FIG. 3H, a block diagram of modules stored on switch unit 104 is shown. Modules are stored in memory 315 contained on processing circuit 311. The modules include all instructions necessary to run switch unit 104. Modules include alarm detection module 320, server check-in module 321, motion detection module 322, device communication module 323, two-way audio module 324, network registration module 325, ambient light module 326, and user command module 327. Alarm detection module 320 may be configured to manage switch unit 104 operation when an alarm is received. Server check-in module 321 may be configured to manage communications with server 102. Motion detection module 322 may be configured to manage switch unit 104 interaction with camera unit 101 and server 102 when motion is detected by an object coupled to switch unit 104 (e.g., lamp 308). Device communication module 323 may be configured to facilitate communications with camera unit 101 and server 102. Two-way audio module 324 may be configured to detect an audible alarm. Network registration module 325 may be configured to manage a registration of switch unit 104 with server 102. Ambient light module 326 may be configured to control ambient light sensor 317 providing ambient light. User command module 327 may be configured to receive and interpret user input 304. Modules on switch unit 104 may operate in concert.

In some arrangements, server check-in module 319 is inactive. As noted above, in some embodiments switch unit 104 is mains powered. In such embodiments, wireless transceiver 313 is always awake and listening for signals from server 102 or other devices on the local network. In this setup, timer 315 may be inactive or not physically present on processing circuit 311. Alternatively, switch unit 104 may utilize a power-save functionality in which wireless transceiver 313 periodically switches from a low-power sleep mode to a transmit and listen mode upon receipt of an interrupt signal sent from timer 315. In this case, wireless transceiver 313 and timer 315 may function in the same manner as wireless transceiver 212 and timer 211 of camera unit 101 (as described with respect to FIG. 2J above). Accordingly, switch unit 104 can periodically perform the same check-in procedure with server 102. One difference in the check-in procedure between camera unit 101 and switch unit 104 is a difference in the types of instructions switch unit 104 is operable to perform (e.g., activating the attached electrically powered device or transmitting audio instead of capturing a video clip).

System Server

Figure 4A:
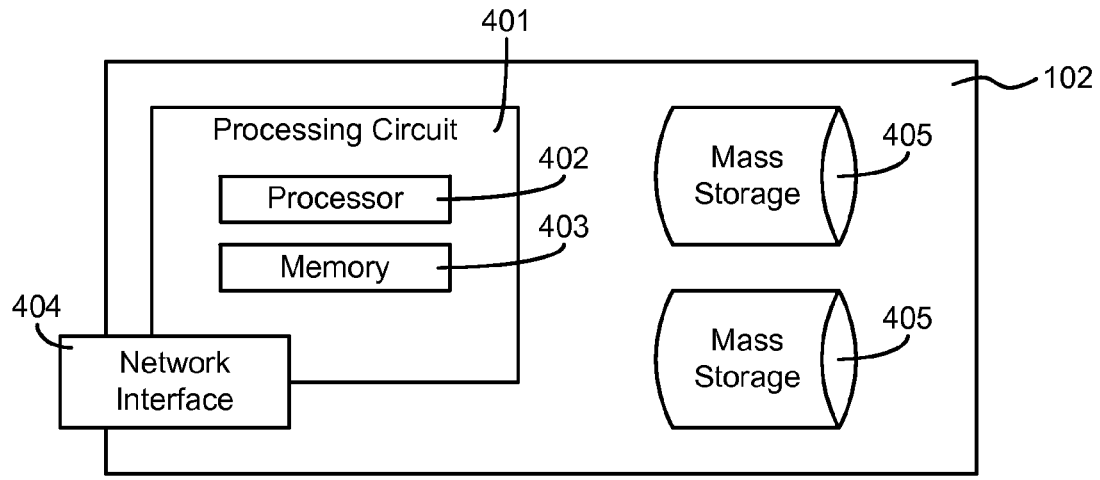
FIG. 4A is a block diagram of an exemplary embodiment of a system server.

Referring to FIG. 4A, a block diagram of server 102 is shown. Server 102 includes processing circuit 401. Processing circuit 401 includes processor 402 and memory 403. Server 102 includes network interface 404. Network interface 404 enables data transfer and communication between server 102, camera unit 101, and client device 103. Network interface 404 further provides communication with outside devices, servers, systems, and services to facilitate notification and alert delivery. Network interface 404 connects to a network either through a wired or wireless network connection. Server 102 includes mass storage units 405. Mass storage units 405 and memory 403 store databases and modules for the operation of system 100.

Figure 4B:
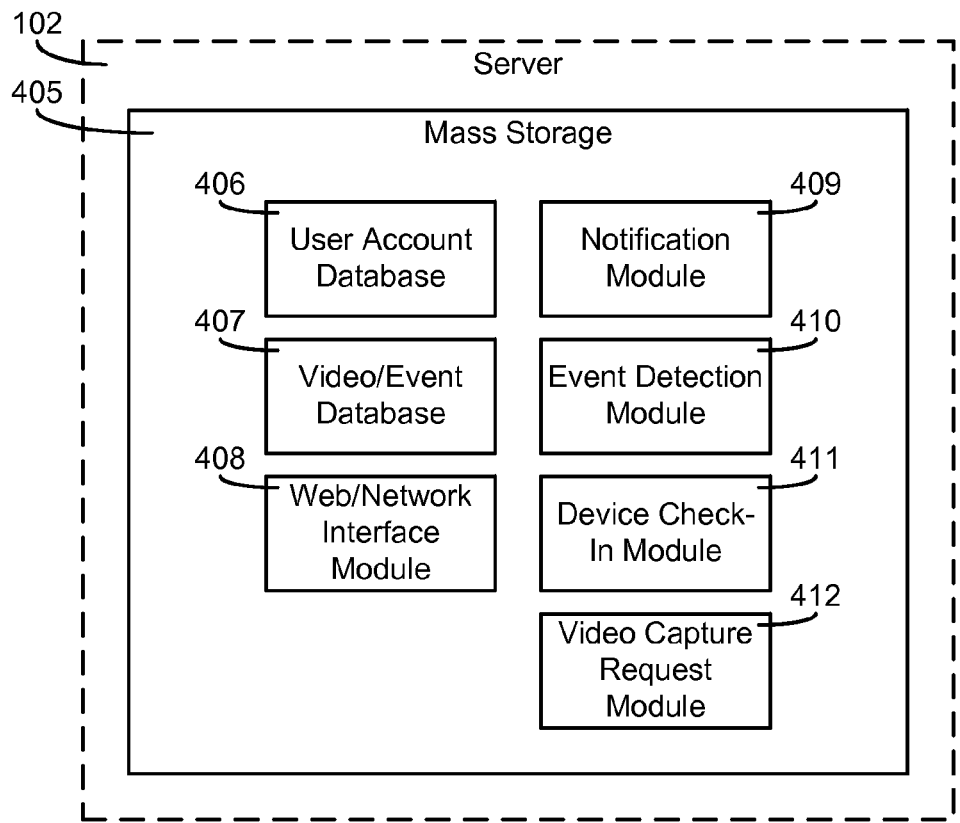
FIG. 4B is a block diagram of memory modules of the system server.

Referring to FIG. 4B, a block diagram of modules and databases stored on server 102 is shown. Mass storage units 405 and/or memory 403 store user account database 406 and video/event database 407. User account database 406 maintains information pertaining to all registered users of system 100. When registering to use system 100, each user must provide contact information, such as name, location addresses, e-mail address, and telephone numbers. Additionally, each user associates devices with a registered location (e.g., a camera unit with a home or office). Further, each user provides notification preferences for detected event notifications, status alerts, and/or alarm notifications. All of the above user information, as well as any additional user information, is stored in user account database 406. Video/event database 407 stores all event content and data. As discussed above, remote sensors and devices (e.g., camera unit 101) detect events and capture event data pertaining to the event. The event data is uploaded to server 102, and stored for user retrieval in video/event database 407. System 100 may periodically delete video data that has not been marked by a user for storage (e.g., video data older than 2 months). In an exemplary embodiment, the user can indicate that certain video data and event data is to be transferred to online cloud storage or to local mass storage devices off of server 102 prior to automatic deletion.

Memory 403 and or mass storage units 405 store program modules. Some server program modules represent server counterparts to program modules 216-222 of camera unit 101 and modules 320-327 of switch unit 104. Server modules include web and network interface module 408, notification module 409, event detection module 410, device check-in module 411, and video capture request module 412. Web and network interface module 408 causes the display of and control of any interactive graphical user interfaces (see, e.g., FIG. 6A through FIG. 6F). Web and network interface module 408 may include user interfaces for mobile devices, tablet computing devices, and website interfaces accessible on any Internet connected computing device. The user interfaces of system 100 are presented to users of system 100 through client device 103. Notification module 409 may be configured to manage notifications provided to camera unit 101, and event detection module 410 may be configured to determine an event based on information from camera unit 101. Event detection module 410 works with notification module 409. Device check-in module 411 may be configured to manage device check-ins. Video capture request module 412 may be configured to manage video capture requests sent to camera unit 101. Modules 408-412 may generally support the activities of server 102 as described in processes 420, 430, 440, 450 below.

Figure 4C:
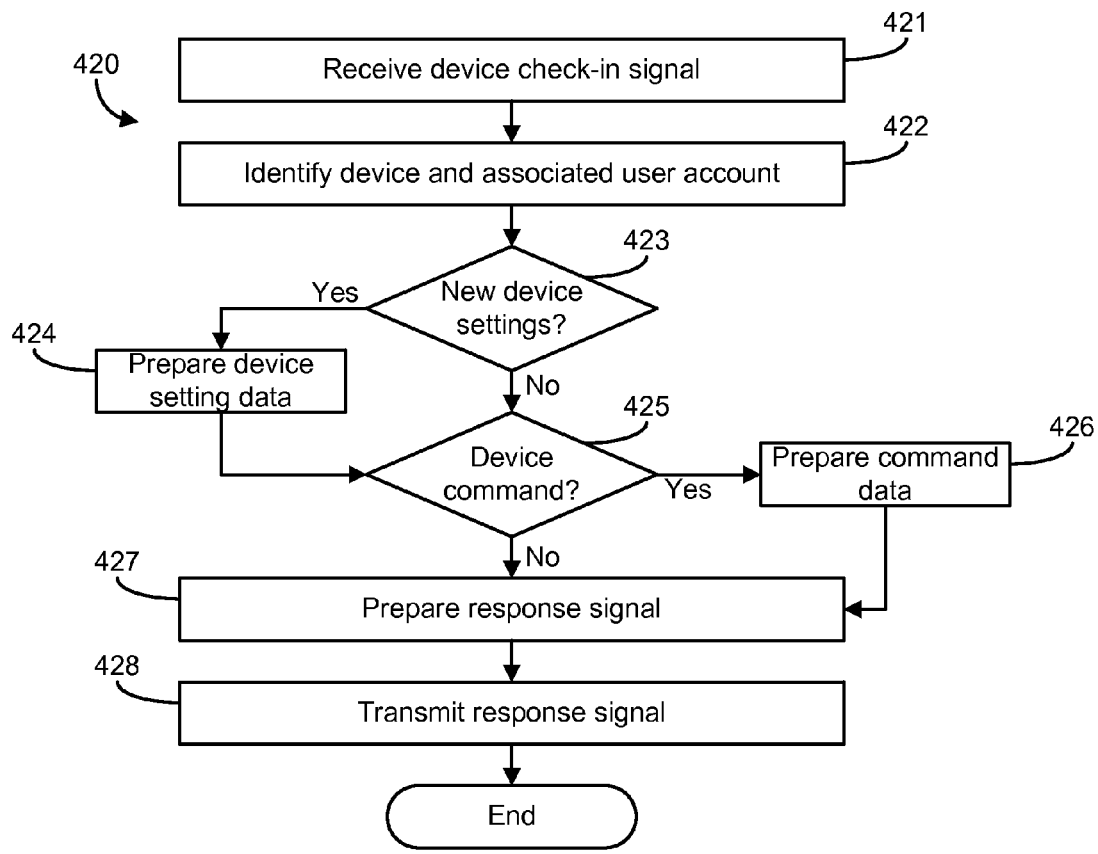
FIG. 4C is a flow diagram detailing the device check-in process from the perspective of the server.

Referring to FIG. 4C, a flow diagram of a device check-in process 420 is shown from the perspective of server 102. As discussed above with respect to camera unit 101 and switch unit 104, devices of system 100 (e.g., camera unit 101, switch unit 104, security sensors, etc.) periodically check-in with server 102 to receive updated settings, to receive commands, and to maintain network associations while maximizing battery life. The check-in process begins when server 102 receives a device check-in signal (step 420). Server 102 processes the check-in signal to identify the device and the user account associated with the device (step 421). The check-in signal generally includes a device identifier (e.g., MAC address). Additionally, the check-in signal optionally includes global IP address, local IP address, battery voltage, ambient temperature, awake time, number of server check-ins performed, amount of video data captured, amount of video data compressed, amount of video data uploaded, and/or network health. Accordingly, server 102 extracts the identification number of the device and searches user account database 406 to identify the device and the user account associated with the device. Server 102 then determines if there are updated settings for the device (step 423). Updated settings include any new settings input by the user. A user may wish to adjust the latency of the device, and accordingly, the updated setting relates to a new wake-up interval (e.g., interrupt signal interval of timer 211). A user may wish to deactivate or activate event detection by the device (e.g., turn off or on motion detector 204 of camera unit 101), and accordingly, the updated setting relates to activating or deactivating event detection of a device. Further, server 102 may detect that the battery of the device is reaching a critically low level, in which case the updated setting relates to increasing battery efficiency. Increased battery efficiency is generally accomplished by increasing the latency of the device and/or disabling non-essential features of the camera device (e.g., ambient light sensor 205, LEDs 206, and microphone 207 of camera unit 101). If server 102 identifies new device settings, server 102 prepares a new settings instruction including device settings for later transmission to the device in a response signal (step 424).

Server 102 determines if there is a pending user command waiting for the device (step 425). As discussed above, a user does not communicate directly with a device of system 100 (e.g., a user cannot send a capture command directly from client device 103 to camera unit 101). Accordingly, the user first sends the command to server 102. A user may input a command through a system 100 application or website as viewed on client device 103. A user command relates to a device function. For example, a user can send a capture request to camera unit 101. Server 102 stores the command in user account database 406 for transmission to the device during the next check-in. Accordingly, after receipt of the device check-in signal, server 102 queries user account database 406 for pending device commands. If a matching device command is identified, server 102 prepares user command instruction including the device command for later transmission to the device in the response signal (step 426).

Server 102 prepares the response signal to be transmitted to the device (step 427). The response signal includes an acknowledgment that the check-in was received. Further, the response signal includes any new settings and user commands identified in steps 423 and 425 and prepared in step 426. If no new settings or commands were identified, commands and settings are not included in the response signal. The response signal may also include the next wake timer interval. The prepared response signal is then transmitted to the device (step 428). The process is repeated for each check-in signal.

In an alternative embodiment, the response signal transmission to a device (e.g., camera unit 101) is conditional. Accordingly, if no new device settings are identified at step 423 and no device commands are identified at step 425, server 102 does not send a response signal to the device. In this situation, the device remains in a listen mode for a short period of time before automatically returning to sleep if no response signal is received from server 102 (as discussed above). If a response signal is transmitted by server 102, the device updates settings and/or performs the command in the response signal in the same manner as described above. If no response signal is transmitted by server 102, the device retains the same settings utilized during the previous sleep-wake cycle and the device returns to sleep.

Figure 4D:
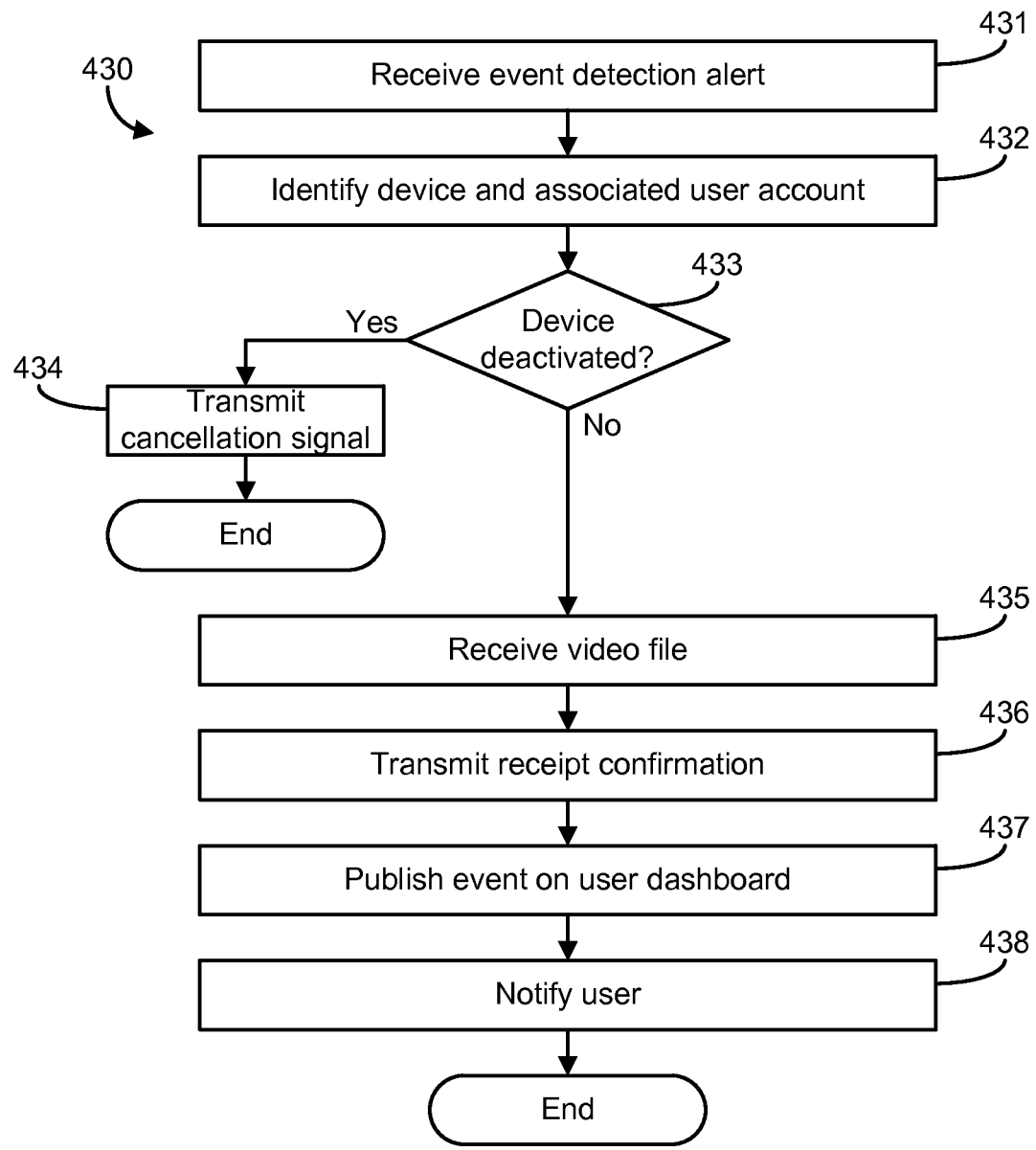
FIG. 4D is a flow diagram detailing the event detection process from the perspective of the server.

Referring to FIG. 4D, a flow diagram of an event detection process 430 from the perspective of server 102 is shown. Server 102 is first alerted that an event was detected when an event detection notification from a device (e.g., camera unit 101) is received (step 431). The event detection notification includes a remote device identifier (e.g., MAC address) and information pertaining to the event (e.g., type of event detected and any action being taken by the device). Server 102 processes the event detection notification and identifies the device and the user account associated with the device (step 432). Server 102 queries user account database 406 to determine if the user deactivated event detection for the device after the previous check-in (latency of system 100 as described above with respect to FIG. 4C) (step 433). Due to device latency, it is possible for a remote device to remain active even though the associated user indicated that the device is to be inactive. If the device is supposed to be inactive, server 102 transmits a cancellation signal to the device (step 434), and the event detection is notification is disregarded.

If the device is properly active, server 102 does not transmit a cancellation signal and waits until it receives a content file (e.g., video file) from the device (step 435). In some arrangements, server 102 transmits a confirmation signal to the remote device (e.g., camera unit 101) including a file name such that the event data is named according to the file name prior to the data being uploaded. Upon successful receipt of the content file, server 102 transmits a confirmation signal to the device (step 436). At this point, the device's duties during event detection cease, and the device returns to a sleep state. Server 102 publishes an event posting including the event content file on the associated user's dashboard (step 437). The dashboard may be any of a general user account dashboard, a device-specific dashboard, or a location-specific dashboard. The event postings provide the user a graphical interface displaying all events in a chronological order (see FIG. 6F). After publishing the event posting, server 102 notifies the associated user if at least one notification channel is enabled (step 438). The notification procedure is detailed below with respect to FIG. 4E. After notification, the event detection process is complete.

Figure 4E:
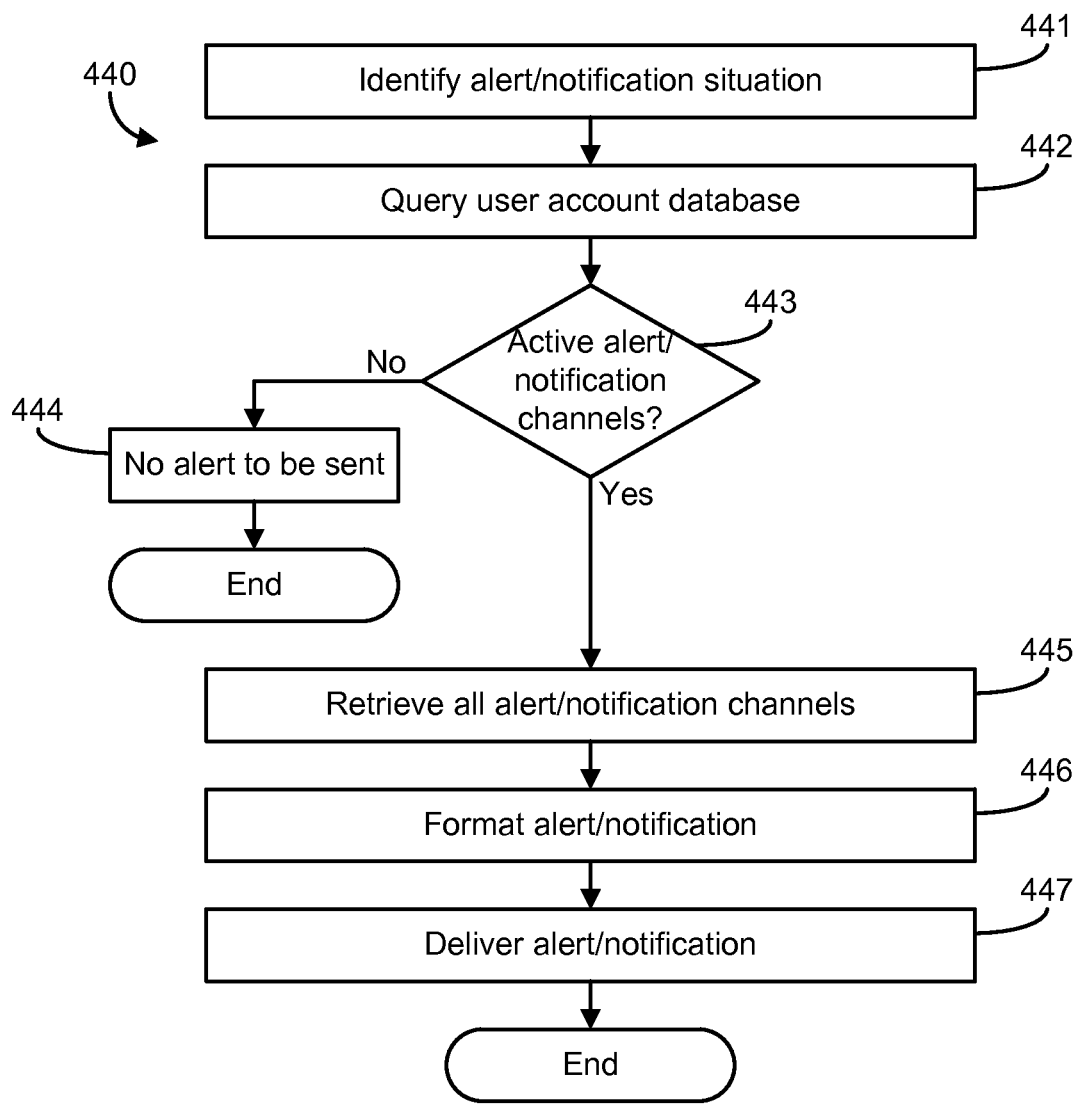
FIG. 4E is a flow diagram detailing the user notification process from the perspective of the server.

Referring to FIG. 4E, a flow diagram of a notification process 440 is shown, according to an exemplary embodiment. Server 102 sends notifications or alerts to registered users by running instructions contained within notification module 409. Notification module 409 instructions are performed when an event is detected or a system status alert is identified (step 441). The detected event (e.g., motion triggered video from camera unit 101) or the identified system status alert (e.g., low battery level or poor network condition) is associated with at least one user account. Server 102 queries user account database 406 to identify the associated user's notification preferences (step 442). Server 102 determines whether the user has no notification channels, a single notification channel, or multiple notification channels configured with system 100 (step 443). Some users may have no notification channels configured or all configured notification channels disabled. If no notification channels are configured or active, an alert is not sent (step 444). If a notification channel is configured and active, server 102 retrieves all channels of notification (step 445).

Server 102 formats a notification message for each configured and active notification channel (step 445). As noted above, a user of system 100 can configure and enable alerts through multiple channels, including, but not limited to: SMS, MMS, telephone call, e-mail, social media message, and/or application push notifications. Each notification channel has different capabilities. For example, SMS messages are limited to text, while MMS messages may include video, picture, and audio data in addition to text. A user of system 100 can use default alert messages, or can program custom alert messages. Default alert messages are the standard notification message format for system 100. A default alert message may include text indicating the detected event or identified status, the location of the event (e.g., home, office, etc.), and an embedded URL or link to the event or status listing on the user's dashboard. For voice notifications over telephone, the standard message without the text of the URL or link is read to the user upon answering the phone or to the user's answering system upon detection of an answering system beep or tone. The standard notification format is not limited to the above discussed format. The standard notification format may include only the URL or link, or may include only the necessary text. In certain situations, the URL or link to the event or status listing is embedded in the message such that the user is automatically directed to the event listing in the user's dashboard (e.g., a smartphone push notification automatically opens a system 100 application on the smartphone upon selection of the notification). Further, a user can customize the standard notification message on a channel-by-channel basis such that additional information or content is delivered with the notification (e.g., content data is attached directly to a MMS or e-mail message such that the data can be viewed without accessing system 100). After the notification messages are formatted, the notification messages are delivered to the user (step 447). In delivering the notification messages, server 102 communicates with any necessary message delivery services (e.g., e-mail service, SMS service, telephone dialing service, etc.) through network interface 404.

Figure 4F:
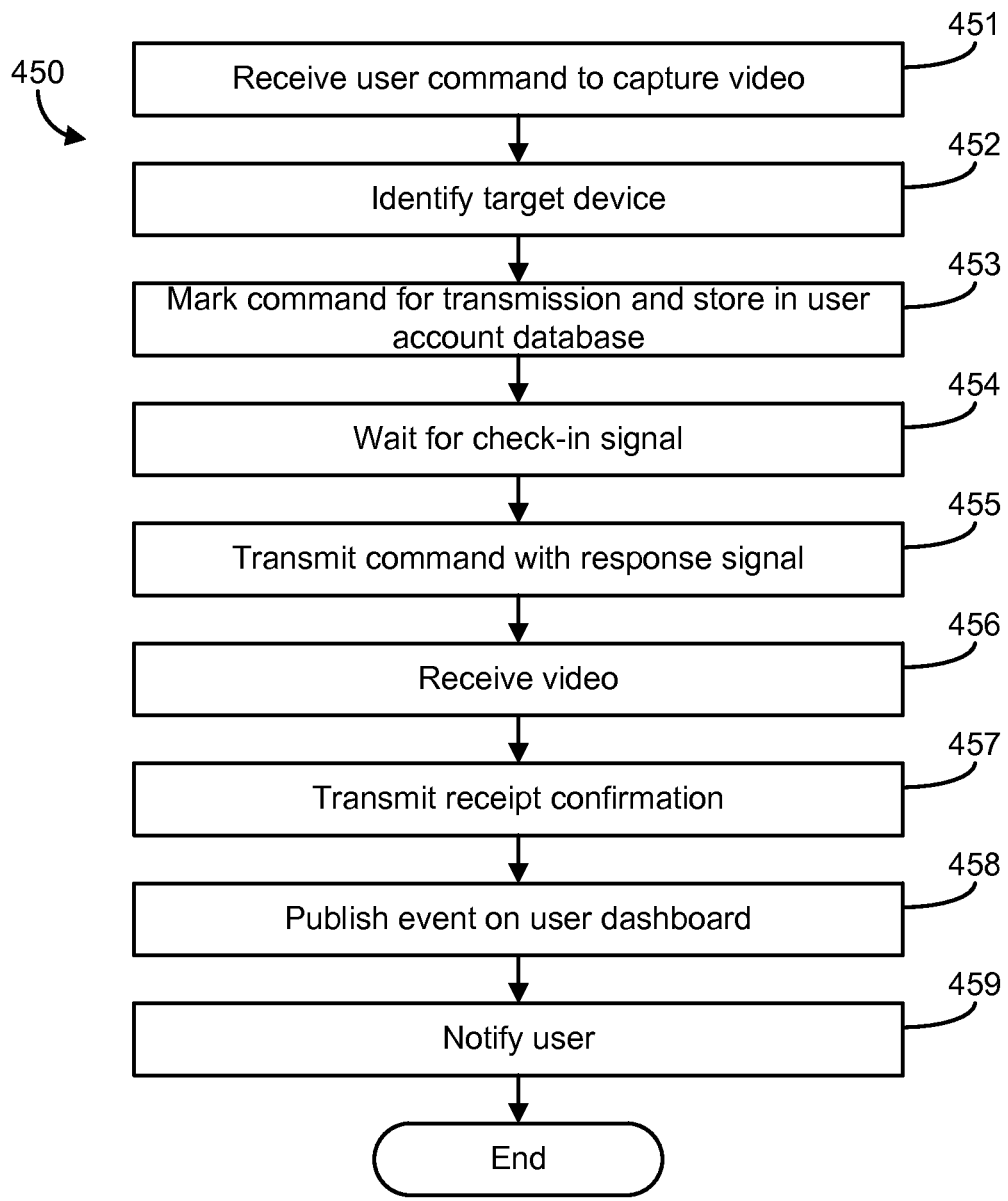
FIG. 4F is a flow diagram detailing the on-demand video capture process from the perspective of the server.

Referring to FIG. 4F, a flow diagram of a process 450 of the on-demand video capture request is shown from the perspective of server 102. The on-demand video capture command is initiated by a user through a client device 103 and is received at server 102 (step 451). The capture command signal includes capture parameters (e.g., video length, target device identification, audio on/off, etc.). Server 102 analyzes the capture command and identifies the target device (step 452). Server 102 marks the command for transmission and places the command data in user account database 406 (step 453). Server 102 cannot initiate communication with the target device. Server 102 must wait to receive a check-in signal from the target device (step 454). Server 102 packages the video capture command with the check-in response signal along with any video capture parameters and transmits the response signal containing the capture command to the target device (step 455).

After transmission of the response signal, the target device processes the command, captures the video, compresses the video, and transmits the video to server 102 (see FIG. 2M). Accordingly, server 102 receives the video file (step 456). Upon successful receipt of the content file, server 102 transmits a confirmation signal to the device (step 457). At this point, the device's duties during video capture cease and the device returns to a sleep state. Server 102 publishes an event listing including the event content file on the associated user's dashboard or the associated user's location's dashboard (step 458). The event listings can provide the user an interactive graphical interface displaying all events in a chronological order (see FIG. 6F). After publishing the event posting, server 102 notifies the associated user (e.g., if at least one notification channel is enabled) (step 459). The notification procedure is detailed above with respect to FIG. 4E. After the notification step, the event detection process is complete.

Client Device

Figure 5A:
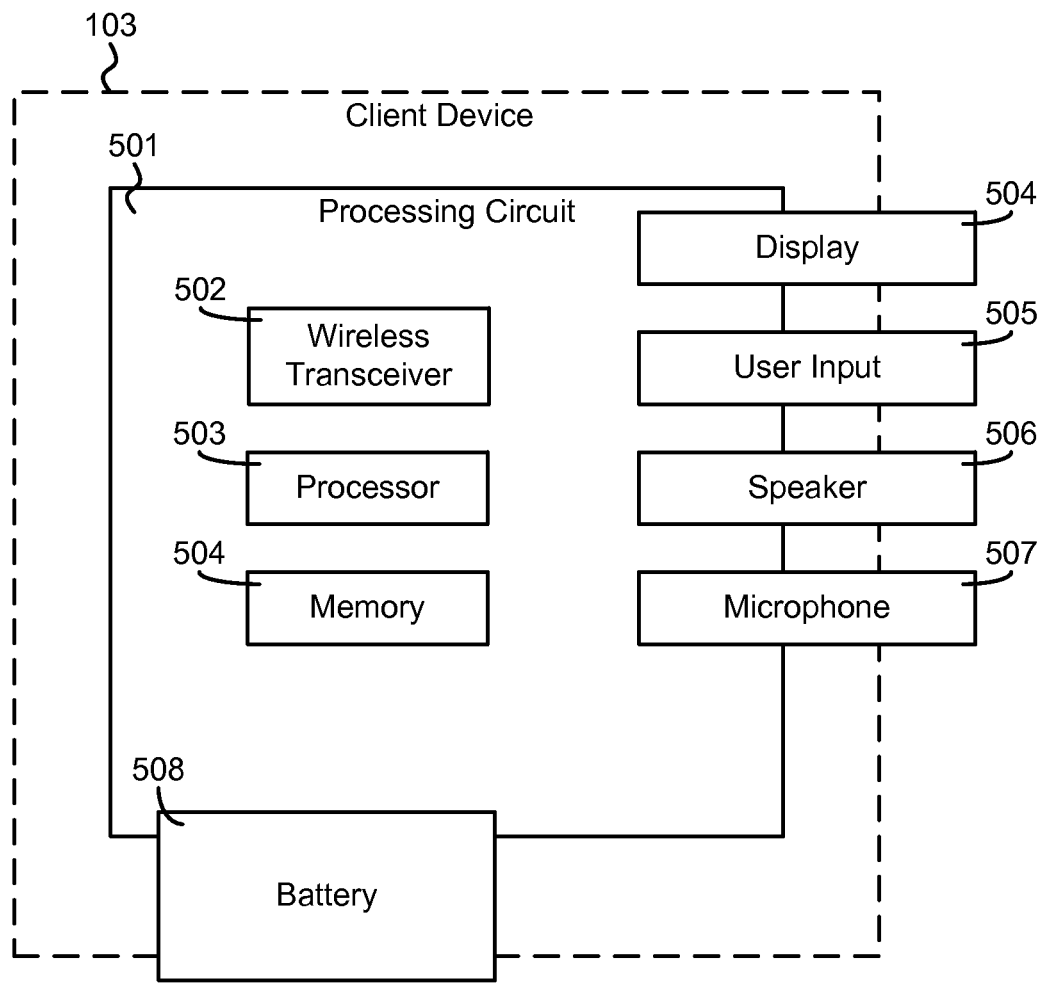
FIG. 5A is a block diagram of an exemplary embodiment of a client device.

Referring to FIG. 5A, a block diagram of client device 103 is shown. Client device 103 includes processing circuit 501. Processing circuit 501 controls the operation of client device 103. Accordingly, processing circuit 501 includes wireless transceiver 502, processor 503, and memory 504. Wireless transceiver 502 is configured to send and receive data to and from server 102. Client device 103 can be any number of computer devices having system software installed on it (e.g., a smartphone, a tablet computer device, a laptop computer, etc.), and wireless transceiver 502 communicates with server 102 through a network (e.g., a cellular data network or a WiFi network). Accordingly, wireless transceiver 502 utilizes any number of wireless networking protocols, including any of 802.11, CDMA, GSM, LTE, WiMax, Bluetooth®, ZigBee®, and 802.15. In an alternative arrangement, client device 103 includes multiple wireless transceivers enabling a broad range of network compatibility. In this arrangement, a user can select which radios are active, and which radios are to remain dormant. Memory 504 stores video data, operating instructions, user interfaces, system software, and any necessary software modules. Client device 103 is a multi-use device (e.g., a smartphone with a system application on it); accordingly, memory 504 also stores information pertaining to other device functions (e.g., making and receiving telephone calls). In some arrangements, client device 103 is configured to accept and utilize removable memory (e.g., SD or MicroSD memory cards) for additional storage of any data. Processing circuit 501 includes and/or communicates with display unit 504, user input 505, speaker 506, and microphone 507. Client device 103 may include a touchscreen user input; accordingly, display unit 504 and user input 505 are merged into the same unit for some embodiments. User functions within system 100 may be accomplished through using display unit 504 and user input 505.

Figure 5B:
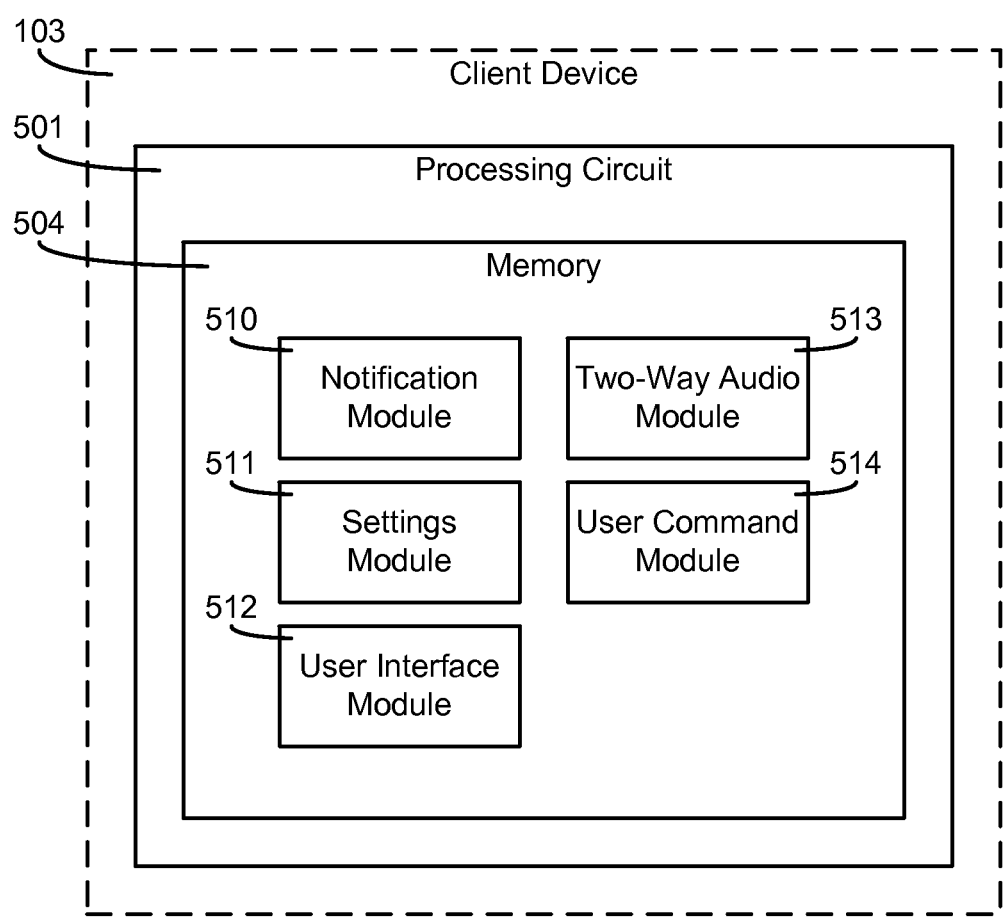
FIG. 5B is a block diagram of memory modules of the client device.

Referring to FIG. 5B, a block diagram of modules stored on client device 103 is shown. Modules are stored on memory 504 contained on processing circuit 501. Modules include all necessary instructions for user interaction with system 100 through client device 103. Modules include notification module 510, settings module 511, user interface module 512, two-way audio module 513, and user command module 514. Notification module 510 may be configured to manage notifications to be displayed on client device 103. Settings module 511 may be configured to manage client device 103 settings. User interface module 512 may be configured to generate a user interface on client device 103 displaying information as described in the present disclosure. Two-way audio module 513 may be configured to facilitate audio communications. User command module 514 may be configured to receive a user command to provide to server 102. Modules on client device 103 are not exclusive, meaning multiple modules are used together in certain situations. For example, for a user to adjust account settings for system 100, client device 103 relies on settings module 511 and user interface module 512.

Client device 103 displays graphical user interface through a display. The user receives alerts, views video, and sends/receives data to/from server 102 and camera unit 101 through the graphical user interfaces presented on client device 103. Examples of displayed graphical user interfaces for mobile devices (e.g., a mobile smartphone) are shown in FIGS. 6A-F. Although example graphical user interfaces are shown for a mobile device, user interfaces can be modified in size, orientation and arrangement for viewing on any form of client device 103, including for viewing on a website.

Figure 6B:
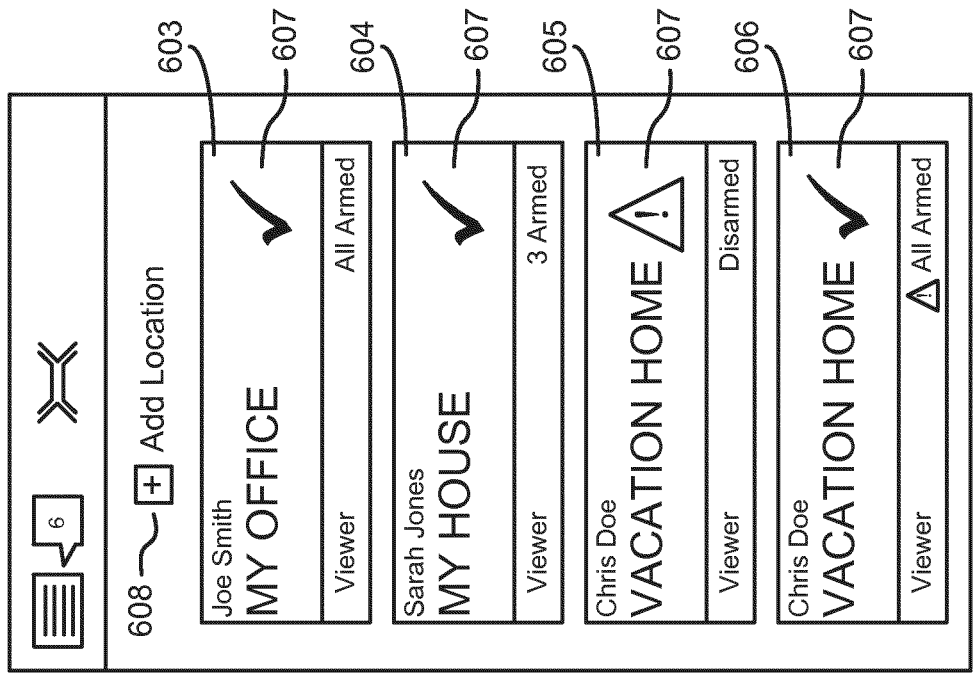
FIGS. 6A-F are detailed views of exemplary graphical user interfaces that may be presented to a user via the client device.
Figure 6A:
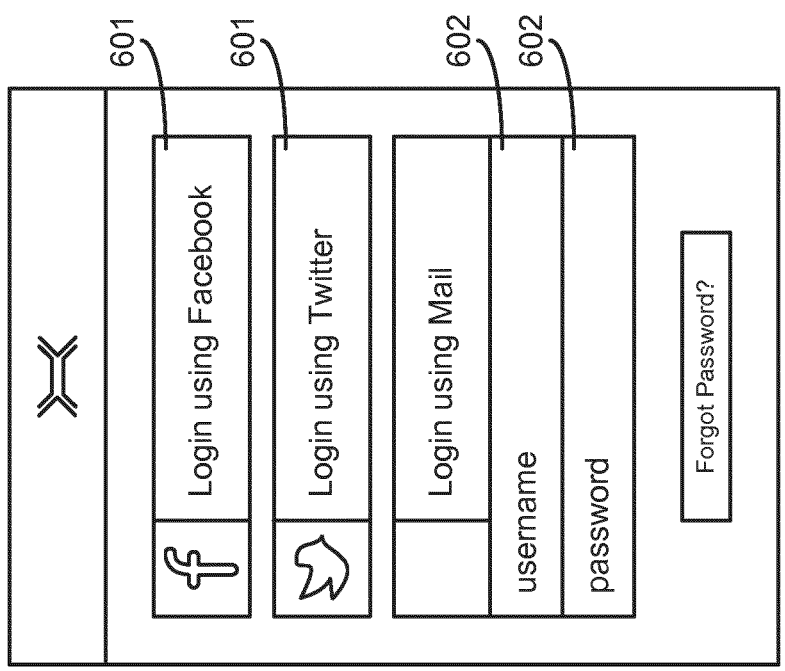

Referring to FIG. 6A, a graphical interface for logging into system 100 through a mobile device is presented. A user can access system 100 by logging in through social media accounts (buttons 601) or by logging in via a registered e-mail address and password (fields 602). After logging in, a user has access to the user's account with system 100. Through client device 103, a user can modify settings, associate additional devices with the user account (e.g., camera unit 101), view device statuses, arm or disable devices, associate additional locations with the user account (e.g., the user's home or the user's office), view a location dashboard, and send and receive messages with other users.

Referring to FIG. 6B, a graphical interface for viewing locations associated with a user account is shown. Each user can have multiple locations associated with his or her account (e.g., locations 603, 604, 605, 606). Each location has a status indicator 607 indicating whether devices (e.g., camera unit 101) are armed (active) or disarmed (inactive) at each associated location. A user can also associate a new location with the user's account through the graphical interface (button 608). Each location 603-606 can have a number of devices associated with the location.

Figure 6D:
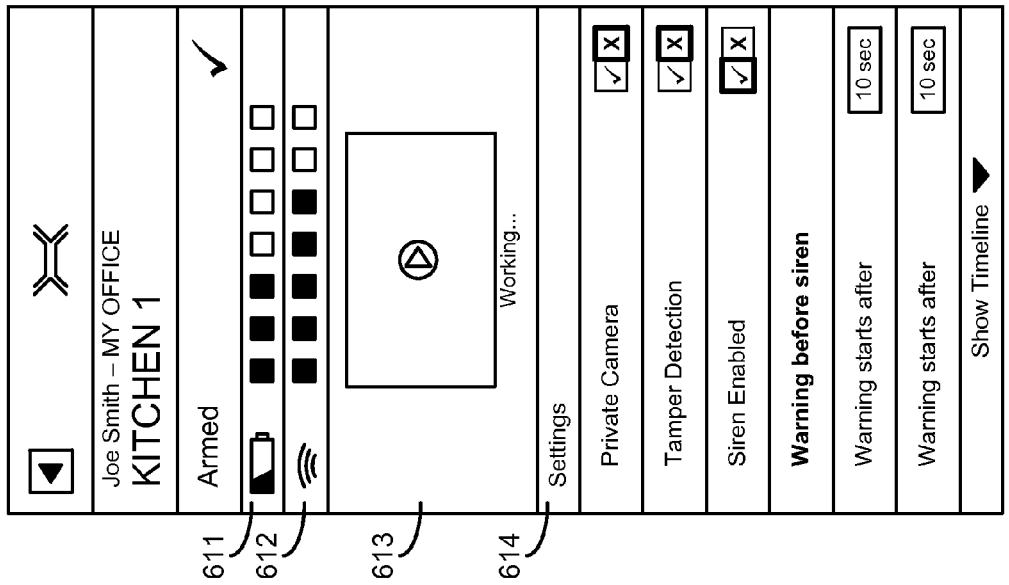
Figure 6C:
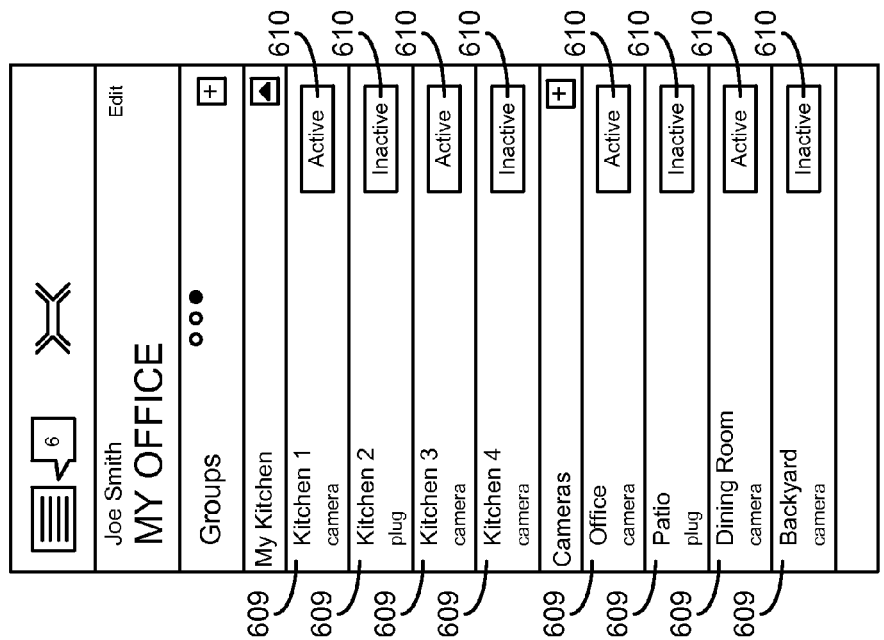

Referring to FIG. 6C, a graphical interface for viewing devices associated with a location is shown. If a user selects "MY OFFICE" (location 603), the user is directed to the graphical interface as shown in FIG. 6C, which displays the various devices 609 associated with location 603. Devices can be camera units (e.g., camera unit 101) or other devices (e.g., switch unit 104) connected to system 100. Each listed device 609 also includes a status 610. Status 610 indicates whether an individual device 609 is active on the system.

Referring to FIG. 6D, a graphical interface for viewing an individual device is shown. Each device 609 can be selected by the user to view details of the device's status 610. The detailed status includes a battery level 611, a network health (e.g., signal strength, signal quality, etc.) indication 612, and a device output 613 (shown as a video). The device output 613 depends on the type of device. The user can also adjust various settings 614 of device 609.

Figure 6F:
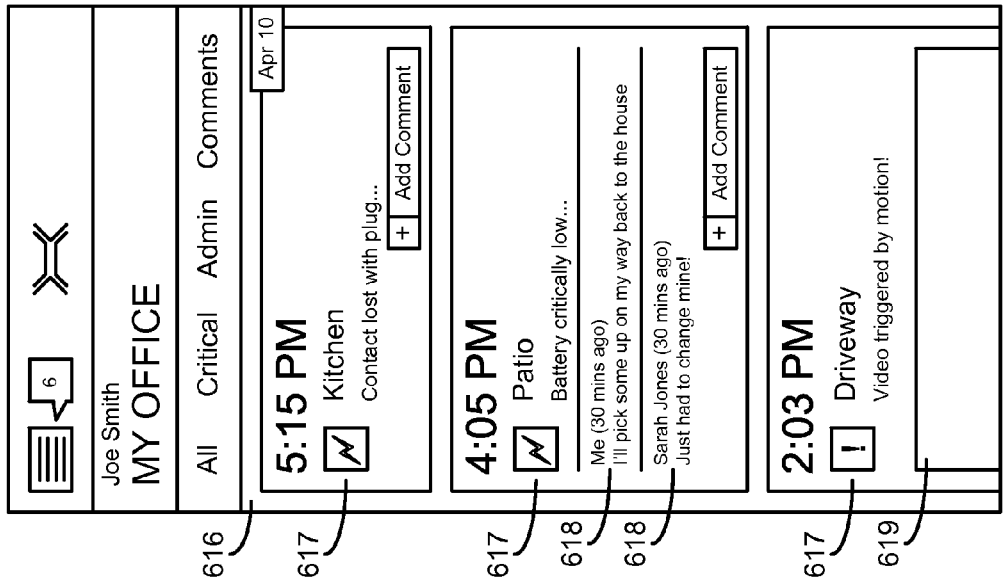
Figure 6E:
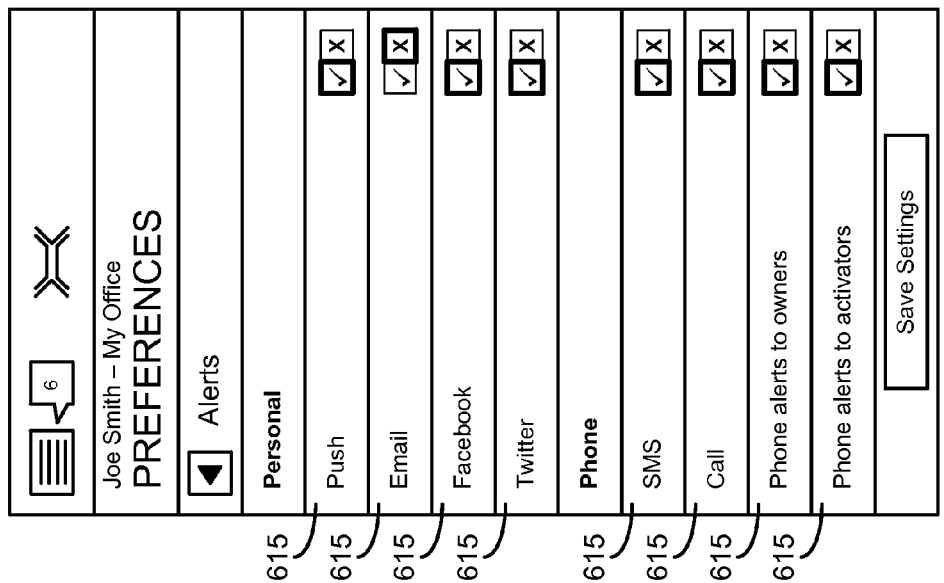

Referring to FIG. 6E, a graphical interface for viewing and adjusting user account notification preferences is shown. System 100 is configured to notify a user in the event an event is detected. A user of system 100 can set notification preferences as to how notifications are sent by system 100. A user can enable or disable alerts sent through specific channels of communication 615 (e.g., e-mail notifications, SMS notifications, etc.). If a particular channel of communication 615 is enabled, system 100 will alert the user through the enabled channel if an event is detected. The content of the alert may vary depending on the channel of communication 615.

Referring to FIG. 6F, a graphical interface for a dashboard 616 is shown. Dashboard 616 displays a chronological listing of individual event listings 617. Event listings 617 pertain to device statuses (e.g., battery life and network health) and detected events (e.g., video captured as a result of a motion detector trigger). Users of system 100 can leave comments 618 on event listings 617. Additionally, if the event notification includes content (shown as video clip 619), users can view the content through dashboard 616. If additional content pertaining to an event listing is captured by a system 100 device (e.g., from the same device capturing the initial event data or a second device), the additional event data is aggregated into the single event listing. Alternatively, the additional event data is displayed in a new event listing. Dashboard 616 may be location specific, user specific, or both.

Figure 7A:
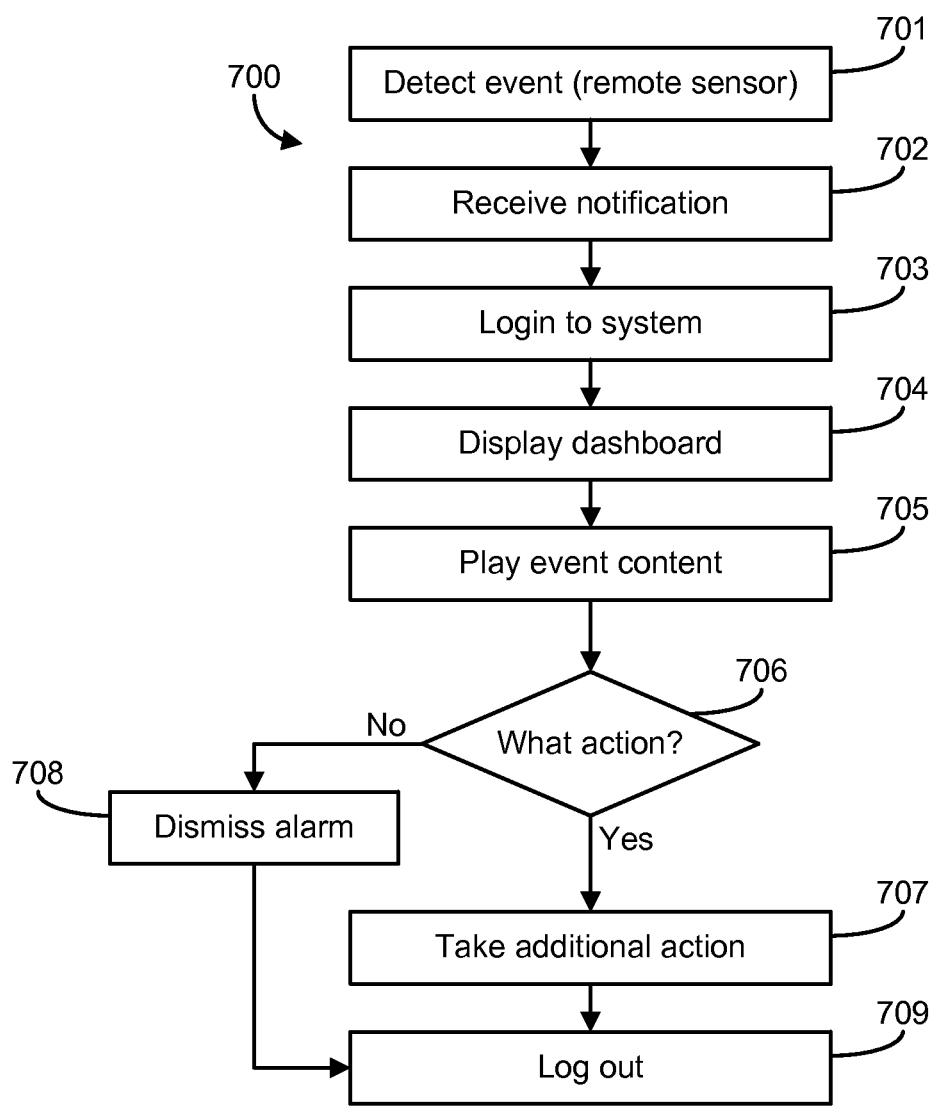
FIG. 7A is a flow diagram detailing the event detection process from the perspective of the client device.

Referring to FIG. 7A, an exemplary event detection and notification process 700 is shown from the perspective of a user utilizing client device 103. A remote event is detected (step 701). The remote event is detected from a remote sensor (e.g., camera unit 101). The remote sensor communicates with a server (e.g., server 102) that hosts user accounts. The remote sensor is associated a user account. Upon detection of the event, the remote sensor notifies the server of the event and begins recording event content (e.g., a video clip). After the recording is finished, the event content data is compressed and uploaded to the server. The server associates the detected event and content with a specific user account and identifies the user's notification preferences.

After identifying the associated user's notification preferences, the server notifies the user based on the user's notification preferences (step 702). As shown above with respect to FIG. 6E, a user can select from a plurality of notification channels. The user can be notified through any combination of the following notification channels: SMS, MMS, telephone call, e-mail, social media message (e.g., Facebook, Twitter, LinkedIn, etc.), application push notifications (e.g., Android or iOS application push notifications), and/or other electronic messaging services. A user can receive redundant notifications across multiple notification channels. The alert is delivered to the user through client device 103. Alternatively, the alert may be received through a different device (e.g., a smartphone, a PDA, a tablet, a personal computer, etc.) and after receiving the alert, the user accesses system 100 through client device 103 or through software on the different device (e.g., a web browser or a smartphone application). The notification may be a message alerting the user that an event has been detected. The notification includes event information including the location and the time of the event. The notification further instructs the user to log into system 100 to view related content and to manage the detected event. In some cases, the notification includes content relating to the detected event. For example, if the notification is sent through a channel enabling media transmission in addition to text or audio (e.g., MMS or e-mail), the notification includes the event content data.

After being notified, the user logs into system 100 (step 703). As shown above in FIG. 6A, a user can log into system 100 through a registered username and password. A user account may also or alternatively be linked to various social media accounts (e.g., Facebook and/or Twitter) such that a user can log into system 100 through a social media account. System 100 also is configured to remember a registered client device such that a user does not need to log in each time a user accesses system 100 from the registered device. In this situation, the system 100 requires a PIN to access the user account. Alternatively, no PIN is required.

After logging into system 100, the user is taken to the dashboard of system 100 (step 704). The system dashboard may include a chronological listing of events. Events include detected events (e.g., a motion-triggered video) and various device status alerts. Device status alerts generally pertain to remote sensor network/connectivity issues devices and low battery alerts. An exemplary dashboard is shown above in FIG. 6F. While viewing the dashboard, the user can view the event content (e.g., "Driveway—Video Triggered by motion!" of FIG. 6F.). Depending on the capabilities of client device 103, the event content may be viewed as embedded within the dashboard, or the event content may be downloaded and viewed via a media player external to system 100.

After viewing the event content, the user decides what action, if any, should be taken (step 706). The user may decide that additional action must be taken (step 707). The user can select from a number of actions to take. The user can instruct system 100 to alert a government agency (e.g., the police department or fire department) and/or a private company (e.g., a private security company) of the detected event. The user can instruct the server to have the remote sensor capture more event data. The user can request more event data (e.g., additional video or audio) to assist with making a proper determination. The additional event data is published in the same event listing as the initial event data. The additional event data may also or alternatively be published in a second, new event listing. The user can instruct the server to alert other users of system 100 about the event. In some situations, a user's account can be linked to other user accounts such that one user can initiate an alert to another user.

Alternatively, the user may decide to dismiss the event (step 708). The user can dismiss the event by removing the event from the dashboard. Alternatively, the user can mark the event as having been reviewed or addressed. In this case, a status indicator of the event listing changes. The event listing can change by changing colors (e.g., from red to green), changing indicator symbols (e.g., "!" to "X"), fading, becoming transparent, changing from color to black-and-white, or any combination thereof. The user can add a comment to the event listing indicating that the event has been addressed. The event listing for all users may be updated with the added user comment. The text of the user comment can be selected from a set of preset messages (e.g., "reviewed" or "false alarm") or can be customized to read any text. Links or buttons may be associated with each type of preset message or a custom message. A user selects an action prior to viewing the content. For example, the user may decide to immediately dismiss the event without viewing the event content if the alarm was inadvertent (e.g., triggered by the user).

After reviewing the event, the user logs out of system 100 (step 709). It should be understood that a user does not need to receive a notification prior to logging in to system 100. A user may wish to log in to system 100 without receiving a detected event notification. The user can log into system 100 at any time to update notification preferences, view the dashboard, add and remove devices or locations, add messages to or dismiss old events, manage connections with other users, view remote device statuses, and edit user profile information.

Figure 7B:
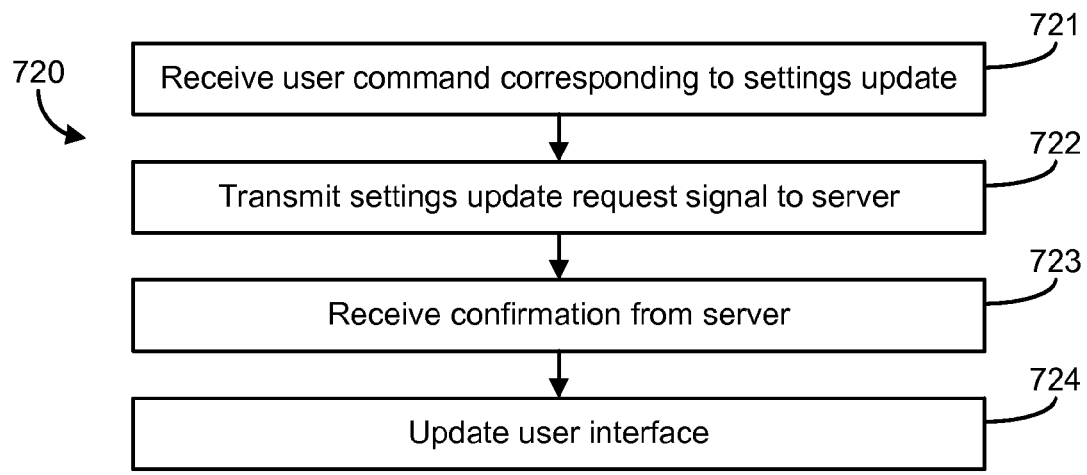
FIG. 7B is a flow diagram detailing the process of updating a user account and user settings from the client device.

Referring to FIG. 7B, a flow diagram of updating user account settings through client device 103 is shown. A user command corresponding to a settings update request is received at client device 103 (step 721). The user command is received through user input 505. The user initiates the command by interacting with system information displayed through display unit 504 (e.g., any of user interfaces shown in FIGS. 6A-F). Through interaction with the user interface displayed on client device 103, the user can change any setting associated with his or her account. The settings include, but are not limited to: notification settings, device settings (e.g., camera unit 101 settings), location settings (e.g., location status, linked users, associated devices, etc.), user profile settings (e.g., passwords, contact information, user associations with other users of system 100, set user access levels, etc.), client device 103 settings (e.g., adjusting graphical displays based on display unit 504, adjusting client device 103 notifications, configuring client device 103 with server 102, etc.), and any other settings necessary during the use of system 100.

Client device 103 transmits the settings update request signal to server 102 (step 722). Client device 103 transmits the signal to server 102 through wireless transceiver 503. Alternatively, client device transmits the signal to server 102 through a wired network connection. The signal instructs server 102 to make the requested changes within the user account. Server 102 makes the changes within its databases (e.g., the settings change is updated for the user's profile stored in mass storage units 405). Client device 103 then receives a confirmation signal from server 102 (step 723). Upon receiving the confirmation signal, client device 103 updates the display (e.g., display unit 504) to show that the settings change has been effectuated (step 724). The setting change may correspond to a change in color, the position of a virtual toggle switch, a change in wording, or any other graphical representation displayed to the user that indicates a successful change in settings.

Figure 7C:
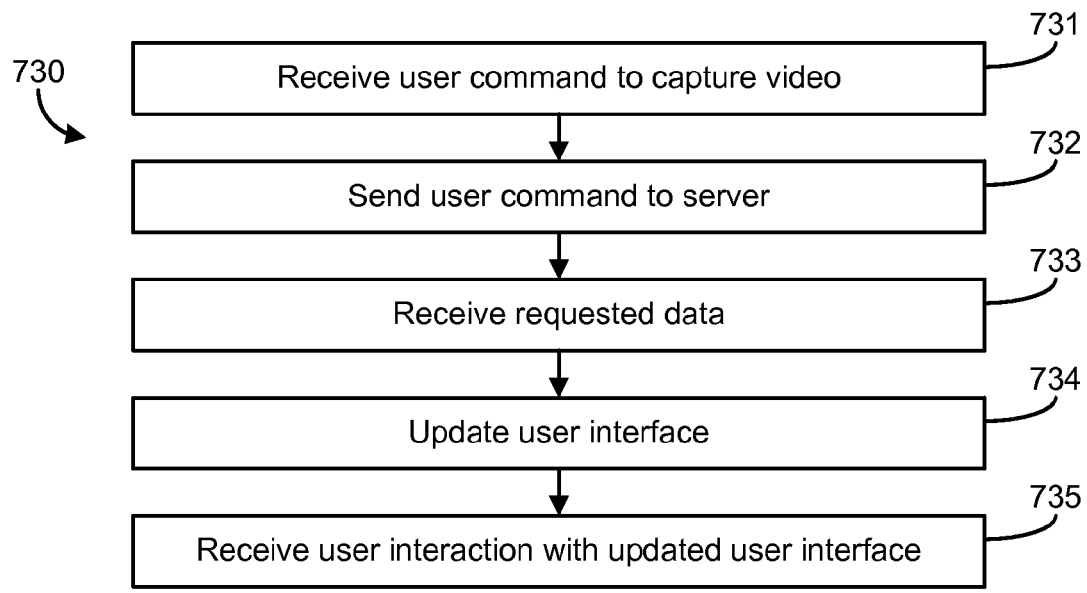
FIG. 7C is a flow diagram detailing the on-demand video capture process from the perspective of the client device.

Referring to FIG. 7C, a flow diagram of performing a user command to capture video is shown from the perspective of client device 103. Client device 103 receives a user command (step 731). The user command pertains to a user initiated video capture request for camera unit 101 to capture a specific duration of video. The duration of the video to be captured may be a standard length. Alternatively, the user command includes a specified duration of video to be captured. Client device 103 forwards the user command to server 102 (step 732). Server 102 and camera unit 101 interact as described above with respect to FIG. 2M and FIG. 4F. Once server publishes the captured event on the user dashboard (step 458 of FIG. 4F), client device 103 receives the user requested video capture (step 733). The client device then updates the user interface displayed on display unit 504 (step 734). Accordingly, the user is presented the video on the graphical display of system 100 (e.g., display of FIG. 6D or FIG. 6F). Depending on the latency, there may be a significant delay between when the user initiates the capture request and when the user can view the captured video. Client device 103 optionally receives a second user command correlating to a user interaction with the requested content (step 735). The optional second command may relate to a play request, a delete request, a share request, or any other command pertaining to the captured video data.

System Scalability

System 100 can function with a single camera unit 101 or a single switch unit 104 associated with an individual user account. System 100 may be scalable such that any number of camera units, switch units, or other sensors may be associated with single or multiple locations that are associated with a user account. For example, a user may decide to associate a camera unit and switch unit in each room of his or her home (first location), his or her office (second location), and his or her vacation home (third location). Each group of devices at each location posts alerts and notifications to the user's dashboard (e.g., via the server/camera activity previously described). The user's dashboard may be subdivided into location-specific dashboards or device-specific dashboards. Further, each group of devices that are located on the same local network (e.g., connected to the same wireless internet router) can be configured to communicate with each other. In some embodiments, multiple users of system 100 can associate with each other such that a user can view another user's devices and locations.

It is further contemplated that other devices beyond switch unit 104 and camera unit 101 can be configured to work with system 100. For example, other security and safety sensors, such as window breakage sensors, standalone motion detectors, carbon monoxide detectors, smoke detectors, and fire detectors can be configured to communicate with server 102 and to work with system 100. In some embodiments, home automation devices such as climate controllers (HVAC, thermostat, etc.) can be configured to communicate with server 102 and to work with system 100.

Use of System and Integration with Social Networking

A user can register an account by creating a user name, creating a password, providing user contact information (e.g., address, work telephone number, mobile telephone number, home telephone number, fax number, e-mail address, social media account information, etc.), and providing any other required information. Upon successful registration, the user becomes discoverable by other users of system 100 such that the two users may be linked (discussed in further detail below). However, each user can limit or eliminate his or her discoverability such that only other users having a certain characteristic can locate the user or such that no other users can locate the user. Further, upon successful registration, the user can begin adding user owned locations and user owned devices.

The registered user can add a user location to his or her user account with system 100. The user location is a location that the registered user has complete control over (e.g., add/remove devices, add/remove users, delete the location, name the location, etc.). To create a user location associated with the account, the user interacts with a graphical user interface (e.g., as shown above in button 608 in FIG. 6B) and selects the add a location feature, which may be represented by a symbol on the graphical user interface. Upon selection, the user must input a name and provide optional information pertaining to the location. Once a user-owned location is created, the user can view the location-specific dashboard (e.g., as shown above in FIG. 6C). From the location's dashboard, the user can view any events and/or device statuses pertaining to the location. The user can also make the location public (e.g., so it can be located by other registered users), make the location private (e.g., so it cannot be located by other registered users), delete the location, manage user connections (e.g., add/remove other users' access rights to the user-owned location and set user permissions), and associate/remove remote devices (e.g., camera unit 101) to/from the location.

Before any events can be detected for the user and the user's location, the user must associate at least one remote device with the newly created account and/or newly created location. It is noted that much of the following discussion pertains to adding and operating a device associated with a user's location. However, it should be understood that a user can associate a device with his or her general account dashboard (e.g., not a location specific dashboard) as well in a similar manner as described. The user can add any type of device that functions with system 100 (e.g., camera unit 101, switch unit 104, or other security sensors). The user begins the device association process by installing the remote device at the location and registering the device with a local area network that has access to server 102 (e.g., a wireless router). Most remote security devices (e.g., camera unit 101 and switch unit 104) do not have a display and a keyboard that would typically enable a user to connect with a wireless access point (e.g., as in a laptop computer or a tablet computer). Accordingly, the user may connect in an ad hoc wireless connection with the device, and program the device to search for the appropriate network such that the device connects with the wireless access point upon termination of the ad hoc connection. Each remote device capable of connecting with system 100 includes a unique identifier (e.g., MAC address). The user then registers the unique identifier with the user account through the graphical user interface, and the device becomes available to the user account. After adding the device to the user account, the user names the device and can perform various associations with the device and edit device settings.

The user can then edit device settings. For example, the user can configure the device to detect events (e.g., motion) and what to do when the event is detected (e.g., capture video data). The user can activate or deactivate the device (e.g., turn on event detection or turn off event detection). The user can request the device to perform a command (e.g., capture a video on demand). Further, the user can change settings (e.g., set a video length, turn audio capture on, set device associations with other devices). It should be understood that each device will have a unique set of optional settings and features. For example, while camera unit 101 can be configured to record video data, switch unit 104 can be configured to detect certain alarm signatures or audio noises. The user can further set a schedule for each associated device. The schedule may pertain to a schedule as to when the device will be active (e.g., detecting motion) and inactive (e.g., not detecting motion) or to when the device will perform a designated function (e.g., capture video every Tuesday at 4 pm). The user can view device status, including network connection and battery statistics. Further, the user can make a device private or public. By making a device private, only the user that owns the device can view the device, send commands to the device, and view detected event information captured by the device.

The user can further associate the device with the user's location within the user account. Once a device is associated with the location, the location dashboard will begin being populated with events. If a device is active, event listings (e.g., see event listings 617 from FIG. 6F) will begin populating the location's dashboard upon event detection and internal device statuses (e.g., low battery). When a remote device detects an event (e.g., camera unit 101 detects motion or switch unit 104 detects audio), an event listing is published on the location dashboard. If the remote device captures event data, the event listing includes event data. Generally, the event listing includes the type of detected event (e.g., motion or an audible alarm), the time of the detected event, the remote device name, and any other information regarding the detected event. Further, an event listing may indicate a remote device status alert. For example, if a device loses connection with server 102, an event listing will appear on the location's dashboard indicating there is a problem so the user can investigate the problem. As another example, if the device is running low on battery, an event listing will appear on the location's dashboard so that the user can investigate and/or replace the battery. All events are routed from the device through server 102, such that event listings are published by system 100 on the user interface.

Each event listing (device status alert or detected event) is displayed on an interactive graphical user interface. Users that can view the location's dashboard (e.g., the location's owner and any users granted permission by the location's owner) can perform certain functions through the graphical user interface of system 100. For example, each event listing has a comment feature such that a user can instruct server 102 to publish a comment. Multiple comments pertaining to the same event listing appear in chronological order such that the comments form a threaded conversation (e.g., see comments 618 of FIG. 6F). Already posted comments can be removed by the location's owner, the user that posted the comment, and/or another user granted permission to remove the comments by the location's owner. Further, each listing contains event options. For example, users that have access to the location dashboard and the necessary permission levels can delete event listings or mark event listings as cleared or dismiss the event listing. A cleared or dismissed listing indicates a non-important event (e.g., a false alarm) or that the event was taken care of already. Further, users having access to the location dashboard and the necessary permission levels may initiate alerts to other users regarding the event listing.

System 100 can be utilized by a single user having shared no locations or devices with other users. However, as briefly discussed above, an account holder within system 100 can associate his or her user account and his or her owned locations with additional system 100 users. By linking multiple other users to the first user's location or devices, the first user can create a virtual community watch system. Accordingly, each user of system 100 can optionally link his or her account and/or specific owned locations and/or specific devices with other users of system 100. If users are generally associated (e.g., one user is associated with another's profile), each user has access to all shared locations of the other user. If a first user becomes associated with a second user's location, the first user has access to the second user's location's dashboard. If a first user associates with a second user's device, the first user has access to the device's dashboard. Each user may have full access or some tier of limited access to the other's dashboard based on belonging to a tier of users (discussed in detail below). By establishing relationships with other users, the other users can monitor each other's notifications, alerts, and events.

Users of system 100 can associate with other users in multiple ways. A registered user can send an invite to another user. To do so, the registered user may search for another registered user by name, e-mail address, location, social media account, or any other identifying characteristic. Further, system 100 may suggest other users with which a registered user may wish to associate. For example, system 100 may determine that two users live on the same block and suggest association between the users based on the common interest in neighborhood security. System 100 analyzes user characteristics to find matching characteristics between its members to locate and suggest possible user associations.

A registered user can send an invite to a non-member of system 100. The registered user instructs system 100 to initiate an e-mail to the non-member to encourage the non-member to register for system 100 and to join the registered user's location. Alternatively, the e-mail initiated by system 100 provides the non-member temporary guest access. System 100 may require guest verification before providing the guest access to the system. The verification includes the entering of a code received by system 100 in the invitation e-mail. Alternatively, the code is received by the guest from the registered user initiating the guest access through a system generated SMS message, phone call, or other access code. Guest access is generally for a limited duration (e.g., a couple of hours, a day, a week, etc.). A registered user can invite members or non-members to associate with the registered user's account through social media. For example, the registered user may initiate a Facebook message or a Twitter tweet to another individual, and the message or tweet includes a link to sign up and/or associate with the registered user's account and/or location. Still further, a first registered user may receive an invitation to join a second registered user's location or generally associate with the second user's account. In this case, the first registered user may either accept or reject the invitation to associate with the second user.

Once a first registered user is connected with a second registered user, the second user's level of access must be set. For example, system 100 may allow for three different tiers of associations. Each tier represents a different level of permissions with respect to the second user's access of the first user's account, devices, and locations. User tiers may be set on an individual-by-individual basis. Alternatively, a user can assign a set tier of access for all users belonging to a specific location or device. The details of the tiered-access system are discussed in detail below.

Figure 8A:
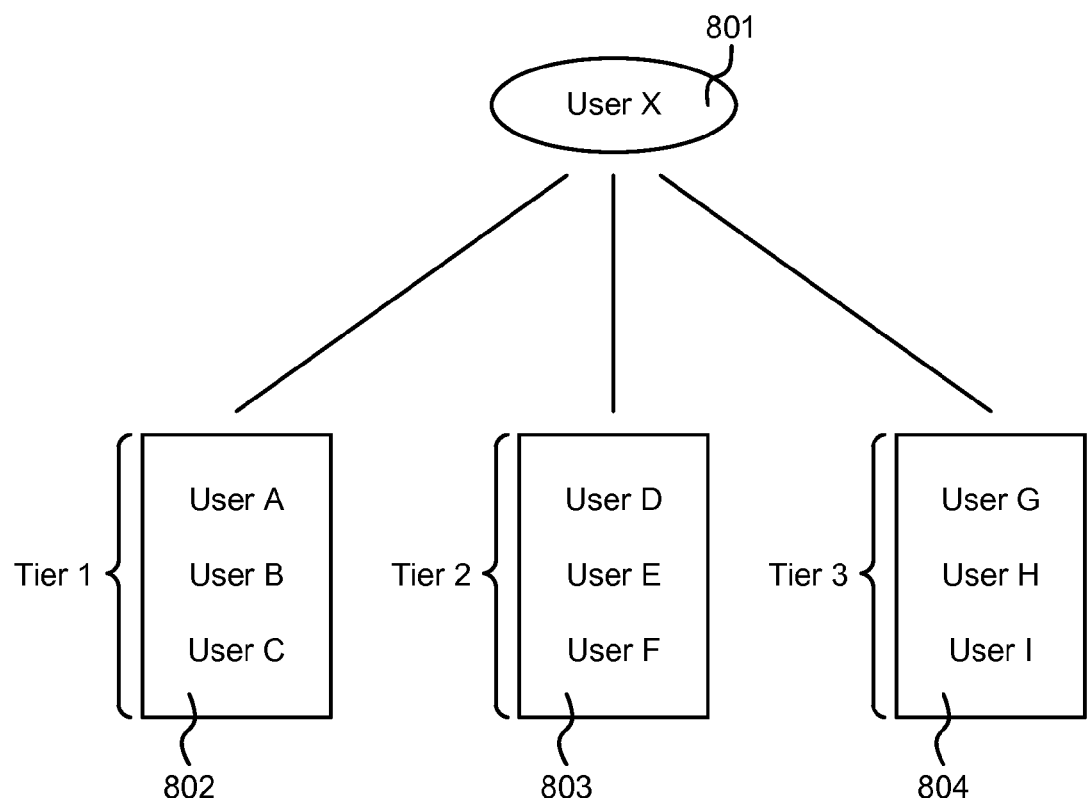
FIG. 8A is an exemplary diagram of a user-tier arrangement.

Referring to FIG. 8A, an exemplary user relationship structure is shown. User 801 is a registered user of system 100. Accordingly, user 801 has at least one device (e.g., at least one of camera unit 101 and switch unit 104) associated with at least one location of user 801's user account and has access to system 100 as described above. User 801 is linked to other users of system 100: tier 1 users 802, tier 2 users 803, and tier 3 users 804. Each tier of users represents a grouping of users having a specific set of permissions. Each tier contains any number of linked users. Further, a tier of users is not required to be populated with users. System 100 functions if user 801 is linked to no other users, a single user in a single tier, or any number of users in any tiers. It should be understood that while the embodiment of FIG. 8A and elsewhere illustrate a three-tier system, the systems and methods described herein may be implemented for any number of desired tiers.

Each tier of users designates a specific permission level. Each tier of users has a representative name that indicates the level of permissions a user has by belonging to an individual tier. The names may be based on well understood social, military, or hierarchical naming schemes (e.g., administrator, member, and limited member; sheriff, deputy, and officer; king, knight, and peasant; captain, lieutenant, and infantry; etc.).

User 801 is connected to tier 3 users 804. Under the three-tier system, tier 3 users 804 have the most restricted level of access to devices and receive the fewest alerts and notifications pertaining to the locations and/or devices associated with user 801. Tier 3 users 804 have access to view events and notifications that populate user 801's dashboard. Accordingly, when tier 3 users 804 log into system 100, tier 3 users 804 are directed to their personalized dashboards (e.g., FIG. 6F above). On the personalized dashboards, tier 3 users 804 are presented with personalized events and alerts resulting from devices associated with their accounts. Tier 3 users 804 may view any shared locations or devices of user 801 on the personalized dashboard. Tier 3 users 804 have the ability to view event data and leave comments pertaining to the events located on any shared location or device dashboards of user 801. However, tier 3 users cannot alter settings of user 801's account (e.g., settings pertaining to alert and notification preferences for user 801's locations and devices), activate/deactivate devices, or remove or hide events or alerts from other users (e.g., another tier 3, tier 2, or tier 1 user) such that the other users would not be able to view the event data or notification. Tier 3 users 804 may receive notifications originating from events and alerts associated with user 801 based on user 801's notification preferences. It is contemplated that user 801 can enable or disable alerts sent to tier 3 users 804.

User 801 is connected to tier 2 users 803. Tier 2 users 803 are granted all of the access of tier 3 users 804 and further have additional privileges. Unlike tier 3 users 804, tier 2 users have additional access to hide or remove events associated with user 801 such that other users can no longer view the event data or notification. For example, a tier 2 user can view event data associated with an alert (e.g., a video triggered by motion) and determine that the event is a false alarm and remove it or dismiss it from the dashboard. In the event a tier 2 user hides or removes events or notifications associated with user 801, an alert can be sent to user 801 and all other users associated with the event (e.g., another tier 3, tier 2, or tier 1 user) indicating that the event has been removed. Further, event data will always remain visible to user 801 until user 801 removes or hides the event data or notification from his or her dashboard. If user 801 removes or hides the event data or notification, the event data is no longer visible to any connected user (e.g., another tier 3, tier 2, or tier 1 user). If marked as dismissed or cleared, the event listing will still be visible and is merely updated to indicate a dismissed or cleared status. Alternatively, event data automatically deletes after a designated period of time (e.g., after a month). Tier 2 users 803 also receive notifications originating from events and alerts associated with user 801 based on their notification preferences. The notifications to tier 2 users 803 can be enabled or disabled by user 801.

User 801 is connected to tier 1 users 802. A tier 1 designation corresponds to user 801 granting the highest level of access to another user. Accordingly, tier 1 users 802 are granted all of the access capabilities of tier 2 users 803 in addition to having other privileges. Tier 1 users 802 may have the ability to activate and deactivate devices associated with user 801. For example, a tier 1 user can activate or deactivate a device (e.g., camera unit 101) associated with user 801. Tier 1 users 802 can initiate notifications or messages to other users (e.g., user 801, tier 2 users, and tier 3 users) linked with user 801. Tier 1 users 802 also receive notifications originating from events and alerts associated with user 801 based on their notification preferences. The notifications to tier 1 users 802 can be enabled or disabled by user 801.

User 801 has control as to what other users gain access and the level of access granted to user 801's account. User 801 can send an invite to another user inviting the user to join user 801's network. Alternatively, a user can send a request to user 801 in an attempt to join user 801's network. In either case, user 801 has control on which outside users gain access to user 801's network. After linking an outside user to user 801's account, user 801 designates a level of access for the outside user (e.g., tier 1, tier 2, or tier 3). Further, user 801 can select notification preferences for the added user. User 801 can also remove access that was previously granted to an outside user or change the level of access associated with a specific user. User 801 can send messages to connected users. User 801 can send messages to all connected users, specific individual users, and all users belonging to a specific tier of access. Messages sent between users are sent and stored within a messaging system built in to system 100. Users in receipt of a message can opt in to receive a notification indicating that a new message has been received. The notifications are sent according to a user's notification preferences.

User 801 can have different groupings of users for different locations. For example, user 801 can have a home location and an office location associated with his or her user account. Each location has a different set of associated devices. User 801 may wish to have two sets of linked users each having different permissions for the different locations. User 801 can establish a first grouping of tiered users for the home location and second grouping of tiered users for the office location. Each grouping of tiered users can include an entirely different group of users, the same group of users, or a partially overlapping group of users. Further, any overlapping users need not have the same tier assignment for each location.

After initially setting an associated user's tier of access, a user may wish to change the access he or she granted. For example, a user may initially provide an associated user with a tier 3 level of access because the user does not trust or does not know the associated user well enough. After a certain amount of time, the user may gain more trust in the associated user and wish to provide the associated user with tier 2 or tier 1 access to the user's location or account. Accordingly, the user can navigate to the associated management page of the graphical user interface (designated as "Friends," "Connections," "Associations," etc.), select the associated user, and select a new tier of access for the user. The selection may occur within a drop-down menu, as a toggle, by selecting and dragging the associated user into an appropriate column, or any other method involving the user interacting with the graphical user interface to change the associated member's tier of access. System 100 may or may not require an additional confirmation step before implementing the tier of access change for the associated user. After the selection is made, the command is sent to server 102, and the update is made within server 102 databases. Upon the tier change, system 100 is configured to notify the associated user of the tier change. Alternatively, system 100 does not notify the associated user of the tier change.

During user management, an account holder may wish to remove an association made with another user. Accordingly, once an association or link is created between two users, either user can remove the association without approval or permission from the other user. In many situations, access granted to one's account and/or locations will be temporary or conditional, and once the time frame expires or the condition is met, the association is no longer needed or wanted. Further, it may be desirable to remove an association with a user that is not actively participating in the monitoring of a location or is abusing a certain location's or user's remote devices. Any registered user can remove and/or ban other users from his or her account or his or her locations. To remove the association, the user wishing to remove the association logs into system 100, navigates to a member management page of the graphical user interface, and selects the appropriate option. The option may be as simple as clicking an interactive "delete" or an "X" button next to the user to be removed in a listing of associations. The process of removing an association may be a two-step process with a confirmation step to avoid accidental removals. After selection and the optional confirmation, server 102 receives the user command and updates its databases to reflect the removed association. Upon removal, system 100 is configured to notify the removed user of the removed association. Alternatively, system 100 does not notify the removed user of the removed association.

Figure 8B:
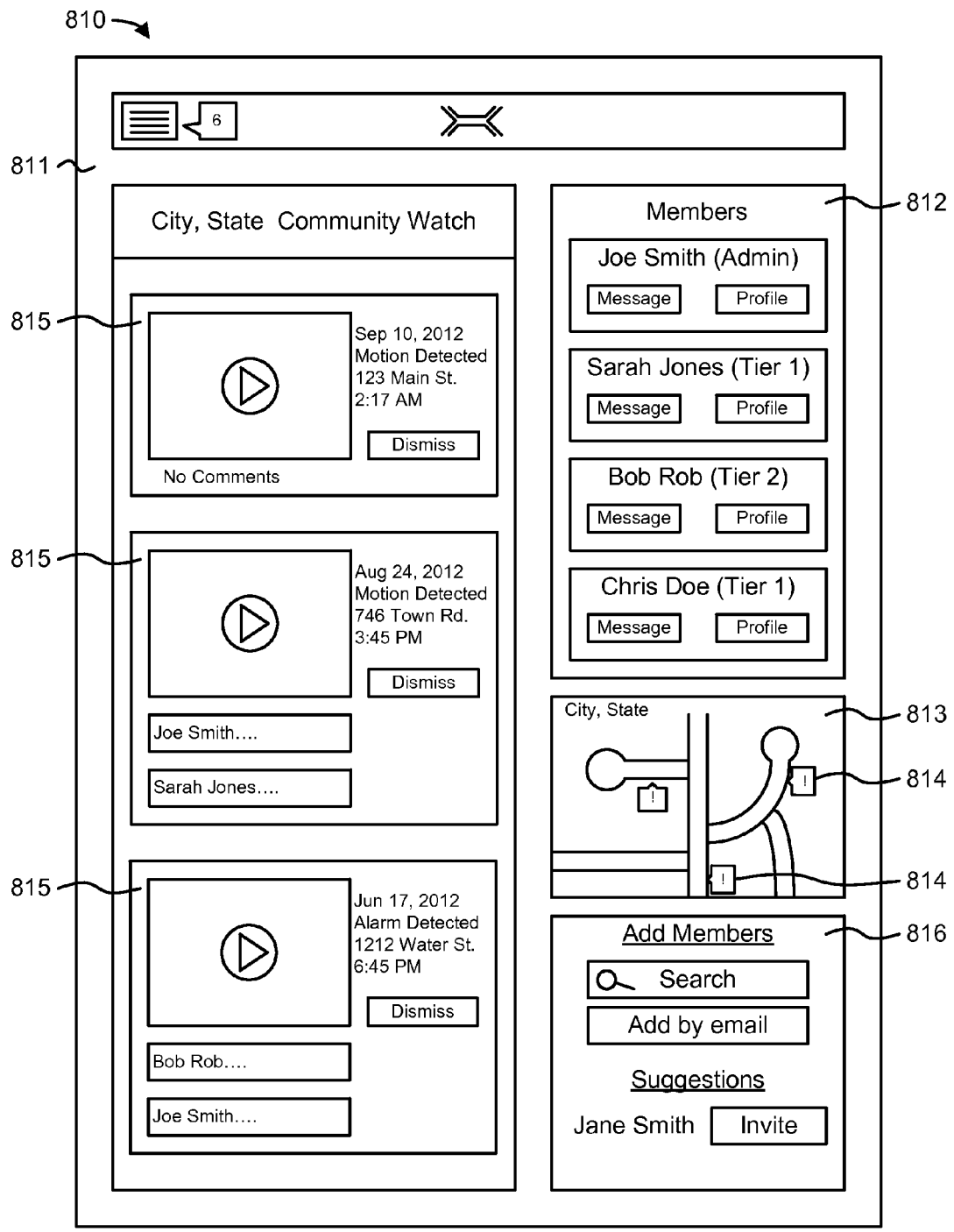
FIG. 8B is a detailed view of an exemplary community watch dashboard as displayed on a graphical user interface.

In addition to linking individual users of system 100 with one another, multiple accounts and select devices can be linked to form an online community belonging to a group of users. Each community has an individualized dashboard. Referring to FIG. 8B, an example graphical user interface showing a dashboard 811 for an online community 810 is shown. Dashboard 811 is similar to dashboard 616 of FIG. 6F. Online community 810 includes members 812. Each member has a designated role or belongs to a designated tier. Each community requires at least one community administrator (shown as "Joe Smith"). The community administrator is in charge of adding and removing associated members, adding and removing associated devices, and updating any community-wide settings. Non-administrative members are classified into tiers having the same properties as the classification tiers discussed above with respect to user-to-user account linking.

Online community 810 links users of a particular geographic proximity (shown as "City, State"). The geographic location is shown on dashboard 811 on a displayed map 813. Map 813 is an interactive widget. A member viewing dashboard 811 can zoom in, zoom out, and reposition map 813. The map data may be powered by a third party service such as Google™ or Mapquest™. Map 813 also includes event indicators 814 that correspond to community event listings 815 published on dashboard 811. Event indicators 814 represent the geographic location of the detected event. A user viewing dashboard 811 can click on the event indicator to learn more information on the event. Clicking on any of the event indicators 814 will scroll or otherwise change the dashboard to the associated event. Event indicators 814 can be cleared, hidden, or removed by the community administrator or any tier 1 community member. In an alternate embodiment, online communities are formed regardless of geographic proximity. As such, system 100 may be used as a family and friends monitoring system. In this case, the online community can correspond to a family, a group of friends, or other grouping of individuals. The linked users are not limited by geographic proximity.

Online community 810 has a group of associated devices. Associated devices are managed by the community administrators. Associated devices are registered to accounts of any community members 812. Associated devices may also be associated with just online community 810, and not an individual user of system 100. Upon detection of an event, an event listing 815 is published on dashboard 811. Further, members 812 of online community 810 are notified of a detected event in accordance with the individual member's notification preferences. Each event listing includes event data (e.g., an embedded video), a location identifier, a time identifier, and a member action portion. The member action portion includes a comment thread and a dismiss button. Community members (e.g., administrators, tier 1, tier 2, and tier 3) can view the video file and leave comments. In an exemplary embodiment, community administrators and tier 1 members can dismiss an event. Upon event dismissal, an alert may be sent to community administrators, and the event listing may be removed from dashboard 811 or otherwise marked as dismissed.

Online community 810 includes an add members feature 816. Depending on who is viewing dashboard 811, add members feature 816 displays different options. Only community administrators are authorized to add members to online community 810. Accordingly, if a community administrator is viewing dashboard 811 (as pictured in FIG. 8B), non-community users of system 100 can be added to the online community. If a non-administrator community member is viewing dashboard 811, the member can suggest users to the system administrators for approval. Add members feature 816 operates in the same manner as an individual user adding an association (as discussed above).

Figure 8C:
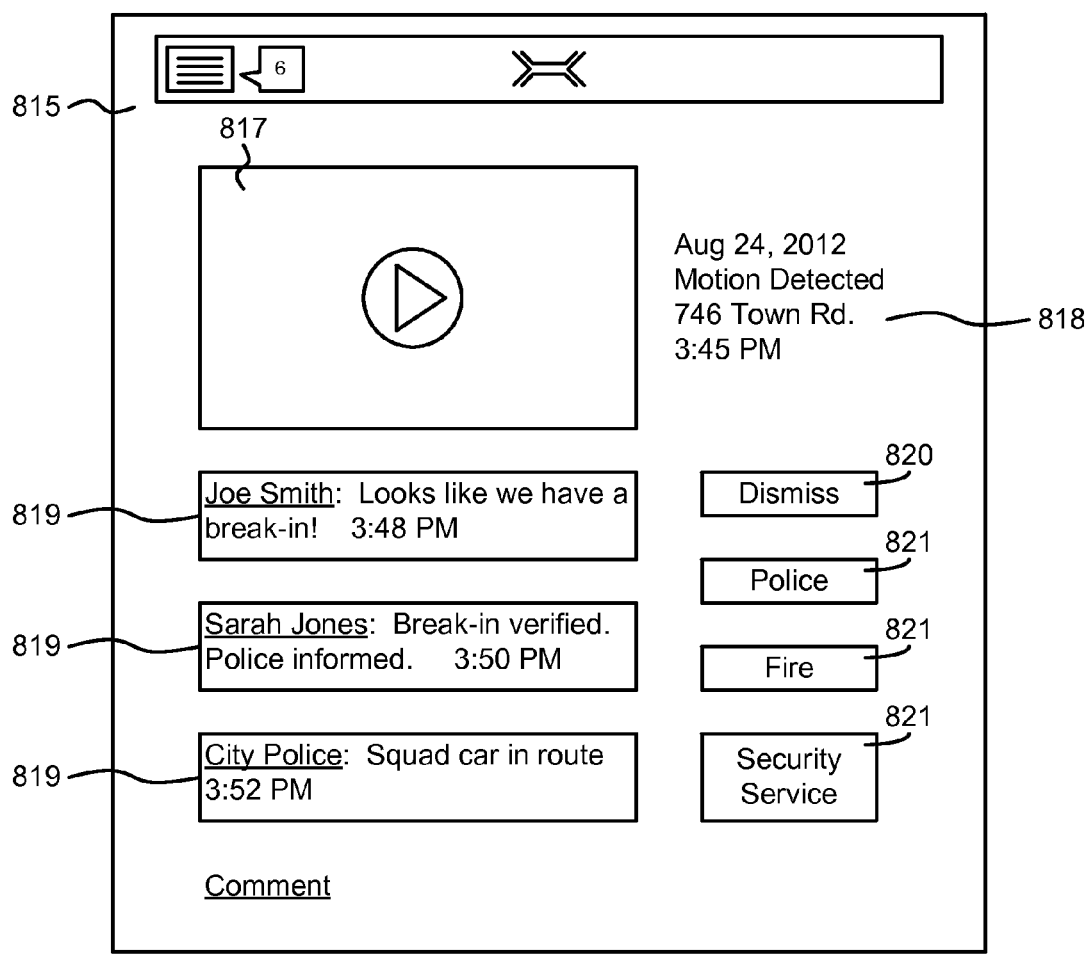
FIG. 8C is a detailed view of an event listing.

In an exemplary embodiment, system 100 is configured to link users and communities with government provided emergency services and private security services. Referring to FIG. 8C, a detailed view of a detected event listing 815 is shown. Event listing 815 is published on dashboard 811. Event listing 815 includes event data 817 (shown as a video), event information 818, event comments 819, dismiss button 820, and outside service alert buttons 821. Outside service alert buttons 821 are programmable to send an alert to a local police department, a local fire department, or a local private security service affiliated with online community 810. Selecting any of the outside service alert buttons 821 sends a notification to the indicated party. The notification includes at least event data 817 and event information 818. Event data 817 is conveyed to the outside service directly (e.g., embedded in an MMS or attached as a file in an e-mail) or indirectly (e.g., the notification includes a hyperlink to event content hosted online). Once an alert is received, the outside service has the ability to post comments 819 to event listing 815. Alerting the government agency or private security service is limited to users having a certain level of access (e.g., tier 1 or administrator) or is open to all linked users.

Another feature of system 100 is the notification feature. Upon detection of an event by a remote device (e.g., detection of motion by camera unit 101), system 100 is configured to initiate notifications to users associated with the remote device. Registered users of system 100 can optionally configure individual notification preferences. The notification preferences include notification channels, notification times, location or device specific notification preferences, the notification message type (standard, custom), and whether the notification includes event data captured by the remote device (e.g., video data captured by camera unit 101 upon the detection of an event). System 100 is configured to notify users through multiple channels, including, but not limited to: SMS, MMS, telephone call, e-mail, social media message, and/or application push notifications. As discussed above with respect to the server notification process (see FIG. 4E), each notification channel has different capabilities and potentially different notification formats. For example, SMS messages are limited to text, while MMS messages may include captured event data such as video, picture, and audio data in addition to text. When configuring notification preferences, a user selects at least one channel, selects a message type, and selects a timing factor. Multiple channels may be selected for redundant notices (e.g., such that a user receives both an SMS message and an e-mail message upon the detection of an event). The message type includes the choice between a standard default message and a voice notification. The standard message includes text indicating the detected event or identified status, the location of the event (e.g., home, office, etc.), the affected remote device, the time of the event, and an embedded URL or link to the event or status listing on the location or user dashboard. If a voice notification is selected (e.g., telephone), the standard message is an audible message in which all of the above text without the URL or link is read to the user. It should be understood that the above sample standard messages are not an exclusive listing, but just samples of default message formats. The timing factor relates to whether the notifications will be sent every day and at every hour or only during specific days and times. After setting up a notification channel, a user can further activate or deactivate notifications on demand by interacting with the user interfaces of system 100 to update his or her account settings. All notification settings are sent to and stored in server 102 through user interaction with the graphical user interface of system 100.

As indicated above, a user can create customized notification messages. The custom notification message may be a text message or a voice message. For example, the user may type a custom message such as, "Motion detected in the backyard!" The custom message may be non-security related. For example, the user may have a camera unit 101 placed at his or her front door and a custom alert set up for the night before a trash pickup with a custom message reading "Remember to take out the trash." The user can assign the custom message to a specific remote device, a specific location, or all locations for all times or a specific time range. The specific time range may be recurring (e.g., every Tuesday, every two weeks, monthly, etc.). Further, the customized notification messages may further be applied to user-owned locations such that the customized notification message is the default message for other users associated with the user-owned location.

Figure 9:
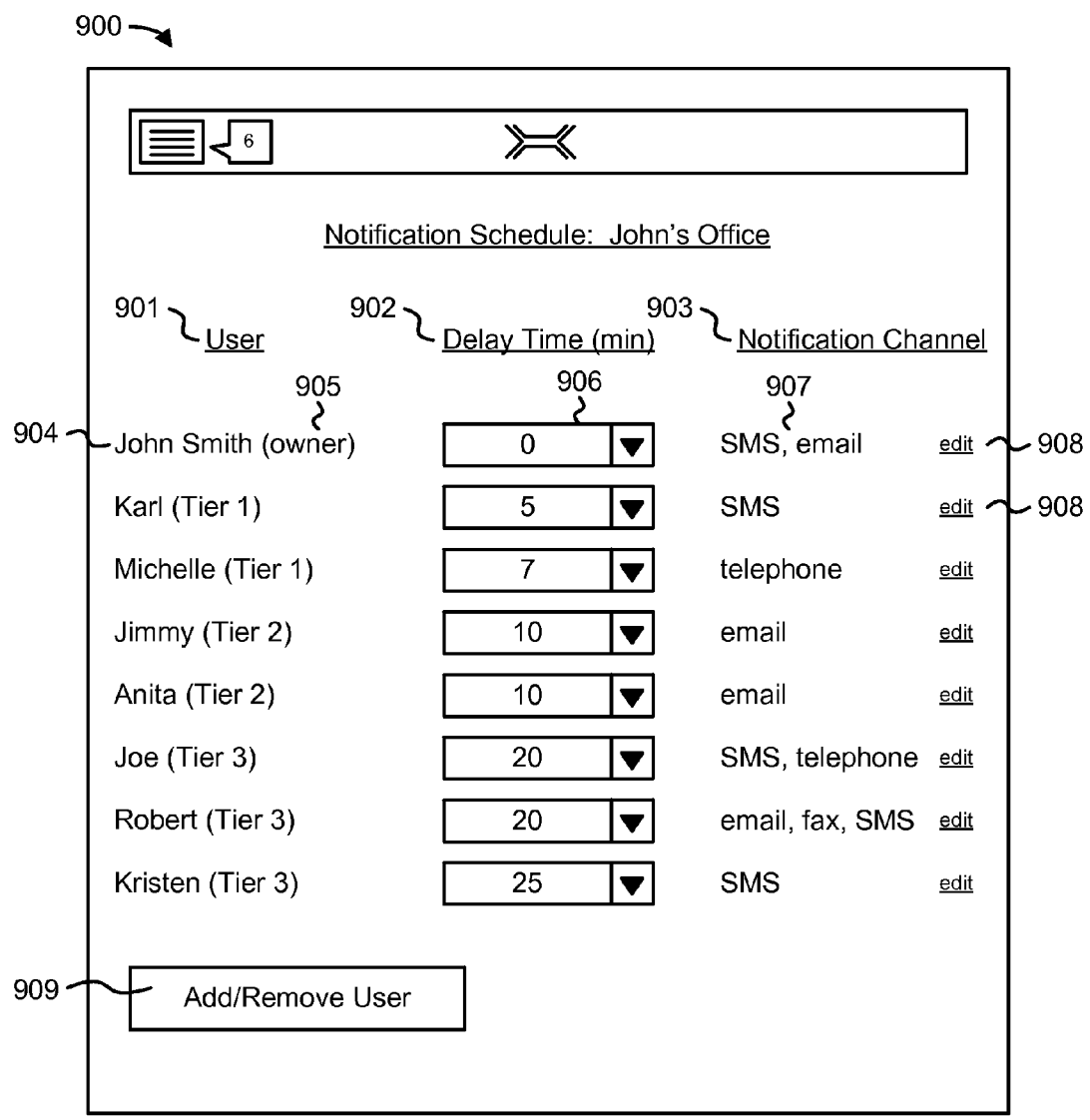
FIG. 9 is a detailed view of an exemplary notification schedule as displayed on a graphical user interface.

A user of system 100 can further set a notification schedule for a user-owned location. For example, if the user has a location (e.g., "Office") having a grouping of associated users, the user can program a notification schedule indicating when and how associated users are notified of detected events at the location. The user programs the notification schedule by sending server 102 commands through the graphical user interface of system 100. An exemplary notification schedule 900 is shown in FIG. 9. Notification schedule 900 is presented to the user through a system 100 graphical user interface. Notification schedule 900 includes a listing 901 of users, a listing of delay times 902, and a listing of enabled notification channels 903. Notification schedule 900 is location specific, and accordingly lists the user-owned location the schedule applies to (shown as John's Office). Each user within user listing 901 includes name 904 and privileges indication 905. Privileges indication 905 generally correlates to the user's privilege status within the location (e.g., what tier the user belongs to or whether the user is an owner). Further, each listing includes delay time indication 906 and enabled notification channel indication 907. Delay time indication 906 is an interactive indication on the graphical user interface, shown as a drop down list. Accordingly, the location owner can select the drop down list to change the notification delay time. The delay time is shown as a number of minutes, but other units (e.g., seconds) may be used. Further, notification channel indication 907 includes an edit button 908 such that the location's owner can add or remove channels of notification for each user in the listing. As shown by various listings, redundant notifications (e.g., multiple notifications through multiple channels) are allowed by system 100. The location's owner can further add or remove associated users from notification schedule 900 by interacting with add/remove user button 909.

In operation, notification schedule 900 sets the order of users to be notified. Thus, referring to notification schedule 900, upon detection of an event at John's Office, John Smith, as the location's owner, will be notified immediately (delay time of 0 minutes). John Smith will be notified via both SMS and e-mail. The next user, Karl, will be notified 5 minutes after the event was detected via SMS. Michelle will be notified after Karl (7 minutes after the event was detected) via telephone. Each user will be notified via the enabled notification channel at the specified delay time. However, at any point in the notification process, a notified user can respond to the event. A user responds to the event by logging into system 100 after receiving the alert, navigating to the event listing (e.g., event listing 815 of FIG. 8B; possibly by selecting an embedded link in the notification), and dismissing, deleting, or taking other action on the event listing. Once a user responds to the event, notification schedule 900 may be cut off, and users that have not been notified because of their associated delay times, will not be notified by system 100. All users on notification schedule 900 will continue to be notified in some situations. For example, the event listing may contain an option to continue the notification schedule despite the user responding to the notification and event listing. System 100 may be configured to send an "all clear" message to already notified users. The all clear message may include an indication of which user responded to the detected event and when the user responded.

A user of system 100 can configure notifications to non-users. For example, a husband (user) may wish to notify his wife (non-user) of events detected in their home. The non-user can sign up to receive notifications. The non-user may be a member of a notification schedule for a location (e.g., notification schedule 900). However, the non-user does not have the same set of privileges and capabilities as a registered user. For example, the non-user may have restricted access such that he or she cannot leave comments, delete postings, change device or location settings, and message other users. System 100 may require the non-user to register for temporary guest access before receiving notifications. Alternatively, the user provides system 100 the non-user information without requiring the non-user to register or log into system 100.

A user of system 100 can further configure associations with and alerts to government agencies (e.g., police department, fire department, etc.) and/or private companies (e.g., private security company, private health company, private property management company, etc.). A user may wish to link his or her account to a government agency for quick and optionally automatic responses to detected events. For example, a user may associate the local police department with his or her location such that when an event is detected, the police are notified (e.g., so that the police may view the event video). Further, a user may wish to link his or her account with a private company, such as a private security monitoring service such that the monitoring service can receive alerts and view contents. The private company may be registered with system 100 such that a representative of the private company can be associated with the user's locations, view event listings, and function as any other associated member.

The government agency and/or private company (or a representative of either) can be members of a notification schedule for a location (e.g., notification schedule 900). The notification message is sent to a dispatch department of or an operator employed by the associated government agency or private company. Alternatively, system 100 limits notification the associated government agency and/or private company to a user-initiated orientation (e.g., through buttons 821 of FIG. 8C) to minimize the initiation of notifications pertaining to false alarm situations. System 100 can make a direct data link established with the associated government agency or private company such that a data message (e.g., e-mail or a form of push notification) can be sent to the agency or company and the message can then include captured event data. The notification message includes the address of the detected event, the time of the detected event, the nature of the detected event (e.g., motion detected), the name of the location owner, the contact information for the location owner, and any event data capable of being transmitted with the notification message.

Once a notification message is sent to a government agency or a private company, an additional notification is sent to at least the owner of the location of the triggering event notifying the owner of the notification to the agency or company. It is further contemplated that other associated members of the location receive a similar notification based on the owner's desired preferences (e.g., the location's owner can opt to have the notification sent to specific associated users or users belonging to a specific tier). Further, system 100 updates the event listing to indicate that the government agency or private company has been notified of the occurrence. In some situations, the government agency or private company may provide a status update to system 100, in which case the status update is also added to the event listing (e.g., "squad car dispatched"). The status update may become part of the threaded comments listing to show the government agency or private company statuses in line with user comments.

Alternatively, once a government agency or private company is associated with a location, a user can notify or message the agency or company directly from the dashboard (see, e.g., FIG. 8C). On each appropriate event listing (e.g., not on an event listing merely indicating a low battery for a device) there may be an option to send a message or notify the government agency or private company. Upon selection of the option through the graphical user interface, the user has the option of sending a default message or a custom message to the agency or company. Further, the user must confirm that the agency or company is to be notified. The option to send a notification to a government agency or a private company is only available to certain members at the location owner's preference. For example, a user may arrange a location such that only the user and tier 1 users have the ability to notify the government agency or private company.

In an exemplary embodiment, notifying the government agency or private company only occurs in a verified emergency situation. It may be presented to the user that wishes to link or associate a government agency to his or her account that government agencies should only be alerted in true emergency situations and that false alerts may result in fines from system 100 and/or from the government agency. Further, to cut back on the amount of agency or company responses to notifications sent that correspond to false alarm situations, system 100 enables an all clear notification to be sent to the agency or company. For example, after an alert is sent to the government agency or private company, a user has the option of sending a cancellation notice to the government agency or private company.

Users of system 100 may pay an access fee in some embodiments. The access fee may vary based on certain user account attributes. For example, a user may pay a first price for registering a set number of locations or devices, and an additional fee for each additional location or device. The price to gain access to system 100 may be related to other user account attributes, including, but not limited to number of member associations, subscriptions to third-party emergency services, subscriptions to third-party monitoring services, level of access, and amount of participation with others' accounts. System 100 fees may be a one-time fee, a monthly subscription, or a pay per service type of account. In an alternative arrangement, system 100 is free to use. In yet an additional arrangement, system 100 is free for a basic membership including a limited set of features and capabilities (e.g., becoming a tier 3 member linked to another's account) and is a charge service for more advanced user accounts.

Device Registration

Referring generally to the figures, systems, methods, and devices for registering and/or discovering devices in a network, such as for use with a networked security system, are shown according to exemplary embodiments. Communication between security devices, such as cameras, access control devices (e.g., locks), power control devices, etc. may be securely encrypted using encryption keys exchanged between the devices and the server. Each device may be initially registered with the server using an initial registration key, or manufacturing key, used to encrypt the registration process (e.g., before additional handshaking can occur). In response, the server may return a device identifier and a rotation key, both of which may be unique to the device. Before the device begins communicating with the server, the device may request a session key, encrypting the request using the rotation key provided by the server. In response, the server may return a session key to be used to encrypt transmissions from the device to the server, such as video uploaded from the device. Each time the current session key expires (e.g., after a period of time), the device may request a new session key from the server and use the rotation key to encrypt the request.

In some embodiments, a security system may be configured to allow devices on a local network to discover and communicate directly with one another without using typical network discovery mechanisms by exchanging network address information. When a device enters the network, the device associates itself with an access point. The access point returns an access point identifier (e.g., a Basic Service Set Identifier, or BSSID) and a network address (e.g., an Internet Protocol, or IP, address). The device may then transmit the access point identifier and the network address of the device to a server. The server may receive information from multiple devices and compare the access point identifiers to determine if any of the devices are associated with the same access point. If so, the server may transmit the network address data of a matching device to the other devices associated with the same access point. The devices may use the network address data provided by the server to communicate directly with one another on the local network. In some embodiments, the server may differentiate between master devices (e.g., devices configured to control one or more other types of devices, such as security cameras) and slave devices (e.g., devices that are configured to be controlled by master devices, such as a locking device, visual or audible alarm, power switch, etc.). The server may compare the access point ID associated with any discovered slave device with the master devices and, if there is a match, report the network address of the slave device to the master devices.

Figure 10:
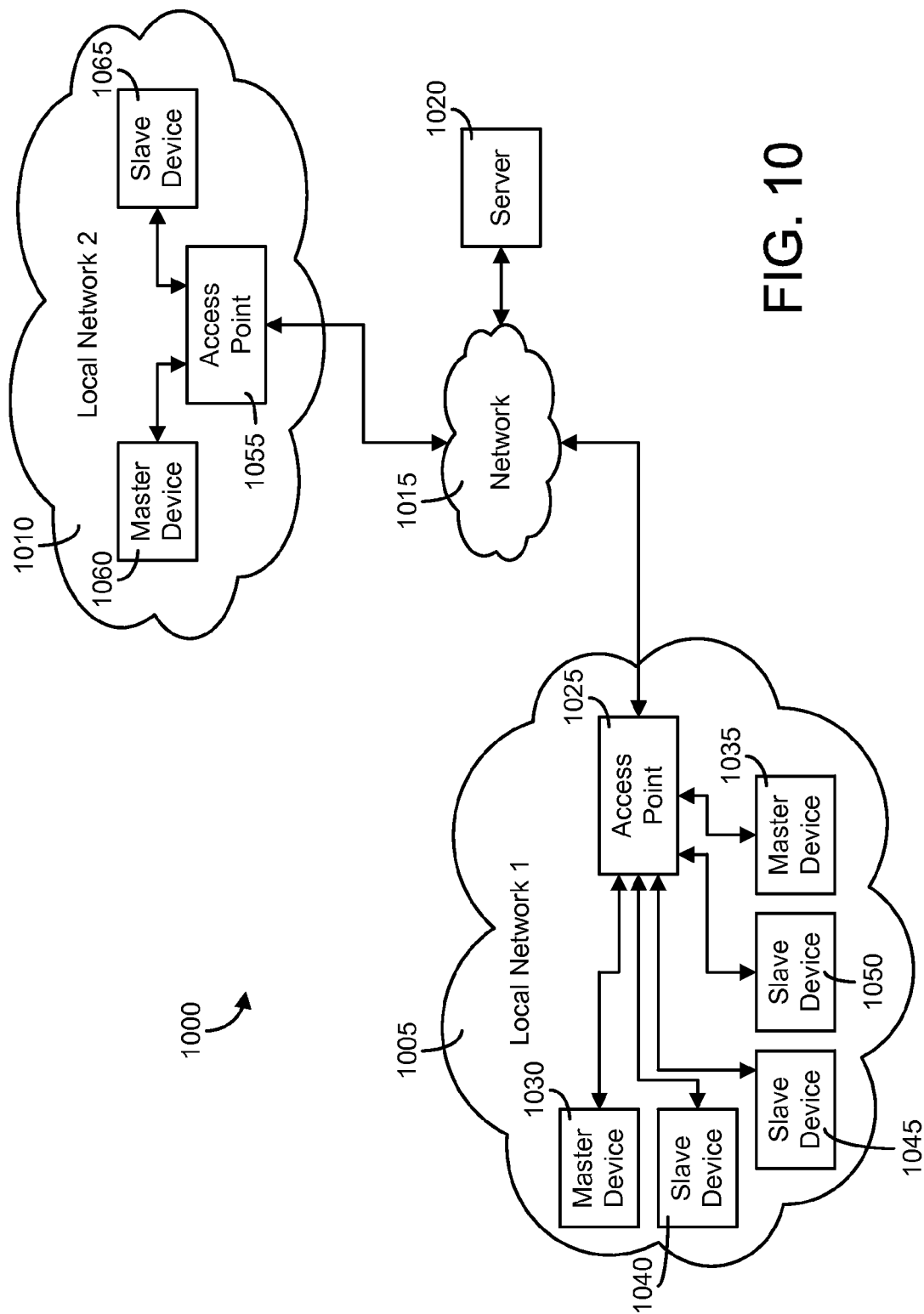
FIG. 10 is a block diagram of a security system according to an exemplary embodiment.

Referring now to FIG. 10, a security system 1000 is shown according to an exemplary embodiment. System 1000 includes a server 1020 configured to communicate with several security devices, including master devices 1030, 1035, and 1060 and slave devices 1040, 1045, 1050, and 1065. Master devices 1030 and 1035 and slave devices 1040, 1045, and 1050 are connected to a first access point 1025 (e.g., a router or other access point) on a first local network 1005 (e.g., a local area network, or LAN, such as a local residential or business network). Master device 1060 and slave device 1065 are connected to a second access point 1055 on a second local network 1010. In some embodiments, local networks 1005 and 1010 may be associated with a particular location (e.g., one or more buildings) and/or may provide network access in a particular geographic location (e.g., a group of buildings located proximate to one another). In some embodiments, devices 1030, 1035, 1040, 1045, 1050, 1060, and/or 1065 may be connected to access points 1025 and/or 1055 using a wireless connection (e.g., a Wi-Fi connection under the IEEE 802.11 standards). Access points 1025 and/or 1055 may transmit communications between the devices and server 1020 through a network 1015 (e.g., a wide area network, or WAN, such as the Internet).

Figure 11:
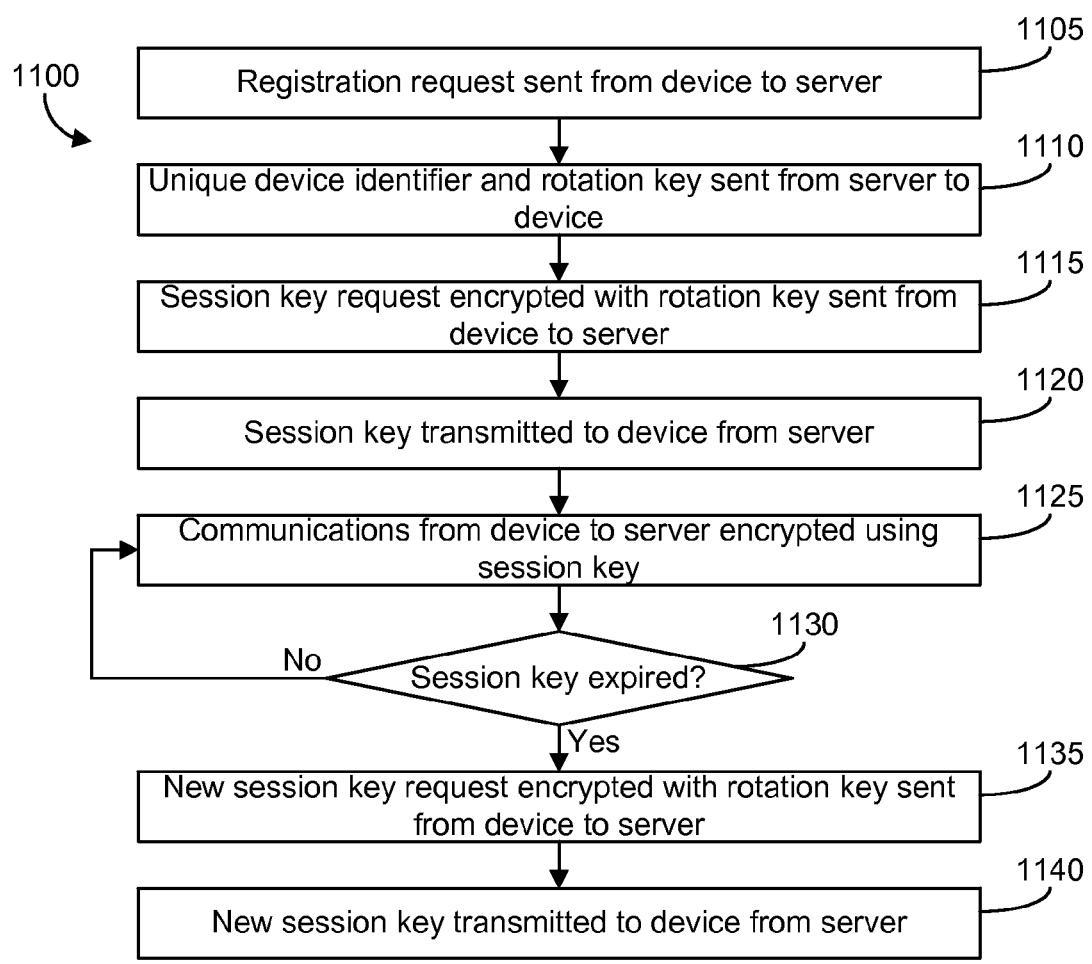
FIG. 11 is a flow diagram of a process for securing communications between a security device and a security server according to an exemplary embodiment.

Referring now to FIG. 11, a flow diagram of a process 1100 for securing communication between a security device and a security server is shown according to an exemplary embodiment. Process 1100 may be utilized, for example, to establish secure, encrypted communications between server 1020 and one or more of devices 1030, 1035, 1040, 1045, 1050, 1060, and/or 1065.

Before a device sends normal operational communications to the server, the device sends a registration request to the server (step 1105). The registration request may include identifying information about the device and/or information that may be used to communicate with and/or secure the device (e.g., type of device, model identifier, security information, network address, etc.). In some embodiments, the registration request may be sent from a manufacturing facility after the device is manufactured and before the device is packaged and shipped to a retail facility for sale to a customer. In this manner, the device may be pre-registered with the server to allow easier setup for the end consumer. The request and/or reply from the server may be encrypted using an initial registration key, or manufacturing key, such as an Advanced Encryption Standard (AES) key, and the server may verify the initial registration key before generating a response to the request.

Assuming the request is encrypted using a valid initial registration key, in response to the request, the server may return a device identifier (e.g., used by the server to identify the device and distinguish it from other devices with which the sever communicates) and a rotation key (e.g., an AES key) to the device (step 1110). In some embodiments, both the device identifier and the rotation key may be unique to the device to which they are provided and may not be provided to another device with which the server communicates. The rotation key may be used to encrypt requests for short-term session keys used to secure communications between the server and the device. The device identifier and rotation key may be stored in a memory of the device.

Before the device begins transmitting data and/or commands to the server, the device transmits a request to the server for a session key (e.g., an AES key) (step 1115). The session key is used to encrypt communications between the device and the server, such as commands, requests, and/or uploaded data (e.g., video uploaded from a camera). Assuming the rotation key is a valid rotation key (e.g., matches the rotation key associated with the device ID in a database of the server), the server transmits a session key to the device in response to the request (step 1120). The device then uses the session key to encrypt communications transmitted to the server (step 1125). In some embodiments, all communications from the device to the server except initial registration and key rotation (i.e., obtaining new session keys) may be encrypted using a session key.

The sessions keys generated by the server may be configured to expire upon the occurrence of certain predetermined conditions. For example, in some embodiments, the session keys may only be valid for a particular time period. In some embodiments, the sessions keys may additionally or alternatively expire based on other conditions, such as after a predetermined number of uses (e.g., number of communications in which a session key was used for encryption) or after a power reset of the device. Once a session key has expired, the server may require the device to request a new session key before further transmissions may be made to the server. Requiring the device to obtain new session keys may allow the server to periodically confirm that session keys are only being used by the devices to which they were issued and prevent network attacks from non-authorized devices.

The device is configured to check whether a current session key has expired (e.g., before each transmission to the server, periodically, etc.) (step 1130). If the current session key has expired, the device transmits a new session key request to the server (step 1135). The new session key request is also encrypted using the rotation key obtained by the device during the registration process. In response, the server issues a new session key to the device for use in encrypting communications with the server (step 1140).

Process 1100 may allow devices to securely communicate with the server without using a processing and power-intensive standard encryption protocol such as Secure Socket Layer (SSL) encryption. SSL utilizes a large amount of computing resources and power from the device to encrypt transactions between the devices and the server. Process 1100 may provide the same or a similar level of security as a standard protocol such as SSL without having to perform the resource-expensive transactions used by SSL to obtain the AES key. This may help increase the battery life of the device.

Figure 12:
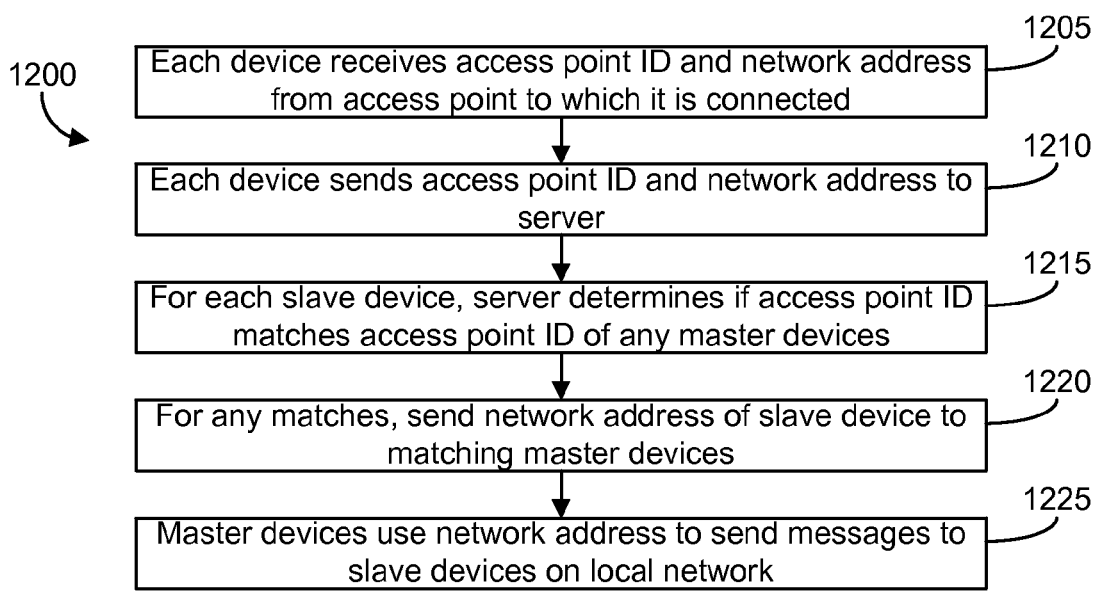
FIG. 12 is a flow diagram of a process for establishing communication between devices on a local network according to an exemplary embodiment.

Referring now to FIG. 12, a process 1200 for enabling communication between devices on a local network is shown according to an exemplary embodiment. In typical networks, devices that are newly associated with an access point are discovered by other devices using standard network discovery mechanisms of the access point and/or devices, such as Apple's Bonjour protocol or Microsoft's uPnP protocol. There is not one standard protocol that is used on all networks, and some protocols (e.g., uPnP) require relatively high resources to perform the discovery process. Such protocols are also typically available only to the local network. Process 1200 provides a method for devices on the same local network (e.g., devices 1030, 1035, 1040, 1045, and/or 1050 on local network 1005 and/or devices 1060 and 1065 on local network 1010) to communicate directly with one another that may not require the devices to utilize a standard network protocol.

When a device enters a local network, it connects to an access point and the access point transmits an access point ID (e.g., a BSSID) and a network address (e.g., an IP address) to the device (step 1205). The device transmits the access point ID and network address to a server (step 1210). The server receives access point IDs and network addresses from several other devices that may be connected to the same or different local networks and/or access points.

The server may utilize the access point ID and network address information received from the various devices to coordinate discovery of slave devices by master devices connected to the same access point. For each slave device, the server determines if the access point ID of the slave device matches the access point ID of any of the master devices (step 1215). Any matches may indicate that the slave device is on the same local network and connected to the same access point as the matching master devices. For any matches, the server transmits the network address of the slave device to the matching master devices (step 1220). This may be repeated for all slave devices registered with the server. The master devices may use the network addresses of the slave devices received from the server to transmit messages to the slave devices on the local network (step 1225).

In the example system 1000 illustrated in FIG. 10, server 1020 may receive information from each of devices 1030, 1035, 1040, 1045, and 1050 on local network 1005 and devices 1060 and 1065 on local network 1010. Devices 1030, 1035, 1040, 1045, and 1050 may provide server 1020 with their respective network addresses and a first access point ID associated with first access point 1025. Devices 1060 and 1065 may provide server 1020 with their respective network addresses and a second access point ID associated with second access point 1055.

Server 1020 may compare the first access point ID associated with slave devices 1040, 1045, and 1050 to the access point IDs reported by master devices 1030, 1035, and 1060. Based on the comparison, server 1020 may determine that slave devices 1040, 1045, and 1050 are connected to the same first access point 1025 as master devices 1030 and 1035. In response, server 1020 may transmit the network addresses of slave devices 1040, 1045, and 1050 to master devices 1030 and 1035. Master devices 1030 and 1035 may then use the network addresses received from server 1020 to communicate directly with slave devices 1040, 1045, and/or 1050 through local network 1005. Server 1020 may determine that slave device 1065 and master device 1060 are connected to the same second access point 1055 and may provide master device 1060 with the network address of slave device 1065 for use in communicating directly with slave device 1065 on local network 1010.

In some embodiments, the server may not be limited to reporting slave devices only to master devices connected to the same access point. For example, the server may collect data relating to which access points are part of the same local network or may collect a local network ID from devices upon connection with the server. The server may use this information to send network address information for slave devices to any master devices located on the same local network as the slave devices, regardless of whether or not the devices are connected to the same access point. In some embodiments, the server may identify devices that are linked to one another as master and slave regardless of whether or not the devices are on the same local network. In such an embodiment, the server may provide the master device with the network location of the slave device based on matching the linking information.

In some embodiments, the server may provide network address information to devices on the network without regard to whether the devices are master or slave devices. For example, the server may send network address information to all devices connected to the same access point and/or local network. In this manner, all devices connected to the same access point and/or local network may be able to discover one another without using a standard local network discovery protocol.

In some embodiments, the server may distribute network address information for one or more devices (e.g., slave devices) to an application operating on a mobile computing device. The user of the mobile device may use the application to directly control the operation of the slave device. For example, a slave device such as a lock or power switch may be controlled directly through the local network (or remotely through interaction with the local network through a wide area network, such as the Internet) without intervention of the server. This may allow the mobile device to control the slave device through a low-latency direct connection with a fast (e.g., near-instant) response.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure include program products comprising machine-readable storage media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions. While a computer or machine-readable storage medium is not a propagated signal (i.e., is tangible and non-transitory), a computer or machine-readable storage medium can be a source or destination of computer program instructions encoded in an artificially generated propagated signal.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A security system, comprising:
    a security server;
    one or more master devices; and
    one or more slave devices,
    wherein each of the one or more master devices and the one or more slave devices is configured to:
        receive, from an access point, an access point identifier associated with the access point and a network address associated with the respective device, and
        transmit the access point identifier and the network address to the security server,
    wherein the security server is configured to:
        for each of the one or more slave devices, determine whether the access point identifier received from the slave device matches an access point identifier received from at least one of the one or more master devices, and
        for each slave device from which a matching access point identifier is received, transmit the network address of the slave device to each of the one or more master devices from which the matching access point identifier was received,
    wherein the one or more master devices from which the matching access point identifier was received are configured to receive the network address from the security server and use the network address to transmit one or more messages to the slave device on the local network.

2. The security system of claim 1, wherein communication is established between the one or more master devices and the one or more slave devices without utilizing a network discovery protocol of the local network.

3. The security system of claim 2, wherein the network discovery protocol comprises Bonjour or uPnP.

4. The security system of claim 1, wherein the network addresses are Internet Protocol (IP) addresses and the access point identifiers are Basic Service Set Identifiers (BSSID).

5. The security system of claim 1, wherein the one or more master devices comprise one or more security cameras.

6. The security system of claim 1, wherein the security server is configured to receive a request from a mobile computing device to discover the one or more slave devices, and wherein the security server is configured to transmit the network locations of the one or more slave devices to the mobile computing device in response to the request.

7. The security system of claim 6, wherein the mobile computing device is configured to transmit one or more messages to at least one of the one or more slave devices using at least one of the network locations received from the security server.

8. The security system of claim 1, wherein each of the one or more master devices is configured to: transmit one or more master registration messages, each of the one or more master registration messages comprising a master access point identifier and a master network address associated with the master device from which the respective master registration message was transmitted.

9. The security system of claim 1, wherein each of the one or more slave devices is configured to: transmit one or more slave registration messages, each of the one or more slave registration messages comprising a slave access point identifier and a slave network address associated with the slave device from which the respective slave registration message was transmitted.

10. The security system of claim 1, wherein the one or more slave devices comprise one or more locking devices.

11. A method of enabling communication between devices, the method comprising:
    associating a master device with an access point on a local network;
    receiving, at the master device, a first access point identifier associated with the access point and a first network address assigned by the access point to the master device;
    transmitting, from the master device to a security server, the first access point identifier and the first network address, wherein the security server is configured to receive a second access point identifier and a second network address from a slave device and, when the second access point identifier matches the first access point identifier, transmit the second network address to the master device;
    receiving, at the master device, the second network address from the security server; and
    transmitting one or more messages from the master device to the slave device on the local network using the second network address received from the security server.

12. The method of claim 11, wherein communication is established between the first device and the second device without utilizing a network discovery protocol of the local network.

13. The method of claim 11, wherein the network discovery protocol comprises Bonjour or uPnP.

14. The method of claim 11, wherein the first network address and the second network address are Internet Protocol (IP) addresses and the first access point identifier and the second access point identifier are Basic Service Set Identifiers (BSSID).

15. The method of claim 11, wherein the slave device perform one or more actions responsive to receiving the one or more messages.

16. The method of claim 11, wherein the slave device is a locking device.

17. The method of claim 11, wherein the security server receives a request from a mobile computing device to discover the one or more slave devices, and wherein the security server transmits the network locations of the one or more slave devices to the mobile computing device in response to the request.

18. The method of claim 17, further comprising: receiving, by at least one of the one or more slave devices from the mobile computing device, one or more messages using at least one of the network locations received from the security server.

19. One or more non-transitory computer-readable storage media having instructions stored thereon that, when executed by one or more processors, cause the one or more processors to implement a method comprising:

receiving one or more master registration messages from one or more master devices, each of the one or more master registration messages comprising a master access point identifier and a master network address associated with the master device from which the respective master registration message was received;

receiving one or more slave registration messages from one or more slave devices, each of the one or more slave registration messages comprising a slave access point identifier and a slave network address associated with the slave device from which the respective slave registration message was received;

for each of the one or more slave devices, determining whether the slave access point identifier in the slave registration message received from the respective slave device matches one of the master access point identifiers of the one or more master registration messages; and for each slave device from which a matching slave access point identifier is received, transmitting the slave network address of the slave device to each of the one or more master devices from which the matching master access point identifier was received;

wherein the one or more master devices receiving the slave network address are configured to use the slave network address to transmit one or more messages to the slave device on the local network.

20. The one or more non-transitory computer-readable storage media of claim 19, wherein the slave device is a locking device.

* * * * *